(12) United States Patent
Domici

(10) Patent No.: US 12,318,974 B2
(45) Date of Patent: Jun. 3, 2025

(54) MODULAR BOOK MOLD SYSTEMS AND METHODS

(71) Applicant: Domici Holdings LLC, Manville, NJ (US)

(72) Inventor: John D. Domici, Hillsborough, NJ (US)

(73) Assignee: Domici Holdings LLC, Manville, NJ (US)

( * ) Notice: Subject to any disclaimer, the term of this patent is extended or adjusted under 35 U.S.C. 154(b) by 363 days.

(21) Appl. No.: 17/735,053

(22) Filed: May 2, 2022

(65) Prior Publication Data
US 2023/0347558 A1     Nov. 2, 2023

(51) Int. Cl.
*B29C 45/04*     (2006.01)

(52) U.S. Cl.
CPC ...... *B29C 45/0441* (2013.01); *B29C 45/0416* (2013.01); *B29C 2045/0425* (2013.01)

(58) Field of Classification Search
CPC ............ B29C 45/0416; B29C 45/0441; B29C 2045/0425
See application file for complete search history.

(56) References Cited

U.S. PATENT DOCUMENTS

| | | | |
|---|---|---|---|
| 2,643,418 | A | 6/1953 | Auldridge |
| 4,161,837 | A | 7/1979 | Johnston |
| 4,440,377 | A | 4/1984 | Hujik |
| 4,969,811 | A | 11/1990 | Littleton |
| 5,125,842 | A | 6/1992 | Hiltunen |
| 6,024,559 | A | 2/2000 | Coleman |
| 6,554,605 | B1 | 4/2003 | McNaughton |
| 7,524,185 | B2 | 4/2009 | Berkenes et al. |
| 8,152,130 | B1 | 4/2012 | Van Gelder |
| 8,616,871 | B2 | 12/2013 | Galomb |
| 8,641,401 | B2 | 2/2014 | Leininger |
| 8,951,038 | B2 | 2/2015 | Bouthemy et al. |

(Continued)

FOREIGN PATENT DOCUMENTS

| | | |
|---|---|---|
| CN | 1329537 A | 1/2002 |
| GB | 2181386 A | 9/1989 |

OTHER PUBLICATIONS

Protypingns—"CNC machined aluminum molds for 16oz and 12oz decoy anchor mushroom lead, CNC machining services"—Downloaded Jun. 9, 2022—Available from Internet <URL: https://www.etsy.com/listing/662826856/cnc-machined-aluminum-molds-for-16oz-and>.

(Continued)

*Primary Examiner* — James Sanders
(74) *Attorney, Agent, or Firm* — Gallium Law; Wesley Schwie; Justin Schwechter

(57) ABSTRACT

The disclosure includes a mold assembly, comprising a machinable first mold blank comprising a first hinge end and a first handle end located opposite the first hinge end, and a machinable second mold blank comprising a second hinge end and a second handle end located opposite the second hinge end. The first hinge end may comprise a first hinge slot, and the second hinge end may comprise a second hinge slot, both hinge slots located on inner surfaces of their respective mold blanks. The mold assembly may comprise a first hinge bracket detachably coupled to the first hinge slot and a second hinge bracket detachably coupled to the second hinge slot. A hinge pin may be detachably coupled to the first hinge bracket and the second hinge bracket, and the first mold blank and the second mold blank may be configured to rotate about the hinge pin.

20 Claims, 46 Drawing Sheets

(56) References Cited

U.S. PATENT DOCUMENTS

2006/0035090 A1    2/2006  Damo
2015/0316341 A1    11/2015 Aguilar

OTHER PUBLICATIONS

Society for Historical Archeolgy—"Glassmaking & Glassmakers"—Downloaded Jun. 9, 2022—Available from Internet <URL: https://sha.org/bottle/glassmaking.htm>.
Barlow's Tackle—"Do-It Blank Molds"—Downloaded Jun. 9, 2022—Available from Internet <URL: http://www.lilmacmolds.com/A-Series_Molds.php>.
Lil Mac Molds—"A-Series Molds"—Downloaded Jun. 9, 2022—Available from Internet <URL: http://www.lilmacmolds.com/A-Series_Molds.php>.
Do It Molds—"Boss Hog—4.5"—Downloaded Aug. 27, 2021—Available from Internet <URL: https://store.doitmolds.com/Boss-Hog-45_p_75.html>.
Do It Molds—"Arrowhead Jig"—Downloaded Aug. 27, 2021—Available from Internet <URL: https://store.doitmolds.com/Arrowhead-Jig-Sz-3-8-and-1-2-oz.html>.
Do It Molds—"Jig Molds"—Downloaded Aug. 27, 2021—Available from Internet <URL: https://store.do-itmolds.com/do-it-molds-fishing-jig-molds.html>.
Do It Molds—"4" G-Tube"—Downloaded Aug. 27, 2021—Available from Internet <URL: https://store.do-itmolds.com/4-G-Tube_p_184.html>.
Do It Molds—"Shad Head Jig "—Downloaded Aug. 27, 2021—Available from Internet <URL: https://store.do-itmolds.com/Shad-Head-Jig_c_385.html>.

24
handle retainer handle retainer
24

20b
threaded hinge
bracket 21b
threading threading
21b 20b
threaded hinge
bracket 20
hinge bracket 20
hinge bracket 20
hinge bracket 20
hinge bracket

| | |
|---|---|
| Machine a first male interlock to protrude from the inner surface of the first mold blank, the first male interlock defining a tapered male profile, the first male interlock located adjacent the first handle end | 2800 |
| Machine a first female interlock to extend into the inner surface of the second mold blank, the first female interlock defining a tapered female profile, the first female interlock located adjacent the second handle end, wherein the first female interlock is positioned with respect to the first male interlock | 2802 |
| Machine a second male interlock to protrude from the inner surface of the first mold blank, the second male interlock defining a tapered male profile, the second male interlock located adjacent the first hinge end | 2804 |
| Machine a second female interlock to extend into the inner surface of the second mold blank, the second female interlock defining a tapered female profile, the second female interlock located adjacent the second hinge end, wherein the second female interlock is positioned with respect to the second male interlock | 2806 |
| Machine a first molding recess into a first mold blank | 2808 |
| Machine a second molding recess into a second mold blank, wherein the first molding recess and the second molding recess define a mold cavity when the inner surface of the first mold blank physically contacts the inner surface of the second mold blank | 2810 |

Figure 28

Slidably couple, via a first hinge slot in the first mold blank, the inner hinge bracket pair to the first mold blank — 2900

Detachably couple, via at least one first hinge screw, the inner hinge bracket pair to the first mold blank — 2902

Slidably couple a hinge pin through holes in each hinge bracket of the inner hinge bracket pair — 2904

Figure 29

MODULAR BOOK MOLD SYSTEMS AND METHODS

BACKGROUND

Field

Various embodiments herein relate to molding systems. Certain embodiments relate to molding systems for use with injection molding or pour molding.

Description of Related Art

Injection molding and pour molding allow consumers to produce small items out of plastic or soft metals in an inexpensive manner. Book molds in particular allow for the creation of cavities on either mold half of the book mold, which forms a mold cavity when the book mold is closed.

Consumers are able to create their own molds using blank pieces of metal or other materials. Cavities are formed in either blank and these cavities are linked to the edge of the blank by a groove. The cavities are then placed together, and molten or liquid material such as metal or plastic is injected or poured into the groove so as to fill the cavity. Once the molten or liquid material has cooled, the blanks are separated leaving an object as defined by the cavities.

The prior art has several limitations, which will be described in greater detail. Thus, there is a need for a book molding system and method that remedy these deficiencies.

SUMMARY

The disclosure includes a mold assembly, comprising a first mold blank capable of being machined to create a first mold cavity. In some embodiments, the first mold blank comprises a first hinge end and a first handle end located opposite the first hinge end. According to some embodiments, the first hinge end comprises a first hinge slot located on an inner surface of the first mold blank. The mold assembly may comprise a second mold blank capable of being machined to create a second mold cavity. In some embodiments, the second mold blank comprises a second hinge end and a second handle end located opposite the second hinge end. According to some embodiments, the second hinge end comprises a second hinge slot located on an inner surface of the second mold blank. The mold assembly may comprise a first hinge bracket detachably coupled to the first hinge slot. In some embodiments, a second hinge bracket is detachably coupled to the second hinge slot. According to some embodiments, a hinge pin is detachably coupled to the first hinge bracket and the second hinge bracket. The first mold blank and the second mold blank may be configured to rotate about the hinge pin.

In some embodiments, the mold assembly comprises a first handle retainer detachably coupled to an outer surface of the first mold blank. According to some embodiments, the first handle retainer is located adjacent the first handle end. The outer surface of the first mold blank may be located opposite the inner surface of the first mold blank. In some embodiments, a first handle is detachably coupled to the first handle retainer. According to some embodiments, a second handle retainer is detachably coupled to an outer surface of the second mold blank. The second handle retainer may be located adjacent the second handle end. In some embodiments, the outer surface of the second mold blank is located opposite the inner surface of the second mold blank. According to some embodiments, a second handle detachably coupled to the second handle retainer.

The mold assembly may comprise a first handle slot located on the outer surface of the first mold blank. In some embodiments, the first handle slot is located adjacent to the first handle end. According to some embodiments, the first handle slot is configured to receive the first handle retainer. The mold assembly may comprise a second handle slot located on the outer surface of the second mold blank. In some embodiments, the second handle slot is located adjacent to the second handle end. According to some embodiments, the second handle slot is configured to receive the second handle retainer.

The first handle may be offset with respect to a central axis of the first mold blank. In some embodiments, the second handle is offset with respect to a central axis of the second mold blank.

According to some embodiments, the mold assembly comprises a first pair of handle screws threadably coupled to the first mold blank via the outer surface of the first mold blank. The first pair of handle screws may be configured to detachably couple the first handle retainer to the first mold blank. In some embodiments, the mold assembly comprises a second pair of handle screws threadably coupled to the second mold blank via the outer surface of the second mold blank. According to some embodiments, the second pair of handle screws are configured to detachably couple the second handle retainer to the second mold blank.

The mold assembly may comprise a first threaded rod threadably coupled to the first handle retainer and the first handle. In some embodiments, the first threaded rod detachably couples the first handle to the first mold blank. According to some embodiments, the mold assembly comprises a first hex nut threadably coupled to the first threaded rod and configured to retain the first handle in place with respect to the first threaded rod. The mold assembly may comprise a second threaded rod threadably coupled to the second handle retainer and the second handle. In some embodiments, the second threaded rod detachably couples the second handle to the second mold blank. According to some embodiments, the mold assembly comprises a second hex nut threadably coupled to the second threaded rod and configured to retain the second handle in place with respect to the second threaded rod.

The first handle slot may define a first handle dovetail profile recessed into the outer surface of the first mold blank. In some embodiments, the first handle retainer defines a corresponding first handle dovetail profile configured to slidably engage the first handle dovetail profile to thereby detachably couple the first handle retainer to the first mold blank. According to some embodiments, the second handle slot defines a second handle dovetail profile recessed into the outer surface of the second mold blank. The second handle retainer may define a corresponding second handle dovetail profile configured to slidably engage the second handle dovetail profile to thereby detachably couple the second handle retainer to the second mold blank.

In some embodiments, the first handle defines a first tapered profile. According to some embodiments, the second handle defines a second tapered profile substantially similar to the first tapered profile.

The mold assembly may comprise a first hinge screw threadably coupled to the first mold blank via the inner surface of the first mold blank. In some embodiments, the first hinge screw is configured to detachably couple the first hinge bracket to the first mold blank. According to some embodiments, the mold assembly comprises a second hinge screw threadably coupled to the second mold blank via the inner surface of the second mold blank. The second hinge screw may be configured to detachably couple the second hinge bracket to the second mold blank.

In some embodiments, the first hinge slot defines a first hinge dovetail profile recessed into the inner surface of the first mold blank. According to some embodiments, the first hinge bracket defines a corresponding first hinge dovetail profile configured to slidably engage the first hinge dovetail profile to thereby detachably couple the first hinge bracket to the first mold blank. The second hinge slot may define a second hinge dovetail profile recessed into the inner surface of the second mold blank. In some embodiments, the second hinge bracket defines a corresponding second hinge dovetail profile configured to slidably engage the second hinge dovetail profile to thereby detachably couple the second hinge bracket to the second mold blank.

According to some embodiments, the first hinge bracket comprises an inner hinge bracket pair. The second hinge bracket may comprise an outer hinge bracket pair. In some embodiments, each hinge bracket of the inner hinge bracket pair is located between each hinge bracket of the outer hinge bracket pair.

According to some embodiments, the mold assembly comprises a first male interlock protruding from the inner surface of the second mold blank. The first male interlock may define a tapered male profile. In some embodiments, the mold assembly comprises a first female interlock extending into the inner surface of the first mold blank. According to some embodiments, the first female interlock defines a tapered female profile. The first female interlock may be sized and positioned to receive the first male interlock and thereby align the first mold blank with the second mold blank. In some embodiments, the mold assembly comprises a second male interlock protruding from the inner surface of the second mold blank. According to some embodiments, the second male interlock defining the tapered male profile. The mold assembly may comprise a second female interlock extending into the inner surface of the first mold blank. In some embodiments, the second female interlock defines the tapered female profile. According to some embodiments, the second female interlock is sized and positioned to receive the second male interlock and thereby align the first mold blank with the second mold blank.

The first male interlock may be located adjacent the first handle end. In some embodiments, the second male interlock is located adjacent the first hinge end. According to some embodiments, the first female interlock is located adjacent the second handle end. The second female interlock may be located adjacent the second hinge end.

The disclosure also includes a manufacturing method for constructing a mold assembly, comprising machining a first hinge slot into an inner surface of a first mold blank. The manufacturing method for constructing a mold assembly may comprise machining a second hinge slot into an inner surface of the second mold blank. In some embodiments, the manufacturing method for constructing a mold assembly comprises detachably coupling a first hinge bracket to the first hinge slot. According to some embodiments, the manufacturing method for constructing a mold assembly comprises detachably coupling a second hinge bracket to the second hinge slot. The manufacturing method for constructing a mold assembly may comprise detachably coupling a hinge pin to the first hinge bracket and the second hinge bracket. In some embodiments, the first mold blank and the second mold blank are rotatable about the hinge pin.

According to some embodiments, the manufacturing method for constructing a mold assembly comprises machining a first handle slot into an outer surface of the first mold blank. The outer surface of the first mold blank may be located opposite the inner surface of the first mold blank. In some embodiments, the first handle slot is configured to receive a first handle retainer. According to some embodiments, the manufacturing method for constructing a mold assembly comprises machining a second handle slot into the outer surface of the second mold blank. The outer surface of the second mold blank may be located opposite the inner surface of the second mold blank. In some embodiments, the second handle slot is configured to receive a second handle retainer. According to some embodiments, the manufacturing method for constructing a mold assembly comprises offsetting a first handle with respect to a central axis of the first mold blank. The manufacturing method for constructing a mold assembly may comprise offsetting a second handle with respect to a central axis of the second mold blank. In some embodiments, the manufacturing method for constructing a mold assembly comprises retaining a first handle, via a first hex nut, with respect to a first threaded rod. According to some embodiments, the manufacturing method for constructing a mold assembly comprises retaining the second handle, via a second hex nut, with respect to a second threaded rod. The manufacturing method for constructing a mold assembly may comprise slidably coupling the first handle retainer into the first handle slot. In some embodiments, the manufacturing method for constructing a mold assembly comprises slidably coupling the second handle retainer into the second handle slot. According to some embodiments, the manufacturing method for constructing a mold assembly comprises detachably coupling the first handle retainer to the outer surface of the first mold blank. The manufacturing method for constructing a mold assembly may comprise detachably coupling, via the first threaded rod, the first handle to the first handle retainer. In some embodiments, the manufacturing method for constructing a mold assembly comprises detachably coupling a second handle retainer to the outer surface of the second mold blank. According to some embodiments, the manufacturing method for constructing a mold assembly comprises detachably coupling, via the second threaded rod, the first handle to the first handle retainer. The manufacturing method for constructing a mold assembly may comprise tapering the first handle into a first tapered profile. In some embodiments, the manufacturing method for constructing a mold assembly comprises tapering the second handle into a second tapered profile.

According to some embodiments, the manufacturing method for constructing a mold assembly comprises machining the first handle slot to define a first handle dovetail profile. The manufacturing method for constructing a mold assembly may comprise machining the second handle slot to define a second handle dovetail profile. In some embodiments, the manufacturing method for constructing a mold assembly comprises machining the first handle retainer to define a corresponding first handle dovetail profile. According to some embodiments, the manufacturing method for constructing a mold assembly comprises machining the second handle retainer to define a corresponding second handle dovetail profile.

The first hinge bracket may comprise an inner hinge bracket pair. In some embodiments, the second hinge bracket comprises an outer hinge bracket pair. According to some embodiments, the first hinge slot comprises an inner hinge slot pair. The second hinge slot may comprise a second hinge slot pair. In some embodiments, the manufacturing method for constructing a mold assembly comprises slidably coupling each hinge bracket of the inner hinge bracket pair to a respective cavity of the inner hinge slot pair. According to some embodiments, the manufacturing method for constructing a mold assembly comprises slidably coupling each hinge bracket of the outer hinge bracket pair to a respective cavity of the outer hinge slot pair. The manufacturing method for constructing a mold assembly may comprise threadably coupling, via a first hinge screw, each hinge bracket of the inner hinge bracket pair to the first mold blank. In some embodiments, the manufacturing method for constructing a mold assembly comprises threadably coupling, via a second hinge screw, each hinge bracket of the outer hinge bracket pair to the second mold blank. According to some embodiments, the manufacturing method for constructing a mold assembly comprises positioning each hinge bracket of the inner hinge bracket pair to be located between each hinge bracket of the outer hinge bracket pair.

The manufacturing method for constructing a mold assembly may comprise machining the first hinge slot to define a first hinge dovetail profile. In some embodiments, the manufacturing method for constructing a mold assembly comprises machining the second hinge slot to define a second hinge dovetail profile. According to some embodiments, the manufacturing method for constructing a mold assembly comprises machining the first hinge bracket into the shape a corresponding first hinge dovetail profile. The manufacturing method for constructing a mold assembly may comprise machining the second hinge bracket into the shape of a corresponding second hinge dovetail profile.

In some embodiments, the first mold blank comprises a first handle end and a first hinge end opposite the first handle end. According to some embodiments, the second mold blank comprises a second handle end and a second hinge end opposite the second handle end. The manufacturing method for constructing a mold assembly may comprise machining a first male interlock to protrude from the inner surface of the second mold blank. In some embodiments, the first male interlock defines a tapered male profile. According to some embodiments, the first male interlock is located adjacent the first handle end. The manufacturing method for constructing a mold assembly may comprise machining a first female interlock to extend into the inner surface of the first mold blank. In some embodiments, the first female interlock defines a tapered female profile. According to some embodiments, the first female interlock is located adjacent the second handle end. The first female interlock may be positioned with respect to the first male interlock. In some embodiments, the manufacturing method for constructing a mold assembly comprises machining a second male interlock to protrude from the inner surface of the second mold blank. According to some embodiments, the second male interlock defines a tapered male profile. The second male interlock may be located adjacent the first hinge end. In some embodiments, the manufacturing method for constructing a mold assembly comprises machining a second female interlock to extend into the inner surface of the first mold blank. According to some embodiments, the second female interlock defines a tapered female profile. The second female interlock may be located adjacent the second hinge end. In some embodiments, the second female interlock is positioned with respect to the second male interlock.

According to some embodiments, the manufacturing method for constructing a mold assembly comprises machining a first molding cavity into a first mold blank. The manufacturing method for constructing a mold assembly may comprise machining a second molding cavity into a second mold blank. In some embodiments, the first molding cavity and the second molding cavity define a complete mold cavity when the inner surface of the first mold blank physically contacts the inner surface of the second mold blank.

The disclosure also includes a method for assembling a mold assembly, wherein the mold assembly comprises a first mold blank, a second mold blank, an inner hinge bracket pair, an outer hinge bracket pair, and a hinge pin, the method comprising slidably coupling, via a first hinge slot in the first mold blank, the inner hinge bracket pair to the first mold blank. According to some embodiments, the method for assembling a mold assembly comprises detachably coupling, via at least one first hinge screw, the inner hinge bracket pair to the first mold blank. The method for assembling a mold assembly may comprise slidably coupling a hinge pin through holes in each hinge bracket of the inner hinge bracket pair.

In some embodiments, the method for assembling a mold assembly comprises slidably coupling the hinge pin through holes in each hinge bracket of the outer hinge bracket pair. According to some embodiments, the method for assembling a mold assembly comprises rotably coupling, via the hinge pin, the outer hinge bracket pair to the inner hinge bracket pair. The method for assembling a mold assembly may comprise threadably coupling at least one hinge bracket of the outer hinge bracket pair to the hinge pin.

In some embodiments, the method for assembling a mold assembly comprises slidably coupling, via a second hinge slot in the second mold blank, the outer hinge bracket pair to the second mold blank. According to some embodiments, the method for assembly a mold assembly comprises detachably coupling, via at least one second hinge screw, the outer hinge bracket pair to the second mold blank.

The mold assembly may further comprise a roll pin. In some embodiments, where the mold assembly comprises a roll pin, the method for assembling a mold assembly comprises detachably coupling the roll pin to the second mold blank.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

FIG. 28 illustrates a flowchart depicting a method of machining male and female interlocks into mold blanks, according to some embodiments.

FIG. 29 illustrates a flowchart depicting a method of assembling a first mold blank and an inner hinge bracket pair, according to some embodiments.

DETAILED DESCRIPTION

Figure 1:
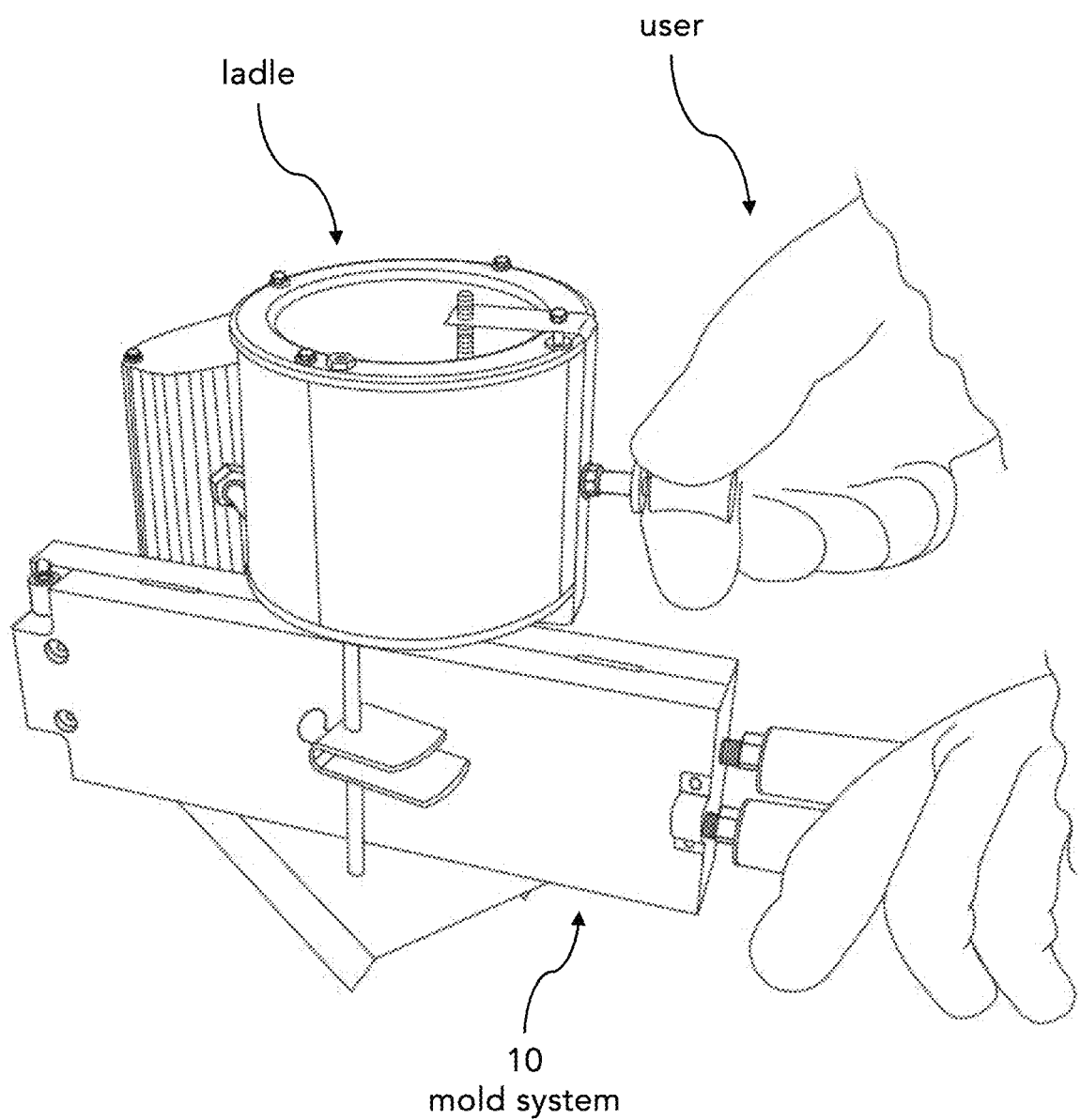
FIG. 1 illustrates a diagrammatic view of a mold system being used, according to some embodiments.

Although specific embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order-dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

COMPONENT INDEX

10—Mold system
12—Mold blank
12a—First mold blank
12b—Second mold blank
14—Hinge end
14a—First hinge end
14b—Second hinge end
16—Handle end
16a—First handle end
16b—Second handle end
18—Hinge slot
18a—First hinge slot
18b—Second hinge slot
20—Hinge bracket
20a—Counterbore hinge bracket
20b—Threaded hinge bracket
21a—Counterbore
21b—Threading
22—Hinge pin
24—Handle retainer
24a—First handle retainer
24b—Second handle retainer
26—Handle
26a—First handle
26b—Second handle
27a—First central axis
27b—Second central axis
28—Handle slot
28a—First handle slot
28b—Second handle slot
30—Pair of handle screws
30a—First pair of handle screws
30b—Second pair of handle screws
32—Threaded rod
32a—First threaded rod
32b—Second threaded rod
34—Hex nut
34a—First hex nut
34b—Second hex nut
36—Handle dovetail profile
38—Hinge screw
38a—First hinge screw
38b—Second hinge screw
40—Hinge dovetail profile
42—Inner hinge bracket pair
44—Outer hinge bracket pair
46—Male interlock
46a—First male interlock
46b—Second male interlock
48a—First female interlock
48b—Second female interlock The systems and methods disclosed herein provide an easier to use and more cost-effective means for producing book molds than what is currently available in the prior art. One of the limitations of prior art book molds is that when a mold is no longer needed, or has been used too many times and is no longer functional, the entirety of the mold is no longer viable, so all components are thrown out at the same time. By making the book mold a modular system, the mold blanks can be removed while retaining the structural components such as hinges and handles.

If an issue occurs in one of the mold blanks, the prior art solution would be to create an entire new book mold. The systems and methods herein allow for the replacement of a single mold blank, which decreases cost to the user and wastes less material.

The ability to separate the components from one another also solves an issue of logistics pertaining to shipments. By removing the mold blanks from the other components, the materials needed to ship the system are decreased over that which is needed for devices in the prior art.

Throughout this specification, the term "inner surface" is used to define the portion of the mold blanks that come together during the molding process. This is otherwise known in the art as the "parting line" or "parting line surface", and as such, "inner surface" should be read as synonymous with these terms. The term "outer surface", therefore, is used to design the planar surface that is opposite the "inner surface" or "parting line surface".

Additionally, the terms "first mold blank" and "second mold blank" are used to define the separate mold blanks that are a part of the system, with a key difference between the first and second mold blanks being whether or not a potentially provided interlock is female or male. While these interlocks are specified to the mold blank on which they are shown, this is not intended to be limiting, and the disclosure also provides for a scenario in which the mold blanks upon which each type of interlock are switched.

FIG. 1 illustrates an embodiment of the mold system while in use. The mold system 10 may have cavities machined onto the mold blanks, which when place together form an entire mold cavity. In some embodiments, this mold cavity leads to the edge of the mold blank to allow for pour or injection molding. In pour or injection molding, the mold system 10 is closed and then place on its side to allow access to the holes that lead to the mold cavities. A resin, such as molten metal or plastic, is then poured or injected into the mold system 10 through these holes. After some time passes, the resin hardens, and the mold system 10 may be opened to remove the newly formed mold.

Figure 2A:
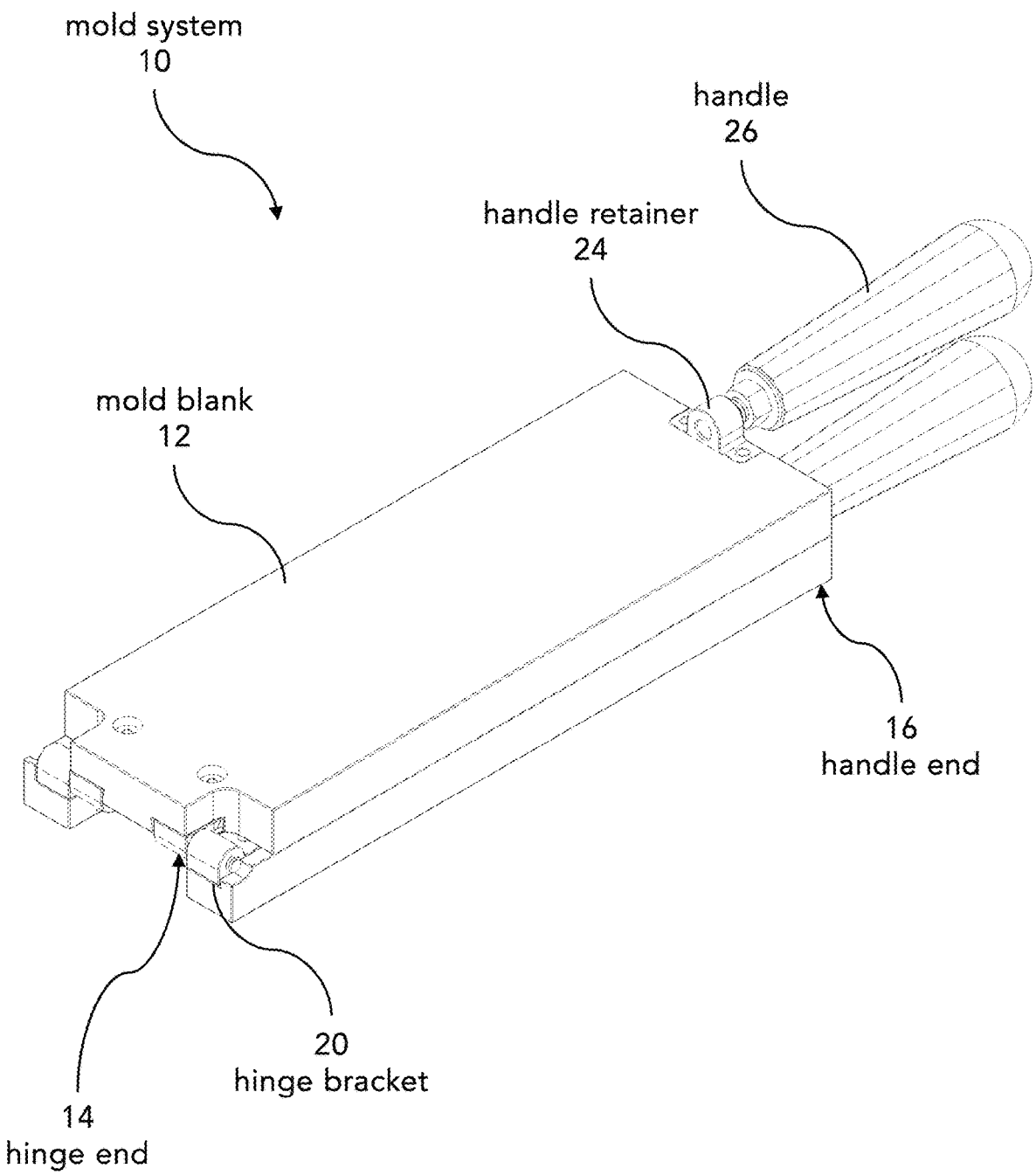
FIG. 2a illustrates a profile view of the mold system in a closed position, according to some embodiments.
Figure 2B:
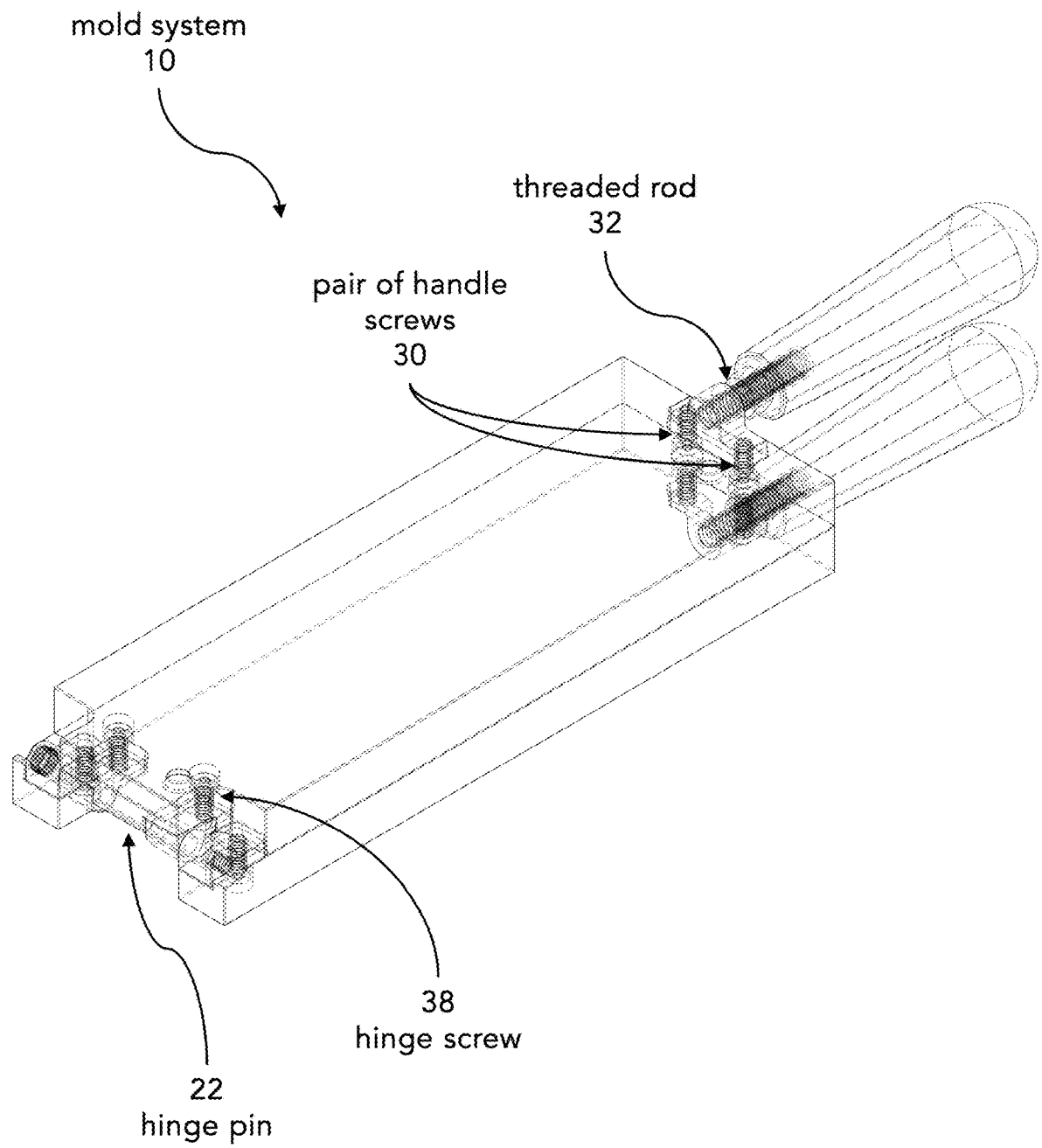
FIG. 2b illustrates a profile view of the mold system in a closed position with hidden lines displayed, according to some embodiments.

FIGS. 2a and 2b illustrate a profile view of the mold system 10 in a closed position. FIG. 2a illustrates what the mold system 10 may look like to an outside observer. The mold system 10 may comprise a hinge end 14 and a handle end 16. According to some embodiments, a handle 26 is coupled to a handle retainer 24, and the handle retainer 24 is coupled to the handle end 16 of one of the mold blanks 12 of the mold system 10. The handle retainer 24 as an intermediary coupling device is not strictly necessary—the handle 26 may couple directly to the handle end 16 of the mold blanks 12.

In the embodiment illustrated in FIGS. 2a and 2b, two mold blanks 12 are placed together, and each mold blank 12 is coupled to a handle retainer 24, which is coupled to a handle 26. However, it is possible that neither mold blank 12, or only one mold blank 12, is coupled to a handle retainer 24, or to a handle 26. In some embodiments, a hinge bracket 20 is coupled to the hinge end 14 of one of the mold blanks 12. There may be hinge brackets 20 coupled to both mold blanks 12.

With respect to FIG. 2b, hidden lines illustrate the mechanisms which may be used to couple the individual components together. For instance, a pair of handle screws 30 may couple the handle retainer 24 to the mold blank 12. According to some embodiments, a threaded rod 32 couples the handle 26 to the handle retainer 24. In other embodiments not illustrated herein, the threaded rod 32 may couple the handle 26 directly to the mold blank 12.

Pairs of handle screws 30 and threaded rods 32 are shown coupling two handles 26 to two handle retainers 24, which are in turn coupled to each mold blank 12. However, as discussed in FIG. 2a, there could be no handles 26 or handle retainers 24, or one handle 26 and handle retainer 24, in which case the appropriate number of pairs of handle screws 30 and threaded rods 32 would be used. In some embodiments, hinge screws 38 are used to couple the hinge brackets 20 to the mold blanks 12. The hinge brackets 20 may additionally be rotably coupled to one another by a hinge pin 22 that passes through a central hole of each.

Figure 3A:
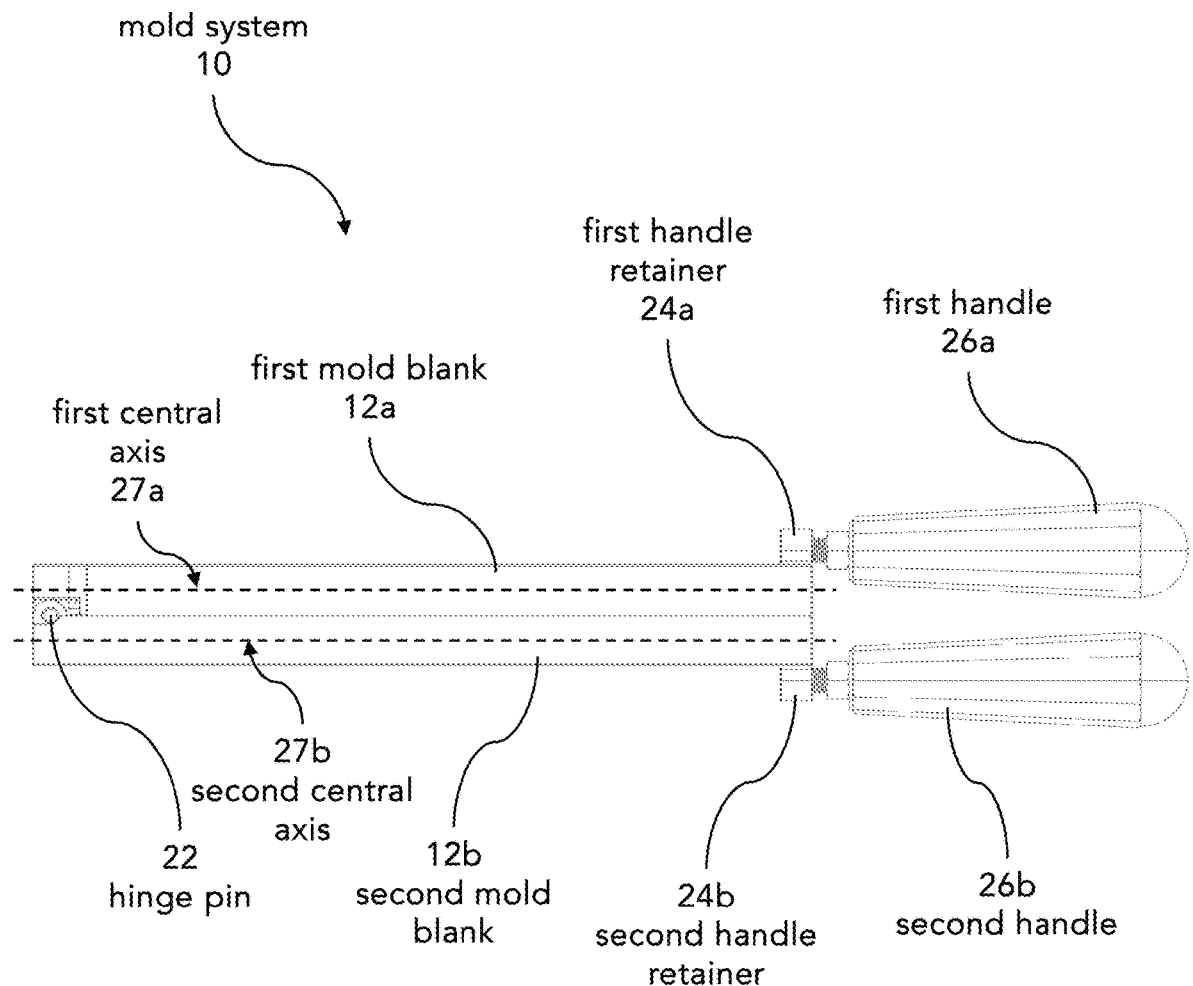
FIG. 3a illustrates a side view of the mold system in a closed position, according to some embodiments.
Figure 3B:
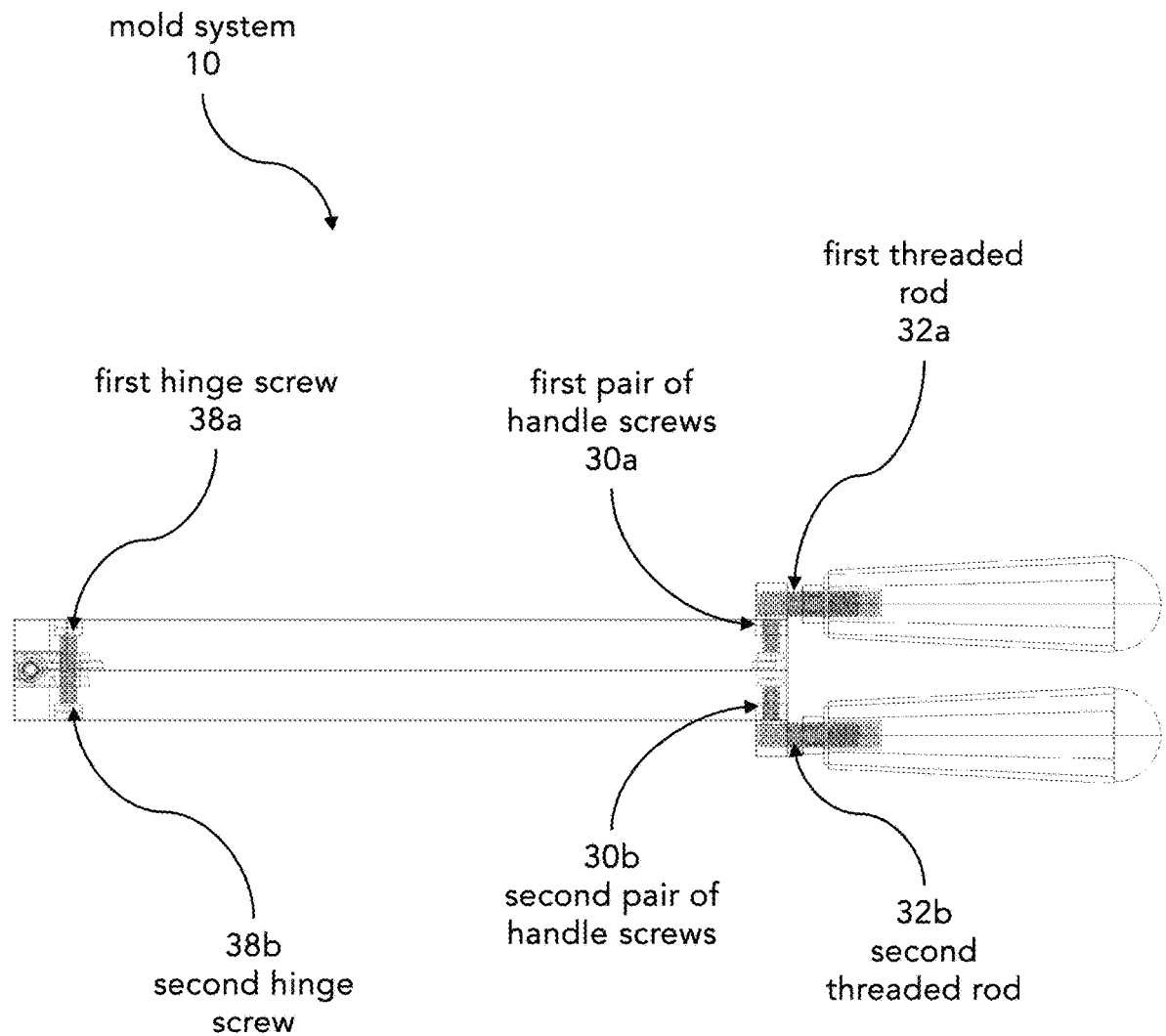
FIG. 3b illustrates a side view of the mold system in a closed position with hidden lines displayed, according to some embodiments.

FIGS. 3a and 3b illustrate a side view of the mold system 10 in a closed position. The side view of FIG. 3a illustrates what the mold system 10 may look like to an outside observer. According to some embodiments, the mold system 10 comprises a first mold blank 12a and a second mold blank 12b. A first handle retainer 24a may be coupled to the first mold blank 12a, and a first handle 26a may be coupled to the first handle retainer 24a. A second handle retainer 24b may be coupled to the second mold blank 12b, and a second handle 26b may be coupled to the second handle retainer 24b.

According to some embodiments, the first handle retainer 24a and the second handle retainer 24b are not needed, and the first handle 26a couples to the first mold blank 12a, and the second handle 26b couples to the second mold blank 12b. As discussed in FIG. 2a, any number of handles 26 and handle retainers 24 between zero and two may be present in the mold system 10. Additionally, FIG. 3a illustrates a side view of the hinge pin 22 passing through hinge brackets 20 that may not be seen from the outside, as is the case in this illustration.

A first central axis 27a is illustrated passing through the center of the first mold blank 12a along its length. The first handle 26a may be offset in relation to this first central axis 27a to permit a user easier grasp and control of the first handle 26a. Likewise, a second central axis 27b is illustrated passing through the center of the second mold blank 12b along its length. The second handle 26b may be offset in relation this second central axis 27b to permit a user easier grasp and control of the second handle 26b.

With respect to FIG. 3b, hidden lines again illustrate the mechanism which may be used to couple the individual components together. For instance, a first pair of handle screws 30a may couple the first handle retainer 24a to the first mold blank 12a. According to some embodiments, a first threaded rod 32a couples the first handle 26a to the first handle retainer 24a. In other embodiments not illustrated herein, the first threaded rod 32a couples the first handle 26a directly to the first mold blank 12a. Likewise, the second threaded rod 32b may couple the second handle 26b directly to the second mold blank 12b.

As discussed in FIG. 3a, if there are zero or one handle retainer 24 and/or handle 26 present in the mold system 10, only the appropriate pair of screws 30 and threaded rods 32 may be used. The handle assembly as a whole is further illustrated and discussed in FIGS. 8a and 8b. FIG. 3b also illustrates a possible coupling mechanism for the hinge brackets 20, being a first hinge screw 38a and a second hinge screw 38b. This coupling mechanism is explored in greater depth in FIGS. 15 and 16.

To permit the hinge screw 38 to enter the mold blank 12 and be hidden, but not pass completely through the mold blank 12, the hole the hinge screw 38 enters may be counterbored. This counterbore may be 0.25" and have a diameter of 0.406". According to some embodiments, the diameter of the portion of this hole that is not counterbored is 0.25", permitting the hinge screw 38 to access the hinge bracket 20.

Figure 4A:
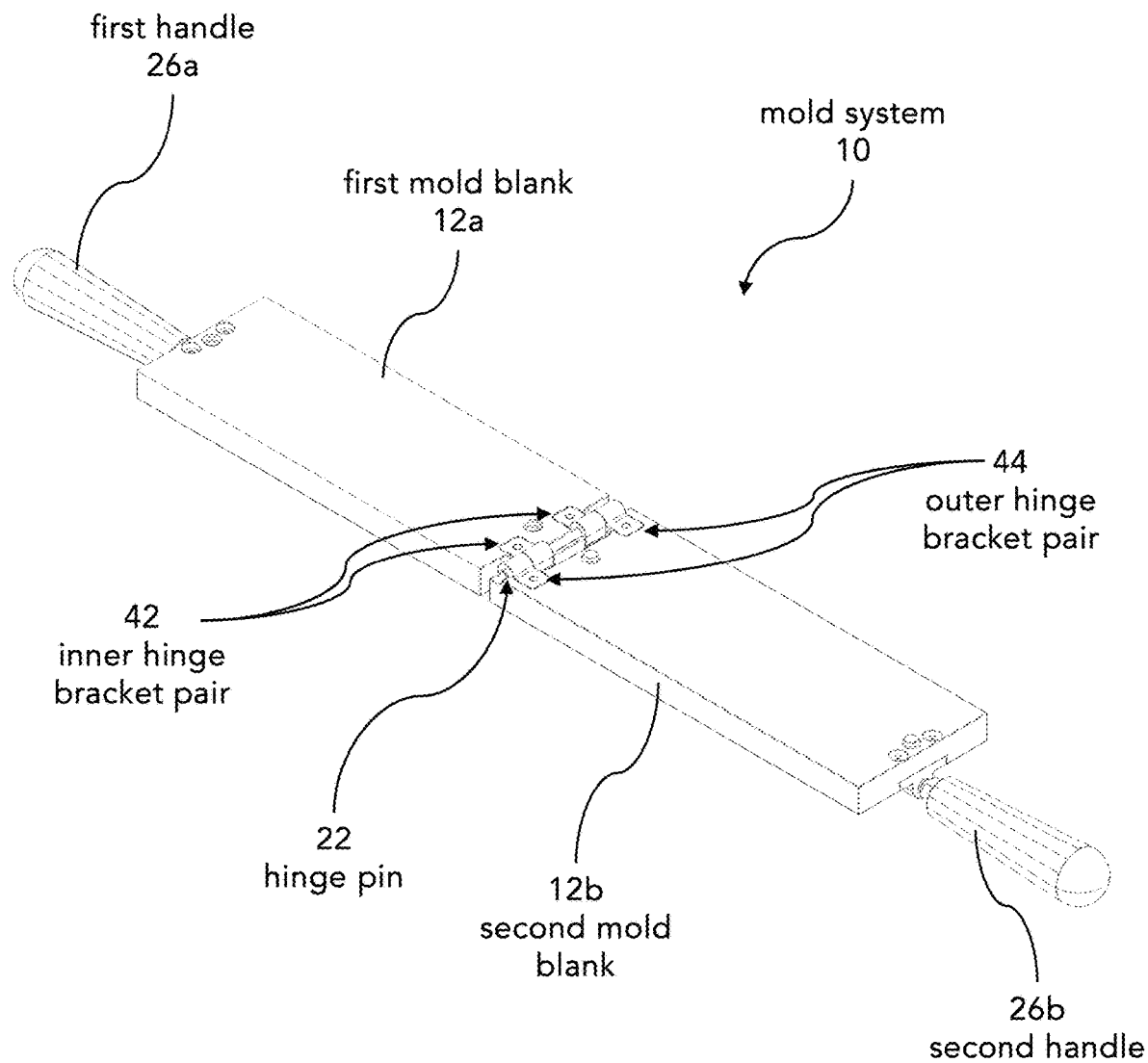
FIG. 4a illustrates a profile view of the mold system in an open position, according to some embodiments.
Figure 4B:
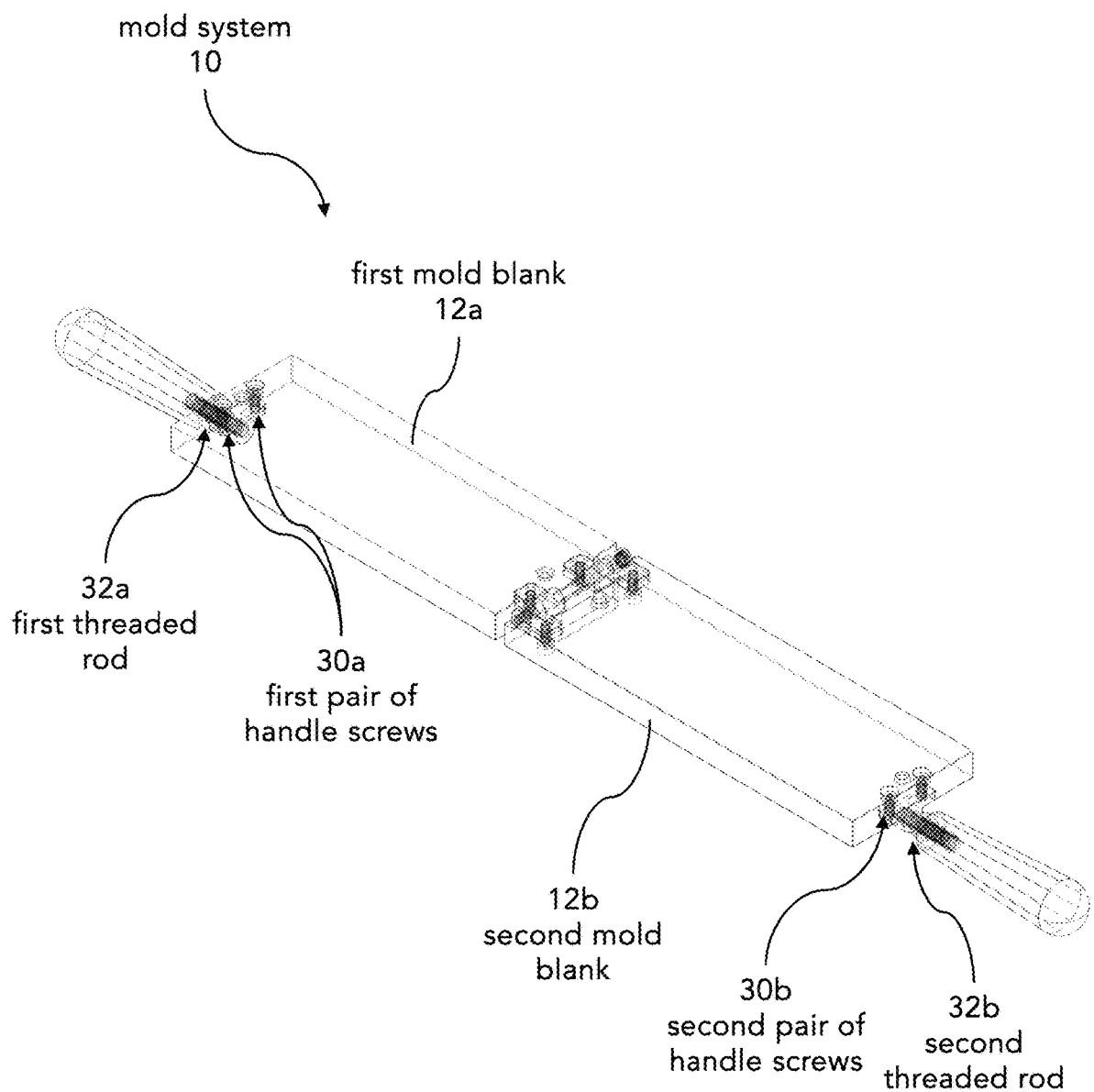
FIG. 4b illustrates a profile view of the mold system in an open position with hidden lines displayed, according to some embodiments.

FIGS. 4a and 4b illustrate a profile view of the mold system 10 in an open position. FIG. 4a illustrates what the mold system 10 may look like to an outside observer. FIG. 4b uses hidden lines to illustrate the mechanisms by which individual components may be coupled together. Of note in FIGS. 4a and 4b is the possibility of having an inner hinge bracket pair 42 and an outer hinge bracket pair 44. The hinge pin 22 may pass through a central hole of each hinge bracket 20 of the inner hinge bracket pair 42 and the outer hinge bracket pair 44, thereby rotably coupling the hinge brackets 20 to one another, and allowing the first mold blank 12a and the second mold blank 12b to close upon one another.

Figure 5:
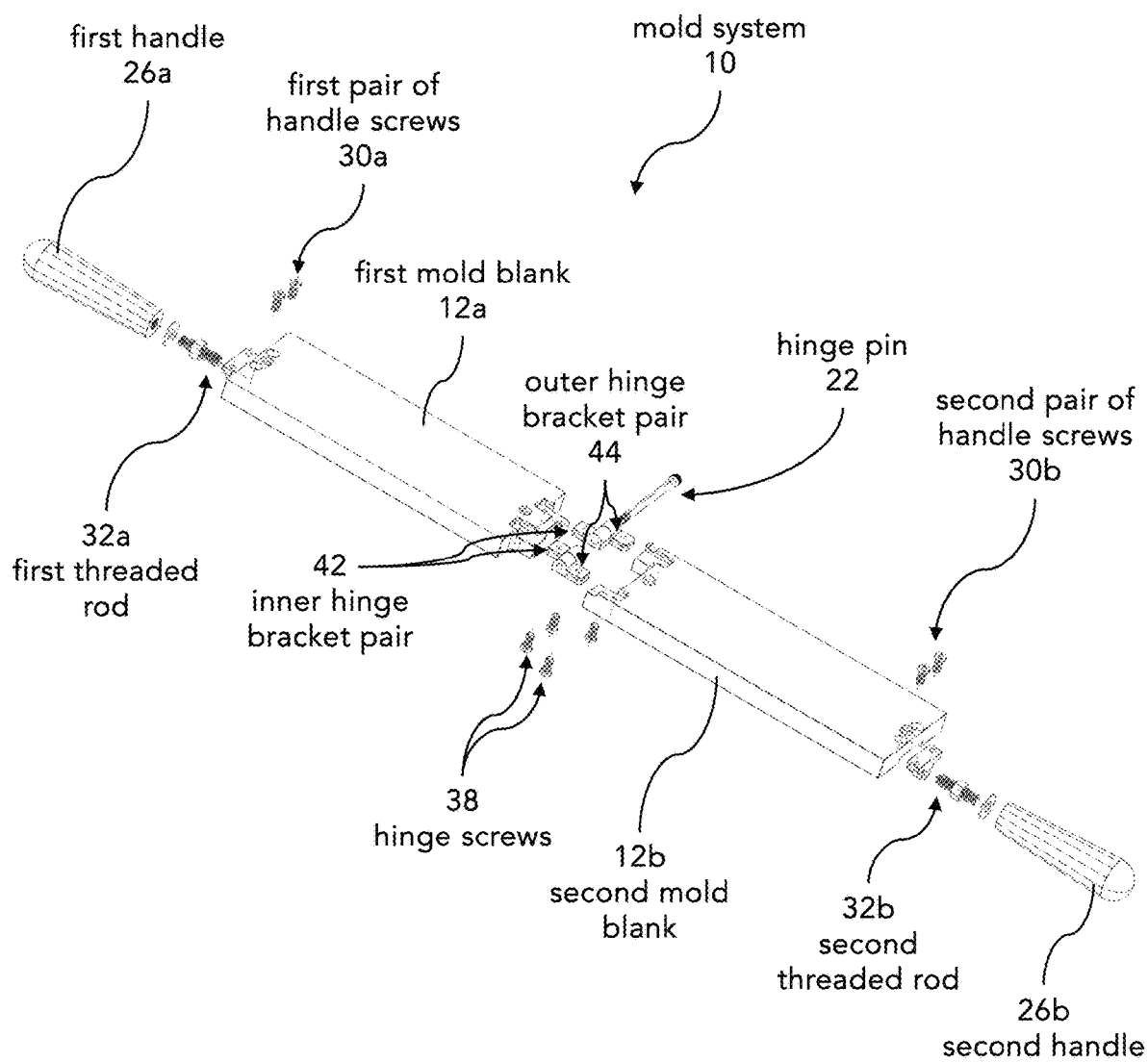
FIG. 5 illustrates an exploded profile view of the mold system, according to some embodiments.

FIG. 5 illustrates an exploded profile view of the mold system 10 in an open position. The mold system 10 comprises all of the elements explored thus far in this embodiment. In some embodiments, at the first handle end 16a, a first handle 26a couples to a first threaded rod 32a. The distance that the first threaded rod 32a enters the first handle 26a may be governed by a first hex nut 34a. According to some embodiments, the first threaded rod 32a couples to the first handle retainer 24a on the side opposite the first handle 26a. The first handle retainer 24a may couple to the first mold blank 12a through the use of a first pair of handle screws 30a.

Moving to the first hinge end 14a, an embodiment of the mold system 10 is shown where the first hinge bracket 20 comprises an inner hinge bracket pair 42. The inner hinge bracket pair may couple to the first mold blank 12a through the use of a first hinge screw 38a.

According to some embodiments, at the other side of the mold system 10, at the second handle end 16b, a second handle 26b couples to a second threaded rod 32b. The distance that second threaded rod 32b enters the second handle 26b may be governed by a second hex nut 34b. In some embodiments, the second threaded rod 32b couples to the second handle retainer 24b on the side opposite the second handle 26b. According to some embodiments, the second handle retainer 24b couples to the second mold blank 12b through the use of a second pair of handle screws 30b.

Looking to the second hinge end 14b, an embodiment of the mold system 10 is shown where the second hinge bracket 20 comprises an outer hinge bracket pair 44. The outer hinge bracket pair 44 may couple to the second mold blank 12b through the use of a second hinge screw 38b. The first hinge end 14a and the second hinge end 14b may rotably couple to one another through the use of a hinge pin 22 that enters through central holes of each hinge bracket 20 in the inner hinge bracket pair 42 and the outer hinge bracket pair 44, thus allowing the first mold blank 12a and the second mold blank 12b to open and close.

Figure 6A:
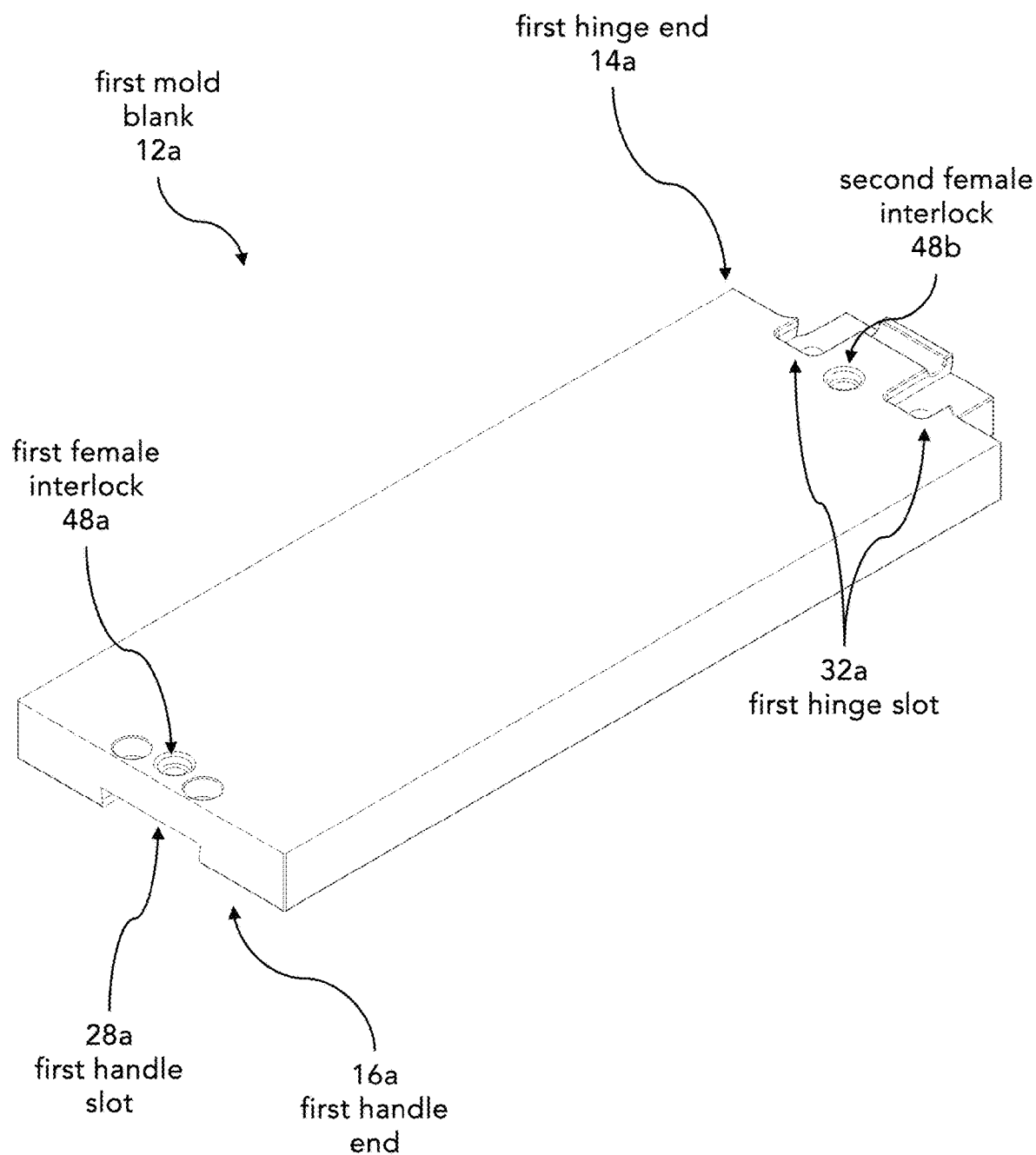
FIG. 6a illustrates a profile view of a first mold blank with hidden lines displayed, according to some embodiments.
Figure 6B:
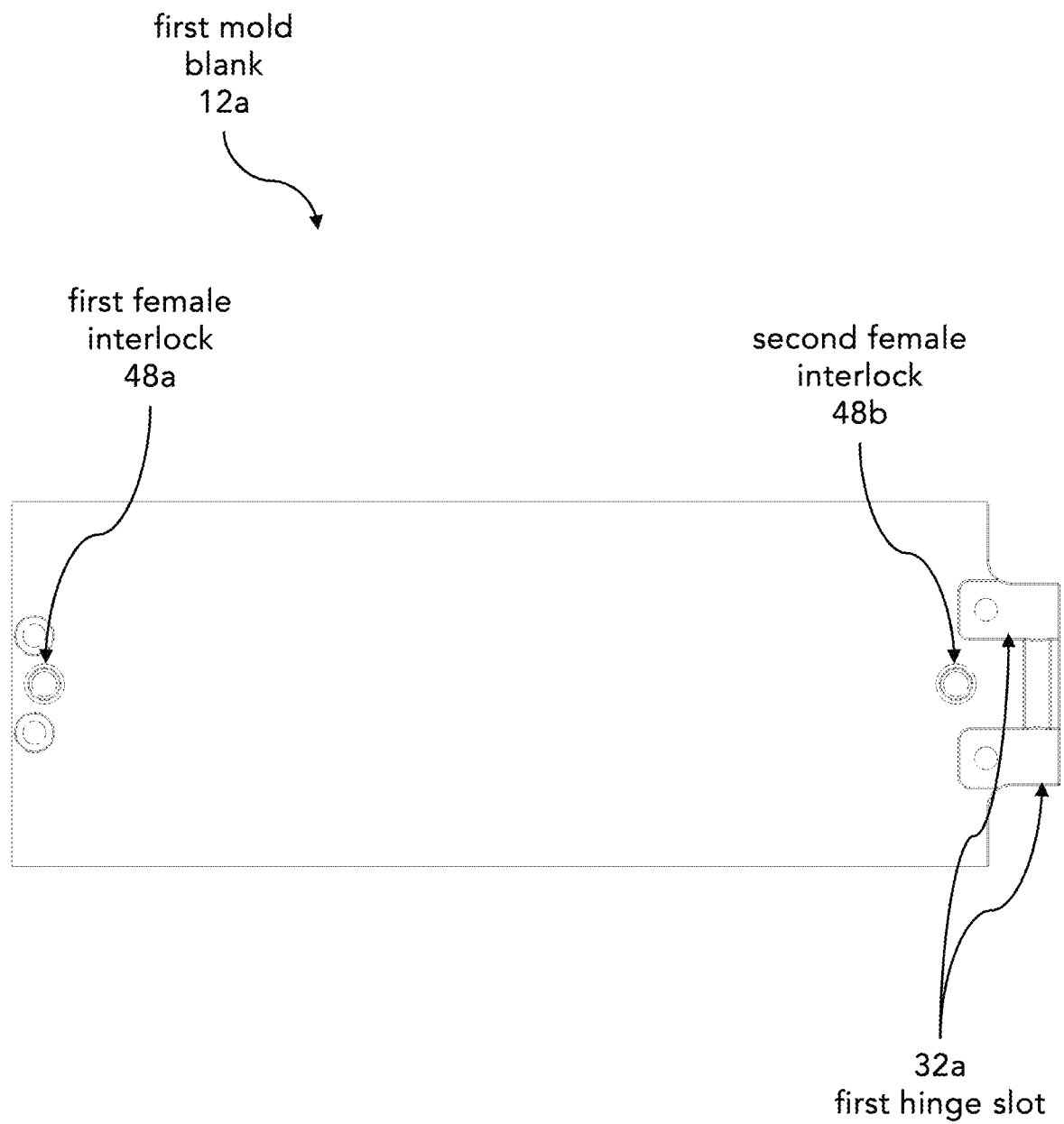
FIG. 6b illustrates a top view of the first mold blank, according to some embodiments.
Figure 6C:
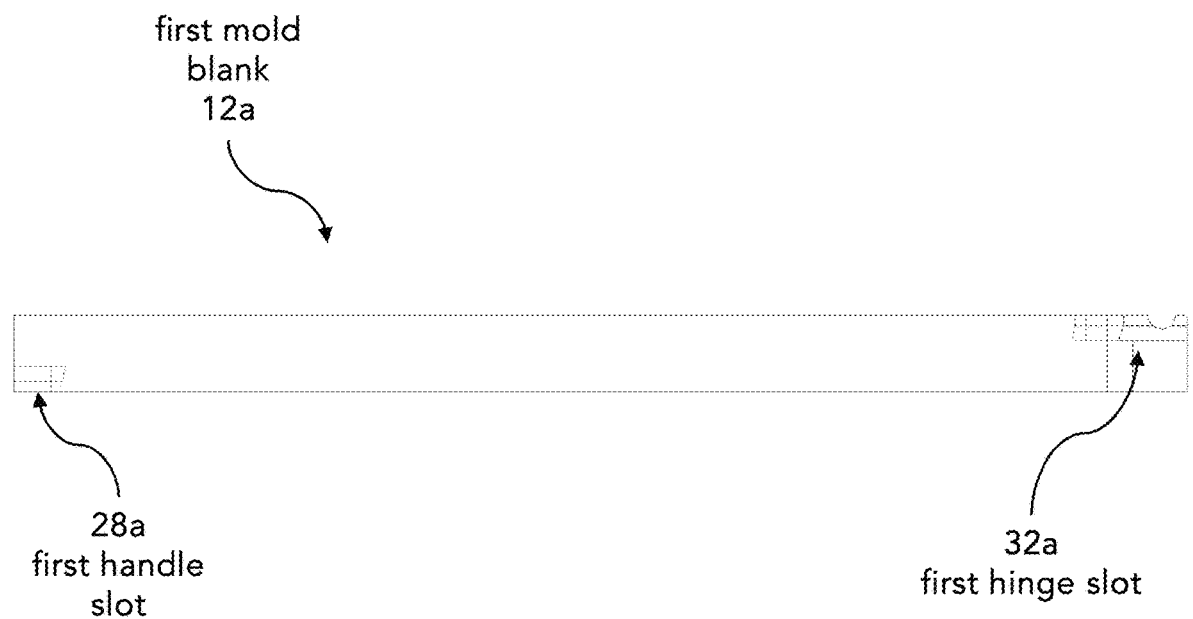
FIG. 6c illustrates a side view of the first mold blank with some hidden lines displayed, according to some embodiments.
Figure 6D:
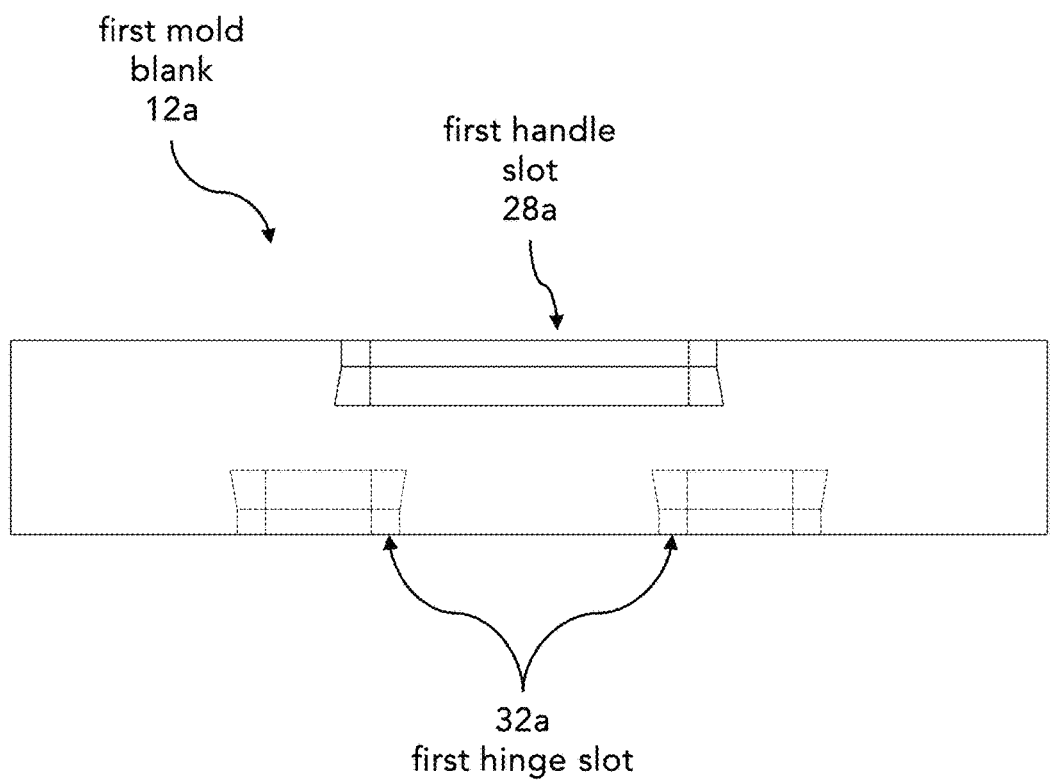
FIG. 6d illustrates a front view of the first mold blank with some hidden lines displayed, according to some embodiments.

FIGS. 6a, 6b, 6c, and 6d illustrate various views of a first mold blank 12a. FIG. 6a illustrates a profile view, FIG. 6b illustrates a top view, FIG. 6c illustrates a side view, and FIG. 6d illustrates a front view of the first mold blank 12a. While it is labeled as the first mold blank 12a in these figures, it should be noted that it could also be considered the second mold blank 12b, and none of the specific features present in these illustrations are what qualify the embodied mold blank 12 to be the first mold blank 12a.

With respect to FIGS. 6a and 6b, a first female interlock 48a may be located on the first handle end 16a. Likewise, a second female interlock 48b may be located on the first hinge end 14a. These locations may be swapped—there is no reason why the first female interlock 48a could not be present on the first hinge end 14a, and the second female interlock 48b located on the first handle end 16a.

As illustrated in FIGS. 6a-6d, a first hinge slot 18a, which refers to any slot on the first hinge end 14a that is intended for facilitation of coupling a second hinge bracket 20 or hinge bracket pair (either inner hinge bracket pair 42 or outer hinge bracket pair 44) may be machined into the first mold blank 12a. Likewise, a first handle slot 28a, which refers to any slot on the first handle end 16a that is intended for facilitation of coupling either a first handle retainer 24a or a first handle 26a may be machined into the first mold blank 12a.

According to some embodiments of FIG. 6c, the overall length of the first mold blank 12a is 10.7188" before taking into account the fittings for insertion of the hinge brackets 20. The width of the fitting for insertion of the hinge brackets 20 may be 2.218" In some embodiments of FIG. 6d, the overall width of the first mold blank 12a is 4". As illustrated in both FIGS. 6c and 6d, the thickness of the first mold blank 12a may be 0.75". The thickness may vary based on manufacturer preference, and the thickness may dictate how large of a cavity may be machined into the first mold blank 12a.

Figure 7A:
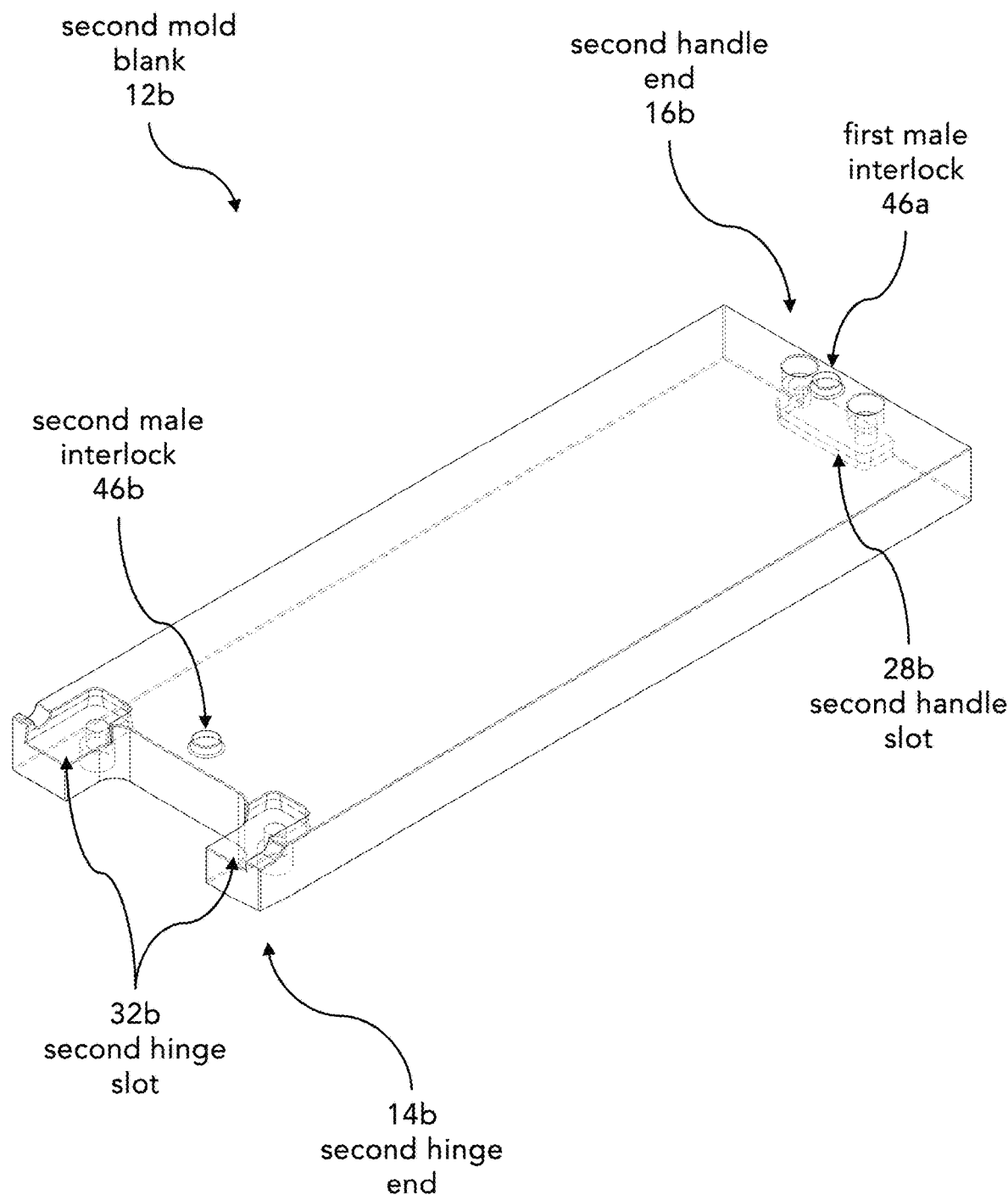
FIG. 7a illustrates a profile view of a second mold blank with hidden lines displayed, according to some embodiments.
Figure 7B:
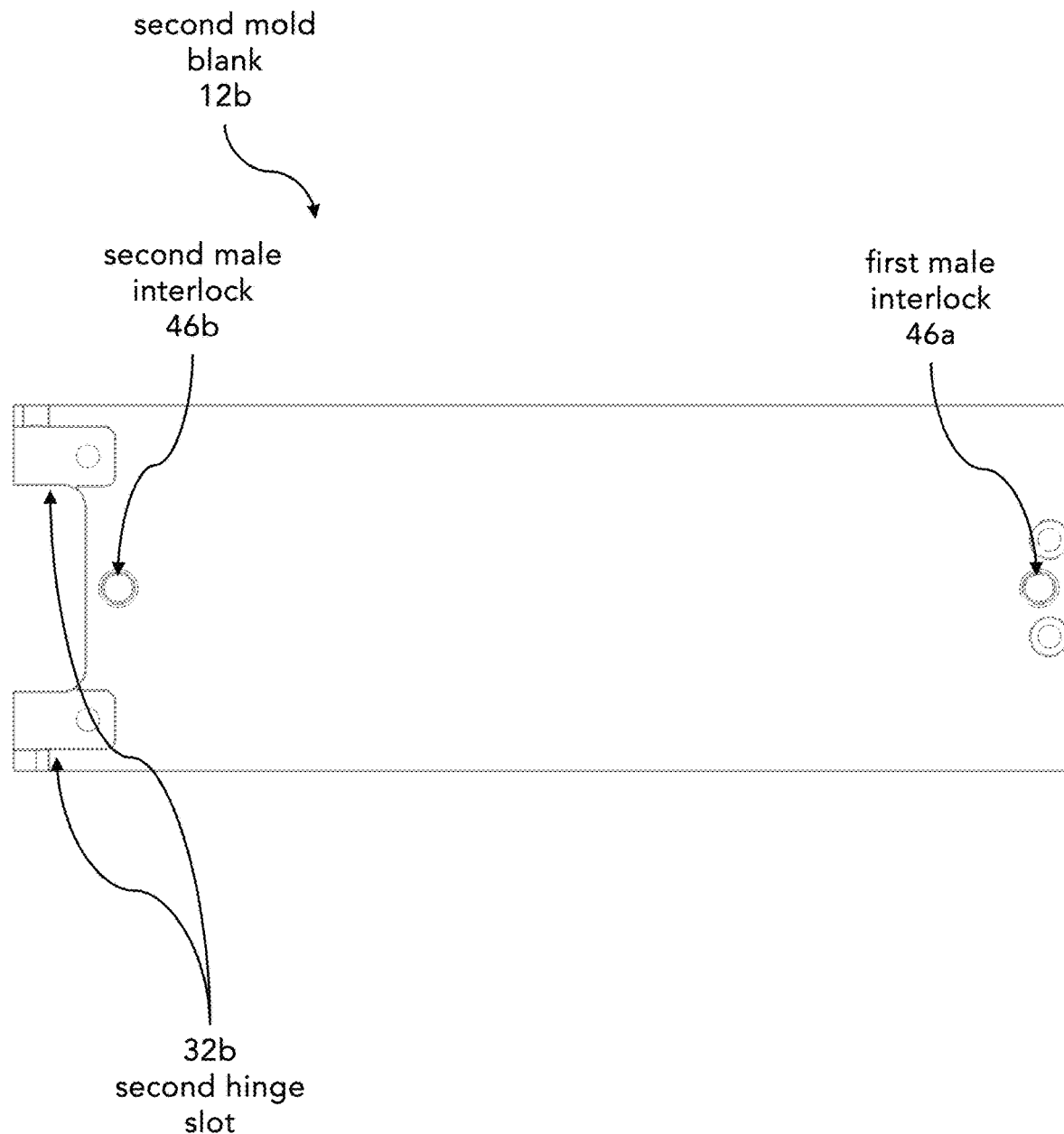
FIG. 7b illustrates a top view of the second mold blank, according to some embodiments.
Figure 7C:
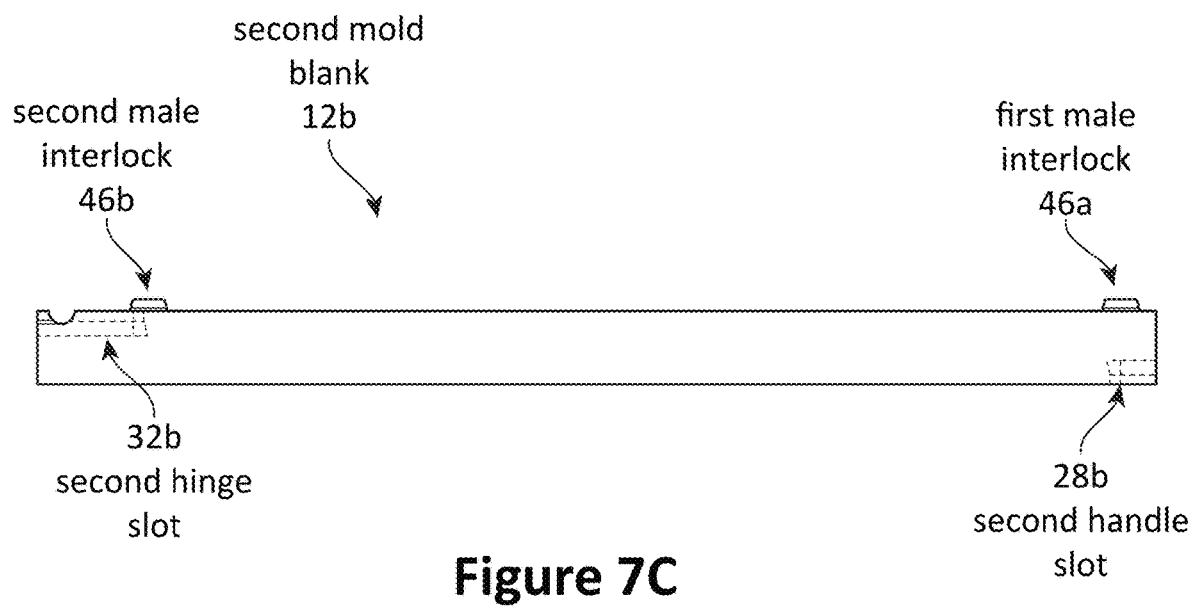
FIG. 7c illustrates a side view of the second mold blank with some hidden lines displayed, according to some embodiments.
Figure 7D:
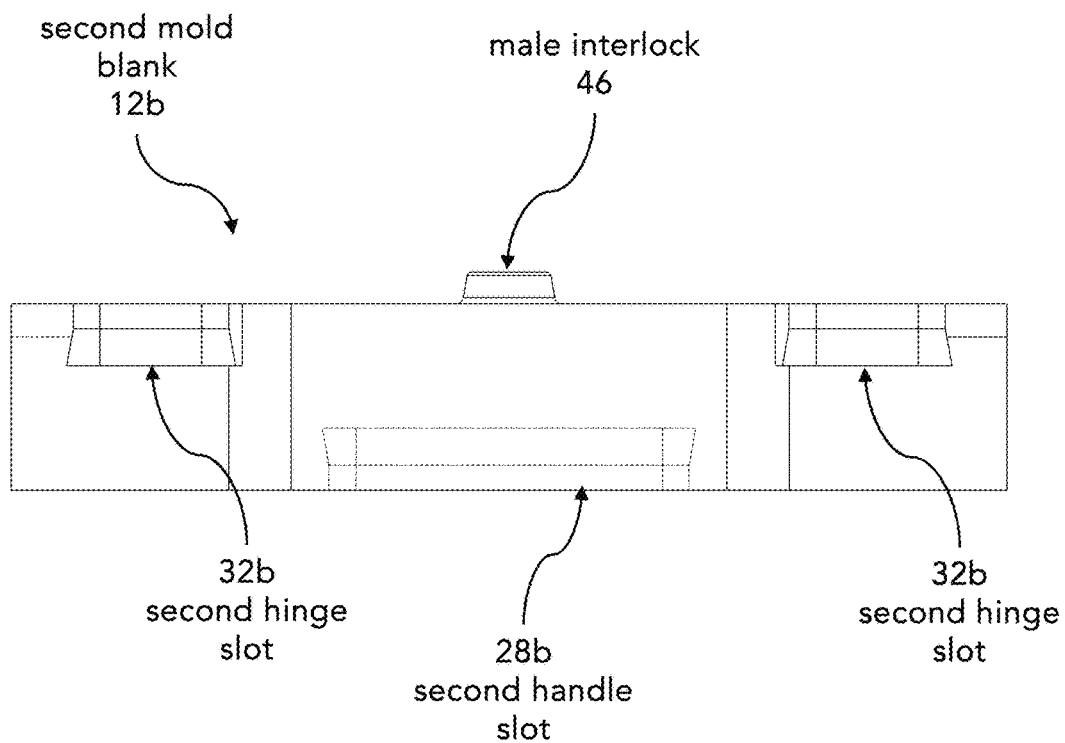
FIG. 7d illustrates a front view of the second mold blank with some hidden lines displayed, according to some embodiments.

FIGS. 7a, 7b, 7c, and 7d illustrate various views of a second mold blank 12b. FIG. 7a illustrates a profile view, FIG. 7b illustrates a top view, FIG. 7c illustrates a side view, and FIG. 7d illustrates a front view of the second mold blank 12b. Similar to FIGS. 6a-6d, while FIGS. 7a-7d label the mold blank 12 the second mold blank 12b, it should be noted that it could also be considered the first mold blank 12a, and none of the specific features present in these illustrations are what qualify the embodied mold blank 12 to be the second mold blank 12b.

With respect to FIGS. 7a-7d, a first male interlock 46a may be located on the second handle end 16b. Likewise, a second male interlock 46b may be located on the second hinge end 14b. As in FIGS. 6a-6d, these locations may be swapped—there is no reason why the first male interlock 46a could not be located on the second hinge end 14b, and the second male interlock 46b located on the second handle end 16b.

Also illustrated in this embodiment are a second hinge slot 18b, which refers to any slot on the second hinge end 14b that is intended for facilitation of coupling a second hinge bracket 20 or hinge bracket pair (either inner hinge bracket pair 42 or outer hinge bracket pair 44) to the second mold blank 12b, as well as a second handle slot 28b, which refers to any slot on the second handle end 16b that is intended for facilitation of coupling either a second handle retainer 24b or a second handle 26b to the second mold blank 12b.

According to some embodiments of FIG. 7c, the overall length of the second mold blank 12b is 11.5". In some embodiments of FIG. 7d, the overall width of the second mold blank 12b is 4". As illustrated in both FIGS. 7c and 7d, the thickness of the second mold blank 12b may be 0.75". The thickness may vary based on manufacturer preference, and the thickness may dictate how large of a cavity may be machined into the second mold blank 12b.

While not illustrated in FIGS. 7a-7d, some embodiments of the mold system 10 include a roll pin detachably coupled to the second mold blank 12b. This roll pin may contain threading to facilitate securement to the second mold blank 12b. According to some embodiments, the location of the roll pin is at the second hinge end 14b, substantially adjacent to the slot that receives the hinge pin 22. In some embodiments, the slot in the second mold blank 12b that receives the roll pin is substantially perpendicular to the orientation of the hinge pin 22. The roll pin may provide resistance to at least partially prevent the hinge pin 22 from lateral movement. In these embodiments, the roll pin acts as an additional safety measure, should all hinges fail.

Figure 8A:
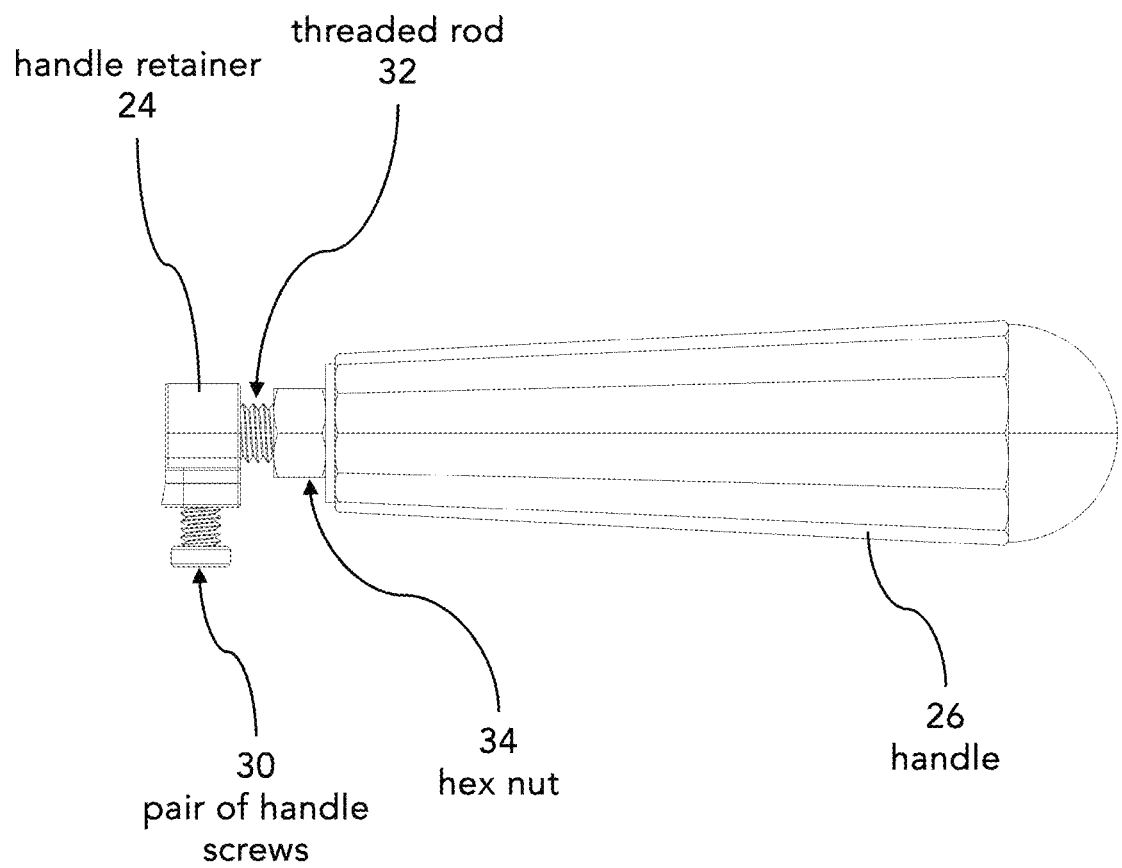
FIG. 8a illustrates a side view of a handle assembly, according to some embodiments.
Figure 8B:
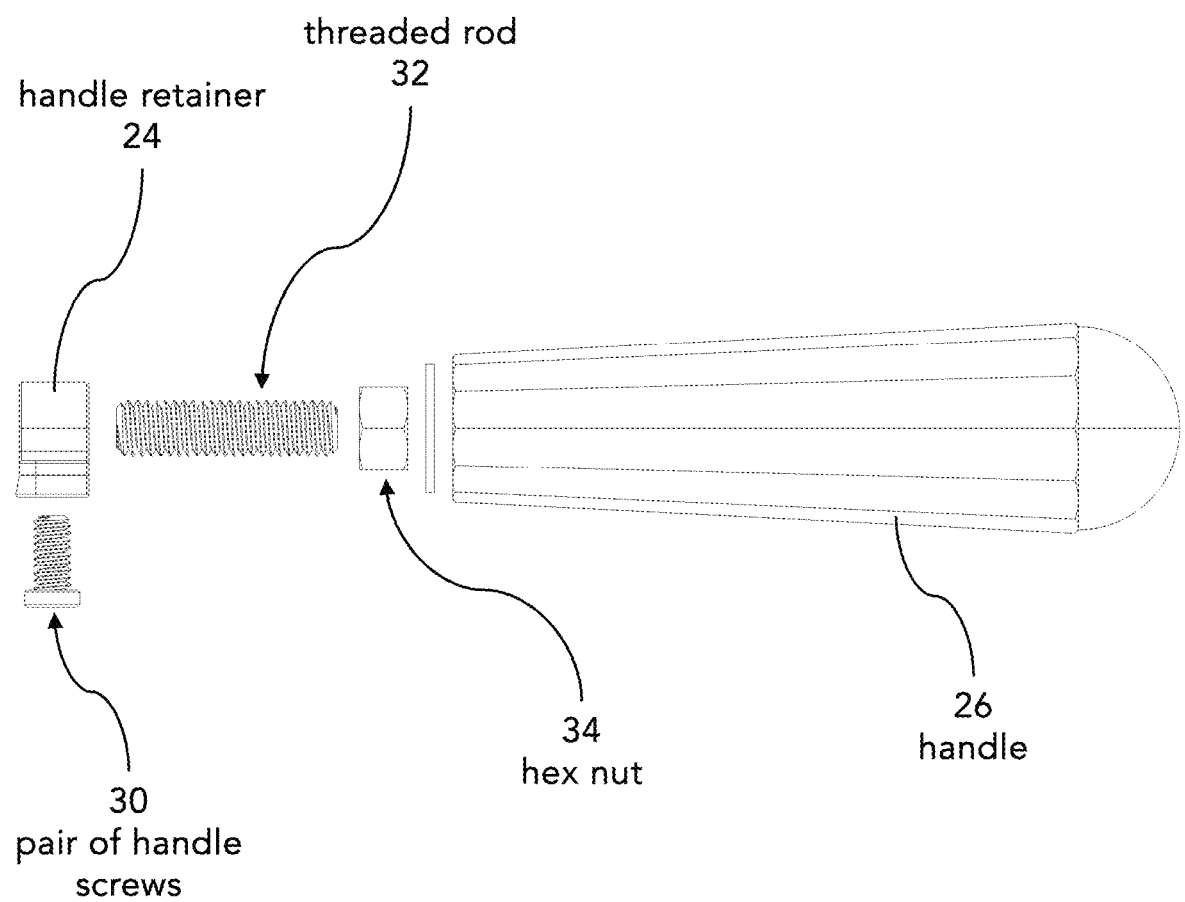
FIG. 8b illustrates an exploded side view of a handle assembly, according to some embodiments.

FIGS. 8a and 8b illustrate a side view of the handle assembly. FIG. 8a illustrates the handle assembly as it may appear when fully coupled, and FIG. 8b illustrates an exploded view of the handle assembly. The handle assembly may comprise a handle 26 which is coupled to a handle retainer 24 by a threaded rod 32. A hex nut 34 may be threadably coupled to the threaded rod 32 to govern how far threaded rod 32 may enter the handle 26. The handle retainer 24 may be coupled to a mold blank 12 by a pair of handle screws 30. In other embodiments, not illustrated herein, the handle 26 may be coupled directly to a mold blank 12 by the threaded rod 32, removing the need for the handle retainer 24 and the pair of handle screws 30.

Figure 9:
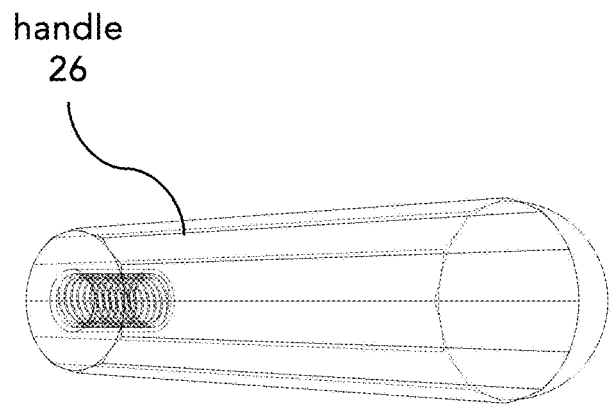
FIG. 9 illustrates a profile view of a handle, according to some embodiments.
Figure 10:
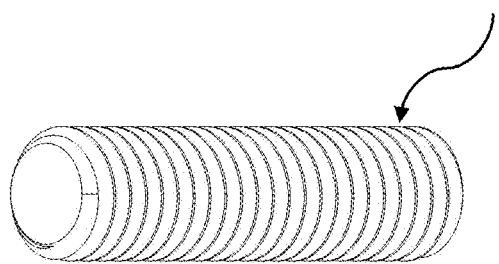
FIG. 10 illustrates a profile view of a threaded rod, according to some embodiments.
Figure 11:
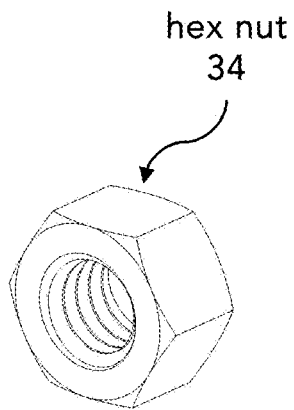
FIG. 11 illustrates a profile view of a hex nut, according to some embodiments.
Figure 12:
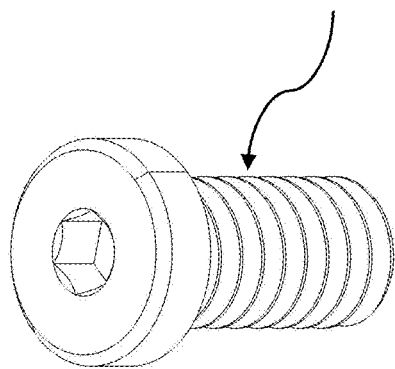
FIG. 12 illustrates a profile view of one of a pair of handle screws, according to some embodiments.

FIGS. 9-12 illustrate profile views of components of the handle assembly. FIG. 9 illustrates the handle 26 with hidden lines, showing the slot into which the threaded rod 32 may be inserted. The handle 26 in this embodiments displays a tapered profile with flat faces down the length of the handle 26, which may facilitate the grip of an end user. FIG. 10 illustrates an embodiment of a threaded rod 32. FIG. 11 illustrates an embodiment of a hex nut 34. FIG. 12 illustrates an embodiment of one of a pair of handle screws 30.

The handle 26 as illustrated in FIG. 9 may have an overall length of 0.49688". According to some embodiments, the diameter of the handle 26 at its widest point is 1.4212". In some embodiments, the handle 26 comprises a ⅜-16 thread for receiving the threaded rod 32. The handle 26 may taper to as narrow as is desired, so long as it is still capable of being threaded for receiving the threaded rod 32.

The threaded rod as illustrated in FIG. 10 may have an overall length of 1.5". According to some embodiments, the threaded rod comprises a ⅜-16 thread for coupling the handle 26 to the handle retainer 24. In some embodiments, the threaded rod has a diameter of 0.375", but this diameter can change with the size of the threading used.

The hex nut 34 as illustrated in FIG. 11 may have a length of 0.5625" and a height of 0.3281". According to some embodiments, the hex nut 34 has a ⅜-16 thread for receiving the threaded rod 32.

The pair of handle screws 30 may have a threaded length of 0.5", and a head length of 0.127". According to some embodiments, the pair of headed screws have a head diameter of 0.375", and a ¼-20 thread for coupling the handle retainer 24 to the mold blank 12.

Figure 13A:
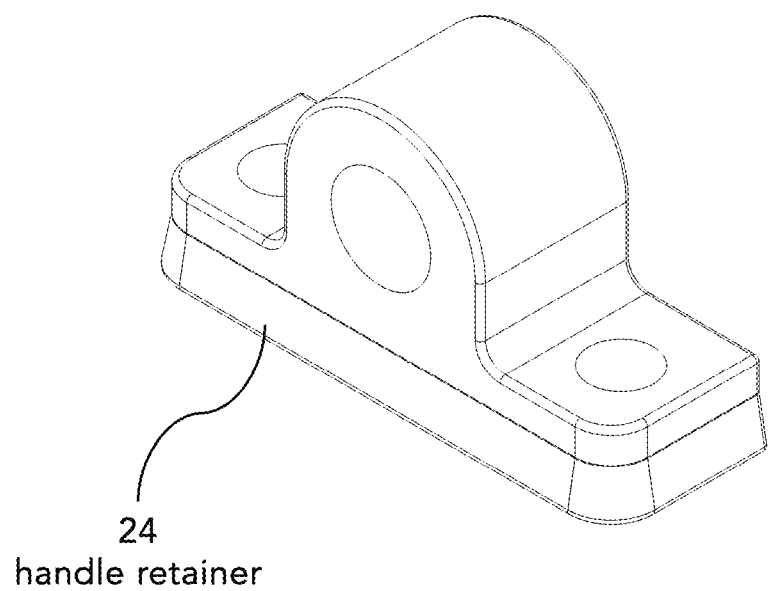
FIG. 13a illustrates a profile view of a handle retainer, according to some embodiments.
Figure 13B:
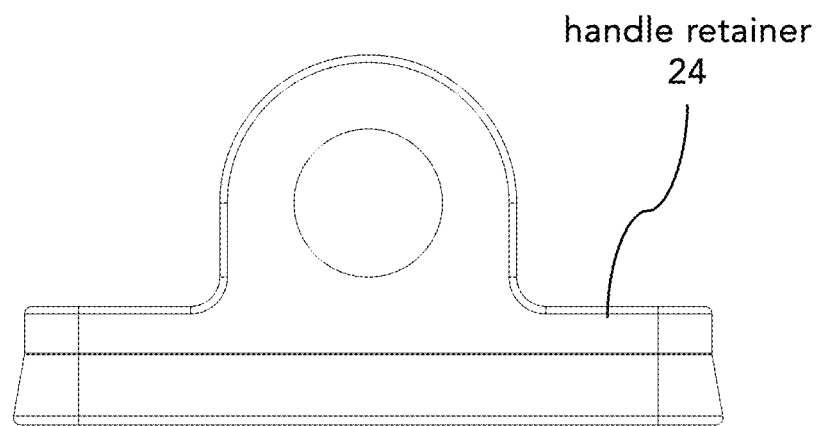
FIG. 13b illustrates a front view of the handle retainer, according to some embodiments.
Figure 13C:
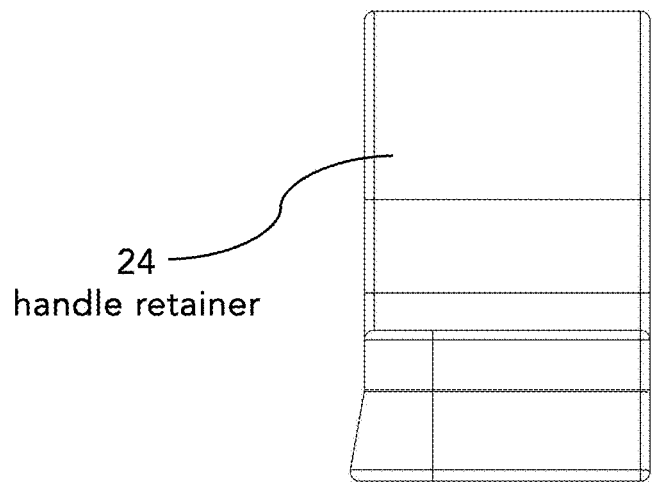
FIG. 13c illustrates a side view of the handle retainer, according to some embodiments.
Figure 13D:
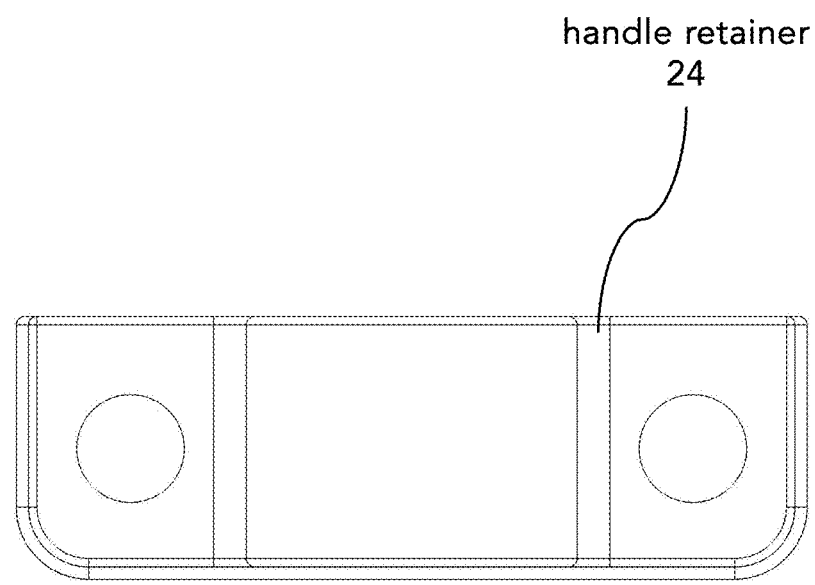
FIG. 13d illustrates a top view of the handle retainer, according to some embodiments.

FIGS. 13a-13d illustrate various views of the handle retainer 24. FIG. 13a illustrates a profile view, FIG. 13b illustrates a front view, FIG. 13c illustrates a side view, and FIG. 13d illustrates a top view of the handle retainer 24. The hole illustrated head on in FIG. 13b is where the threaded rod 32 may be inserted for coupling the handle 26 to the handle retainer 24. The holes illustrated head on in FIG. 13d is where the pair of handle screws 30 may be inserted for coupling the handle retainer 24 to the mold blank 12. According to some embodiments, the bottom portion of the handle retainer 24 has a tapered base. This tapered base is illustrated and discussed in further depth in FIGS. 14a-14d.

According to some embodiments, the top portion of the handle retainer 24 which contains the hole for receiving the threaded rod 32 as illustrated in FIG. 13b has a radius of 0.3125". In order to receive the threaded rod 32, this hole may comprise a ⅜-16 thread. The height of the handle retainer 24 may be 0.7805". In some embodiments, the height of the base of the handle retainer may be 0.25", and the height of the retaining portion including the hole for receiving the threaded rod 32 may be 0.5305".

The embodiment of the handle retainer 24 as illustrated in FIG. 13d may have a total length of 1.4471". The distance between holes for receiving the pair of handle screws 30 may be 1.062". According to some embodiments, these holes are 0.25" from the front of the handle retainer 24, and comprise a ¼-20 thread for receiving the pair of handle screws 30. In some embodiments, the back portion of the base of the handle retainer 24 has a curvature of radius 0.1136".

Figure 14A:
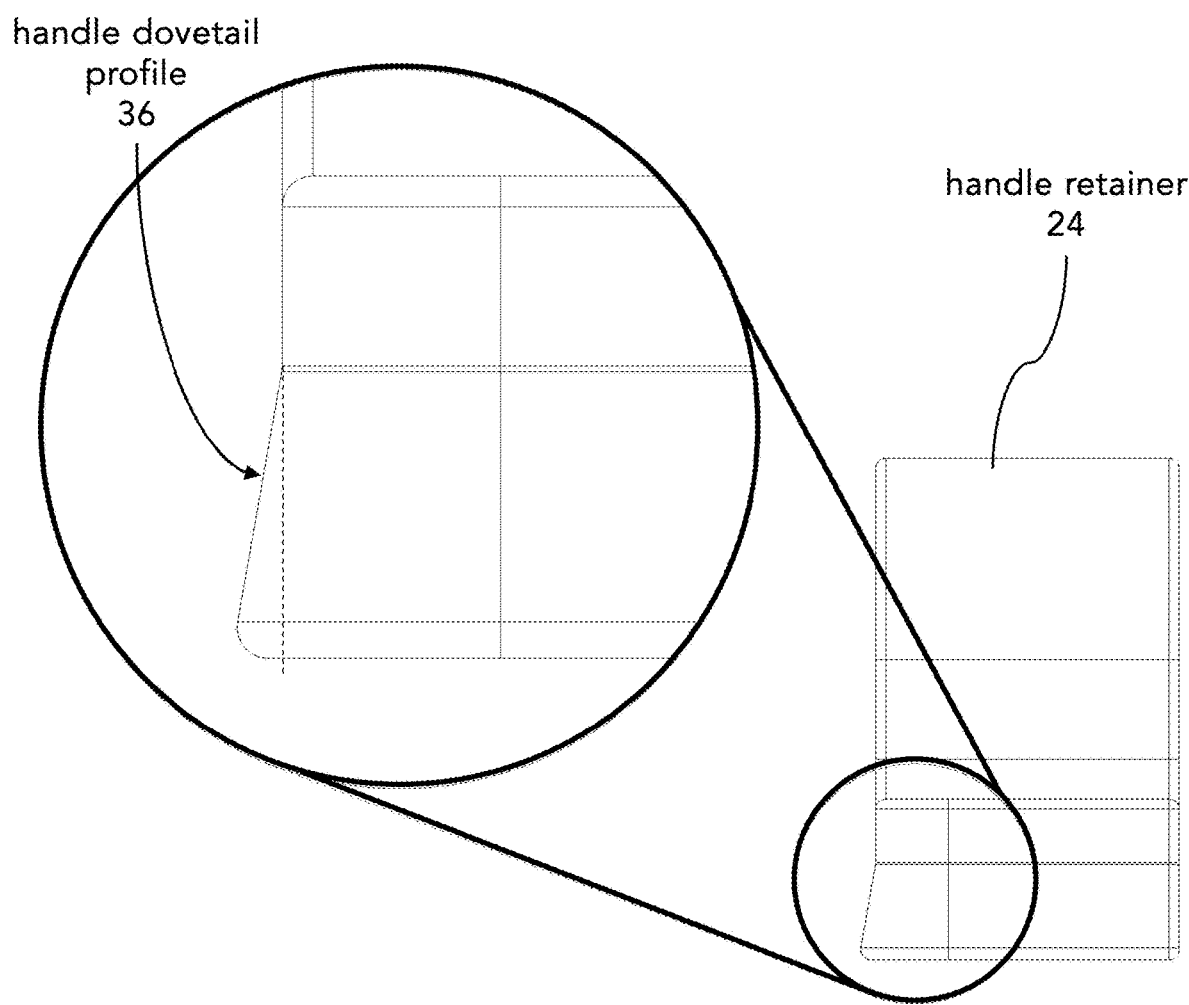
FIG. 14a illustrates a side view of a male side of a handle dovetail profile, according to some embodiments.
Figure 14B:
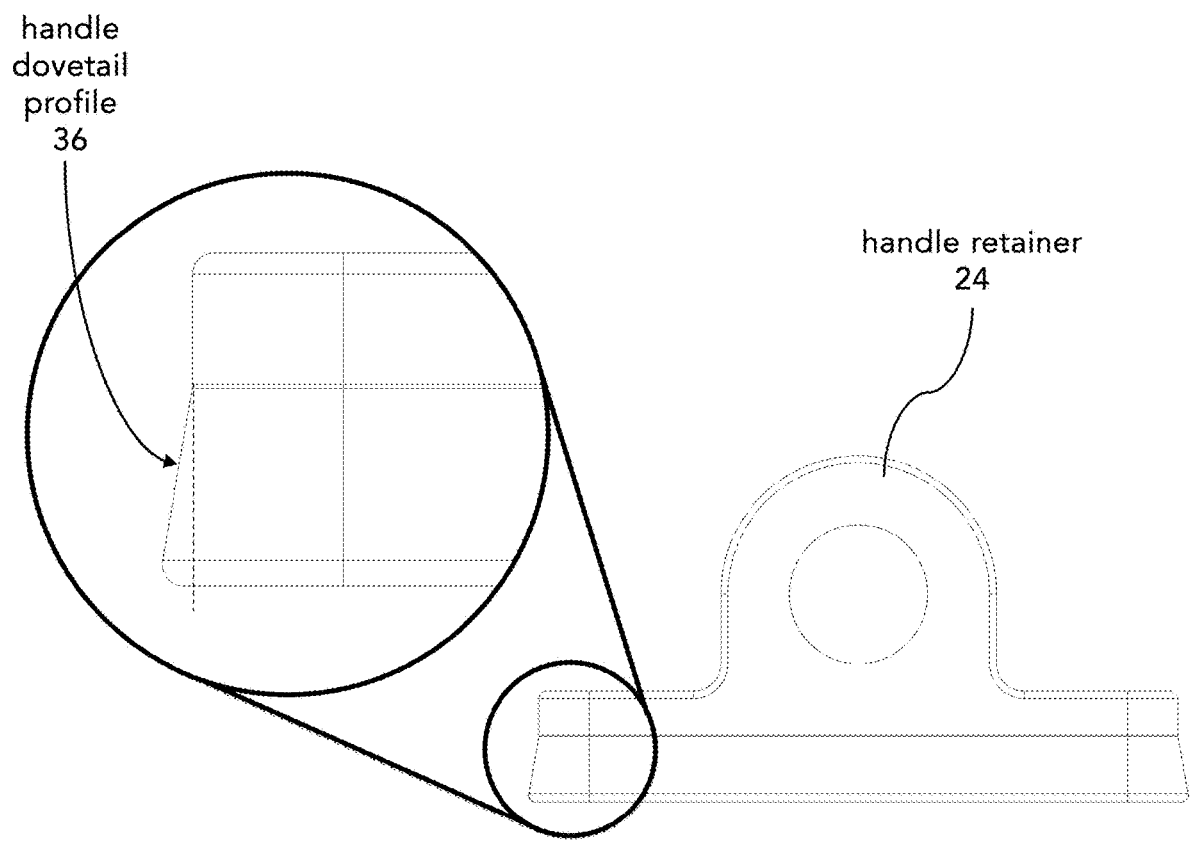
FIG. 14b illustrates a front view of the male side of the handle dovetail profile, according to some embodiments.
Figure 14C:
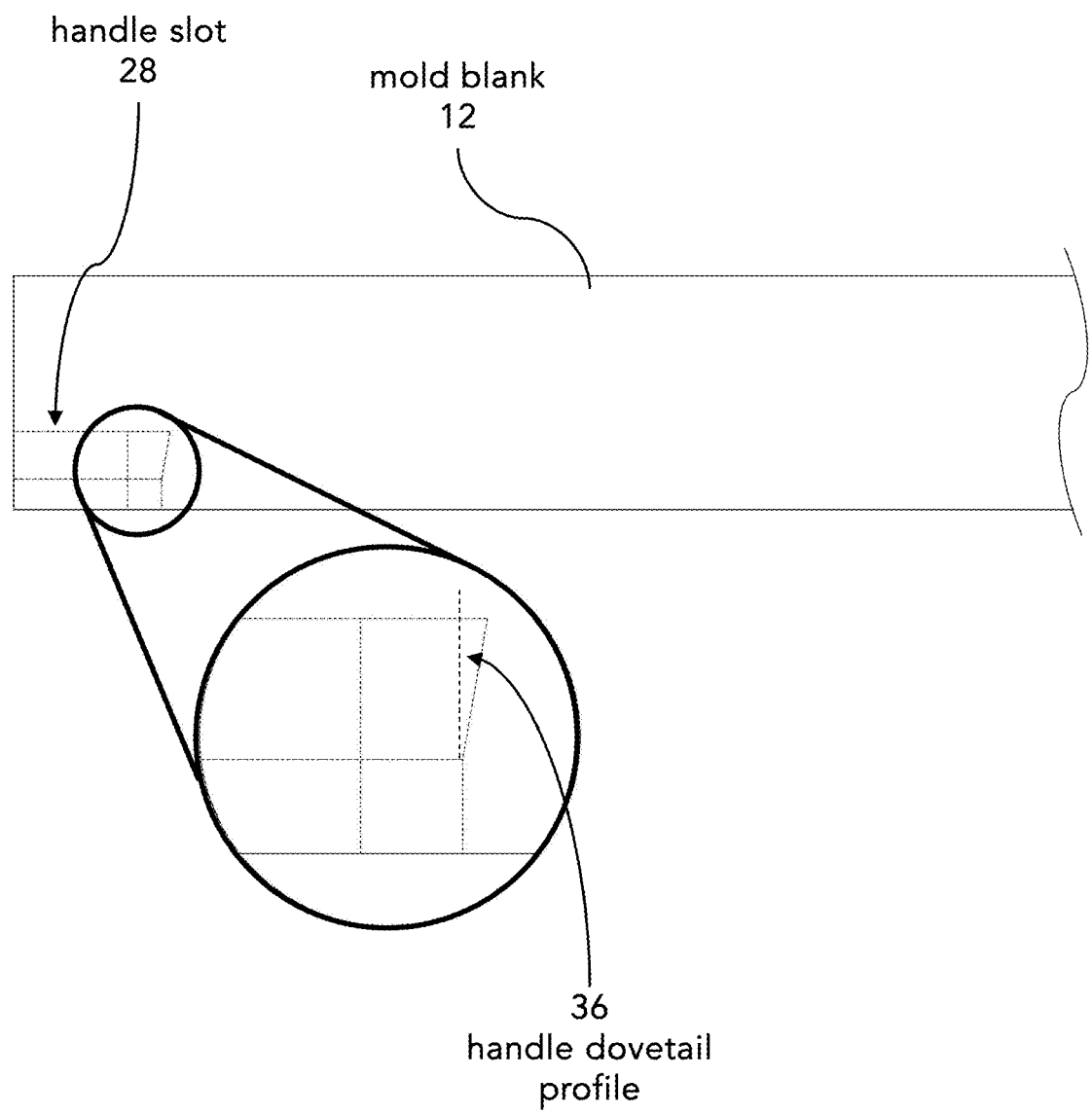
FIG. 14c illustrates a side view of a female side of the handle dovetail profile, according to some embodiments.
Figure 14D:
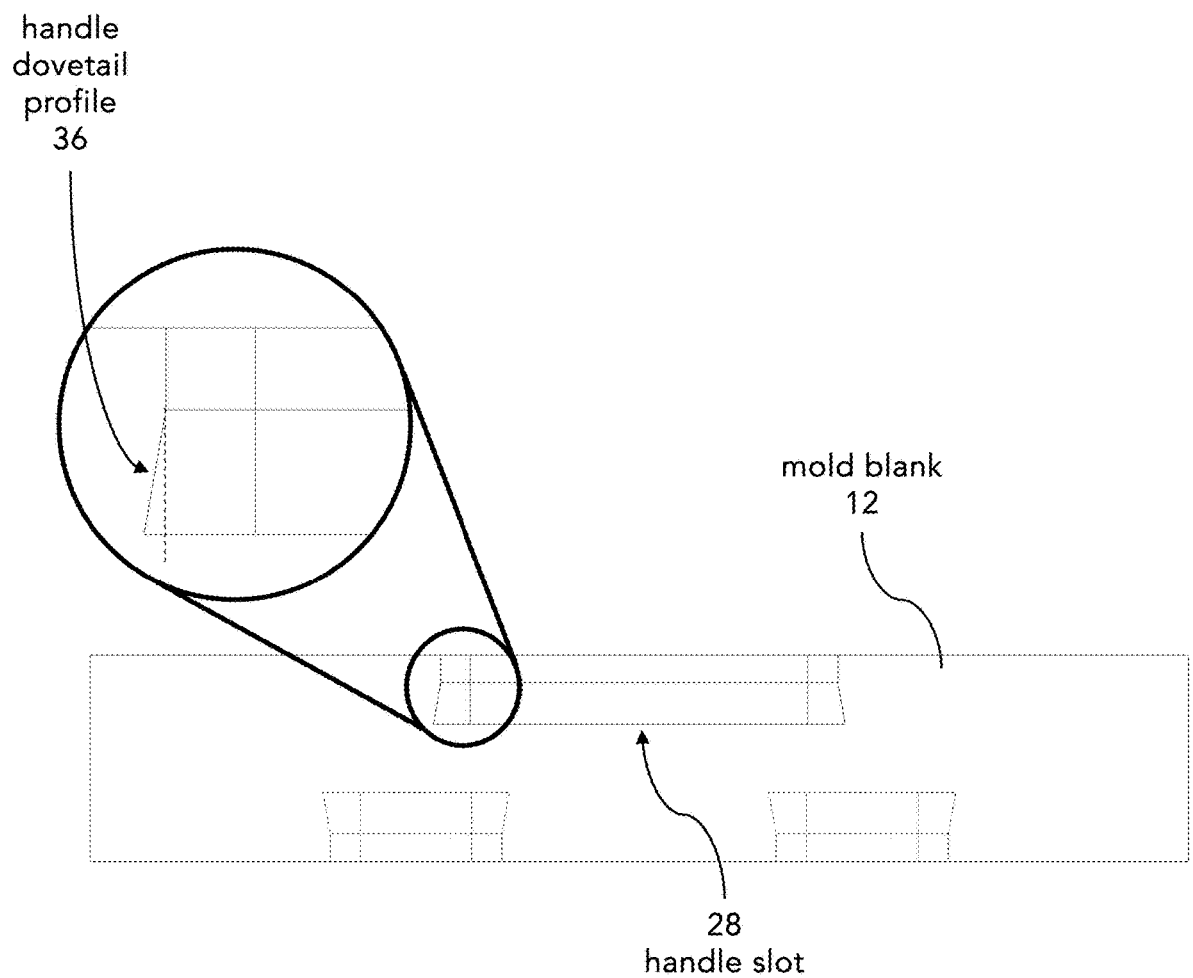
FIG. 14d illustrates a front view of the female side of the handle dovetail profile, according to some embodiments.

FIGS. 14a-14d illustrate a handle dovetail profile 36. Specifically, FIGS. 14a and 14b illustrate a male handle dovetail profile 36, and FIGS. 14c and 14d illustrate a female handle dovetail profile 36. FIG. 14a illustrates a side view of the male handle dovetail profile 36. FIG. 14b illustrates a front view of the male handle dovetail profile 36. FIG. 14c illustrates a side view of the female handle dovetail profile 36. FIG. 14d illustrates a front view of the female handle dovetail profile 36.

The handle dovetail profile 36 is only necessary in embodiments of the mold system 10 in which a handle retainer 24 is present. The handle dovetail profile 36 adds additional support to the coupling between the handle retainer 24 and the mold blank 12. Because the handle dovetail profile 36 is tapered about the coupled perimeter between the handle retainer 24 and the mold blank 12, the only movement that must be solely supported by the pair of handle screws 30 is the movement which would remove the handle retainer 24 directly from the mold blank 12. The taper of the handle dovetail profile 36 may be 10°.

Figure 15:
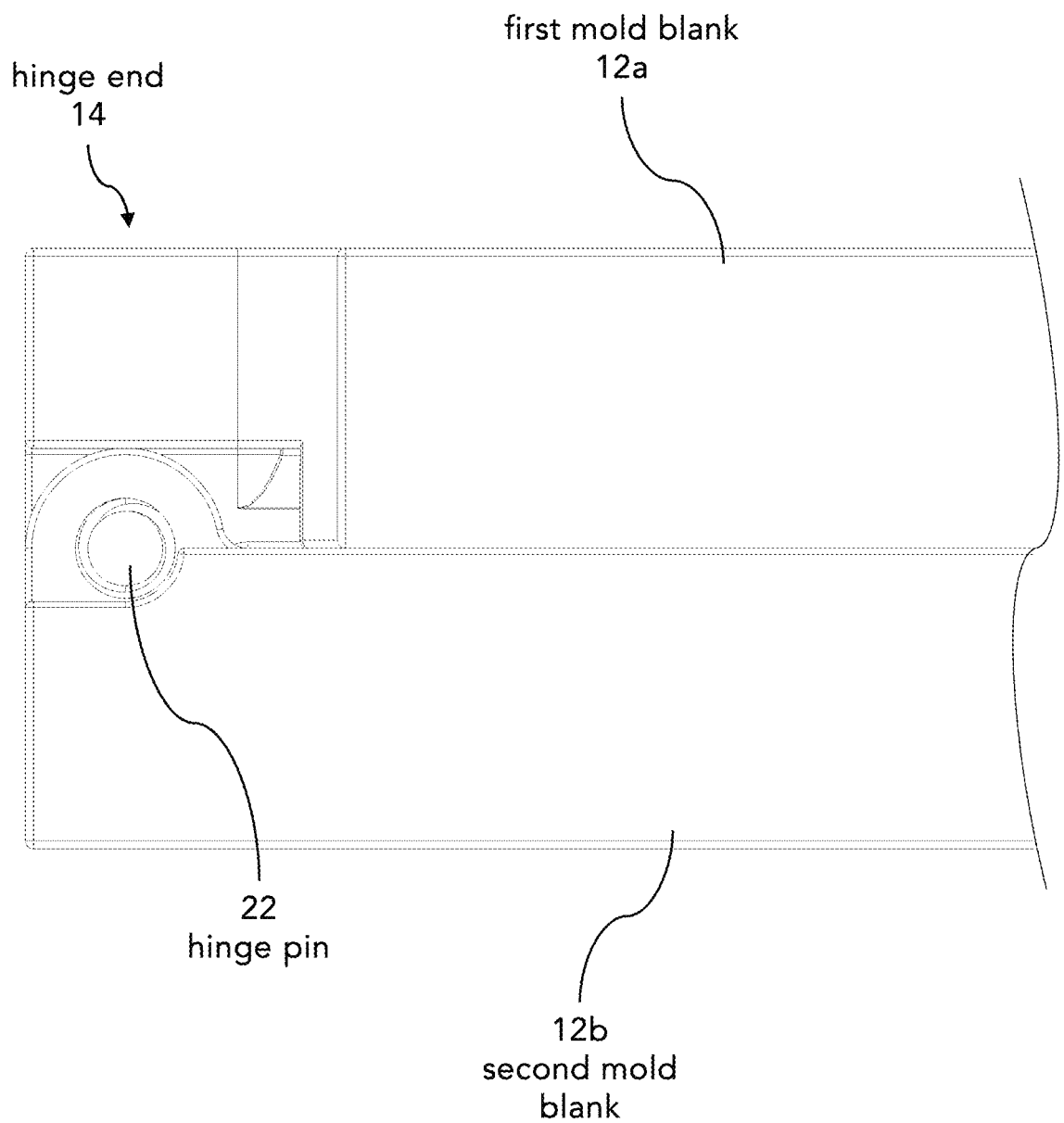
FIG. 15 illustrates a side view of a hinge assembly in a closed position, according to some embodiments.
Figure 16:
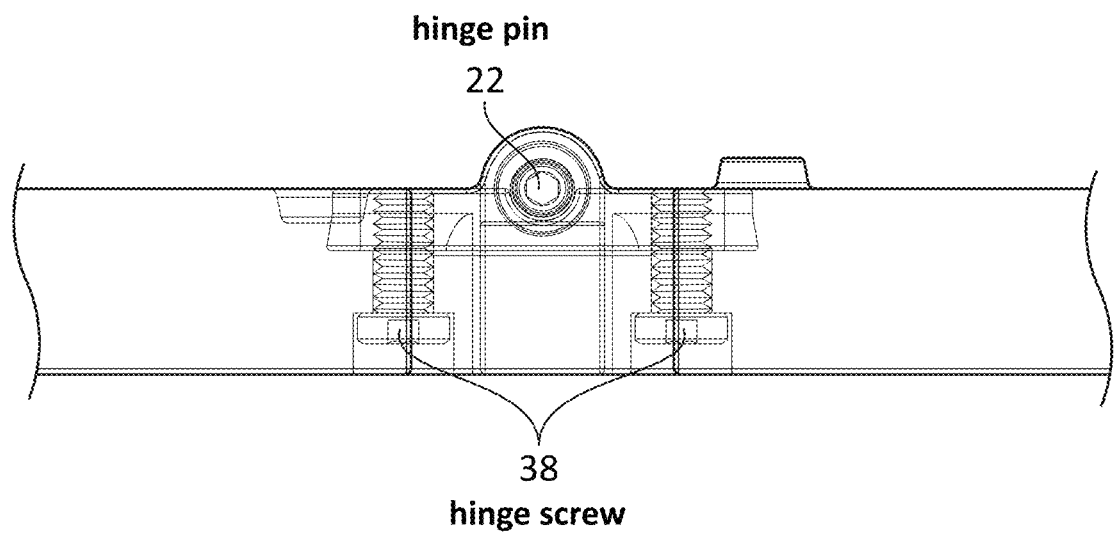
FIG. 16 illustrates a side view of the hinge assembly in an open position with hidden lines displayed, according to some embodiments.

FIGS. 15 and 16 illustrate various views of the hinge assembly. FIG. 15 illustrates a close-up side view of the hinge end 14 of the mold system 10 in a closed position as it may be viewed by an outside observer. FIG. 16 illustrates a side view of the hinge assembly in an open position with hidden lines displayed.

FIG. 15 illustrates how the hinge end 14 may appear in a closed position. In some embodiments, the hinge brackets 20 cannot be seen without the use of hidden lines, as they are located away from the sides of the mold blanks 12. According to some embodiments, the hinge pin 22 is shown in an opening at the side of the mold blanks 12.

FIG. 16 illustrates how the hinge pin 22 may fit in a central hole of the hinge brackets 20 in order to rotably couple the hinge brackets 20 to one another. Also illustrated is a manner in which the hinge screw 38 may couple the hinge brackets 20 to the mold blanks 12.

Figure 17A:
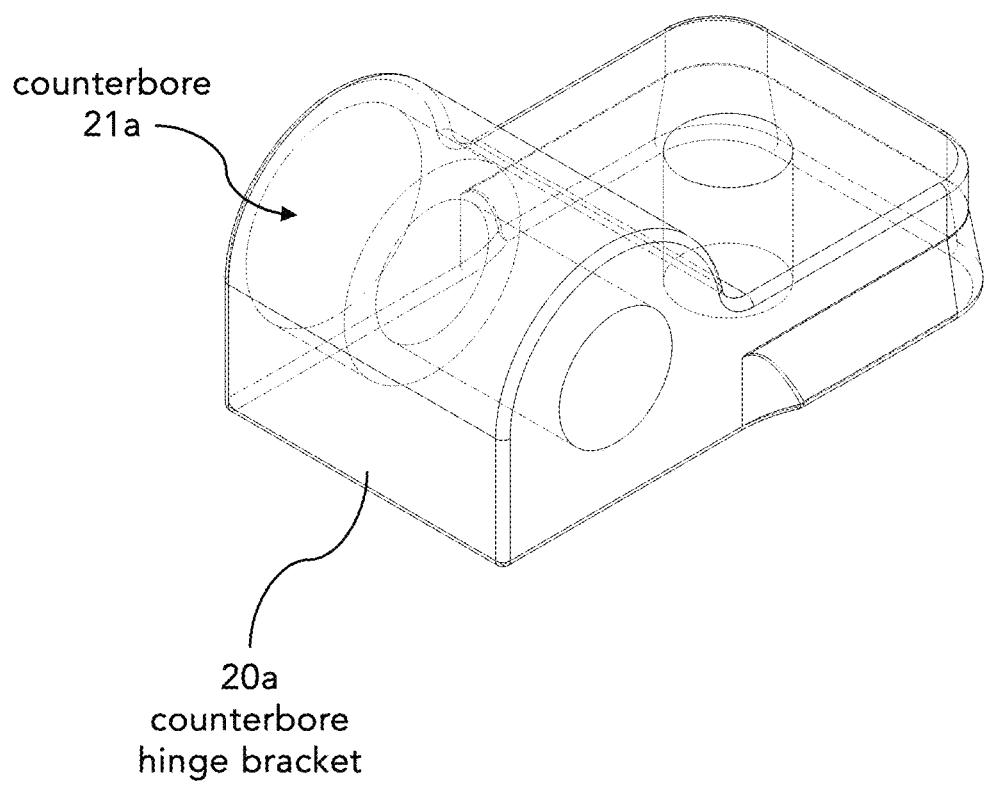
FIG. 17a illustrates a profile view of a counterbore hinge bracket with hidden lines displayed, according to some embodiments.
Figure 17B:
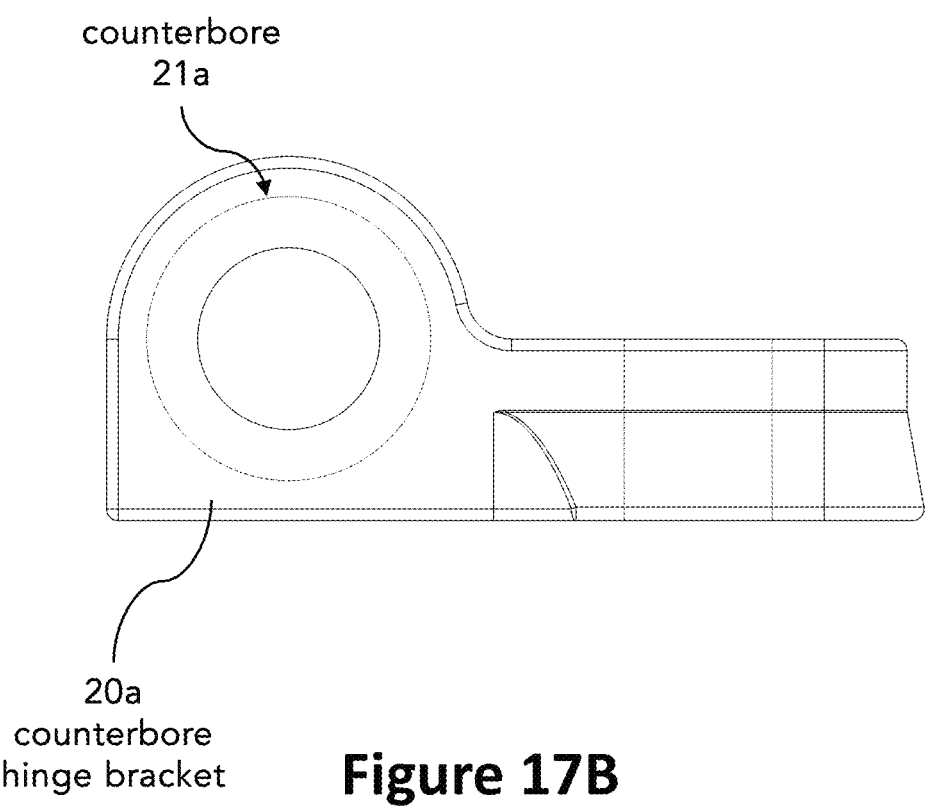
FIG. 17b illustrates a side view of the counterbore hinge bracket with hidden lines displayed, according to some embodiments.
Figure 17C:
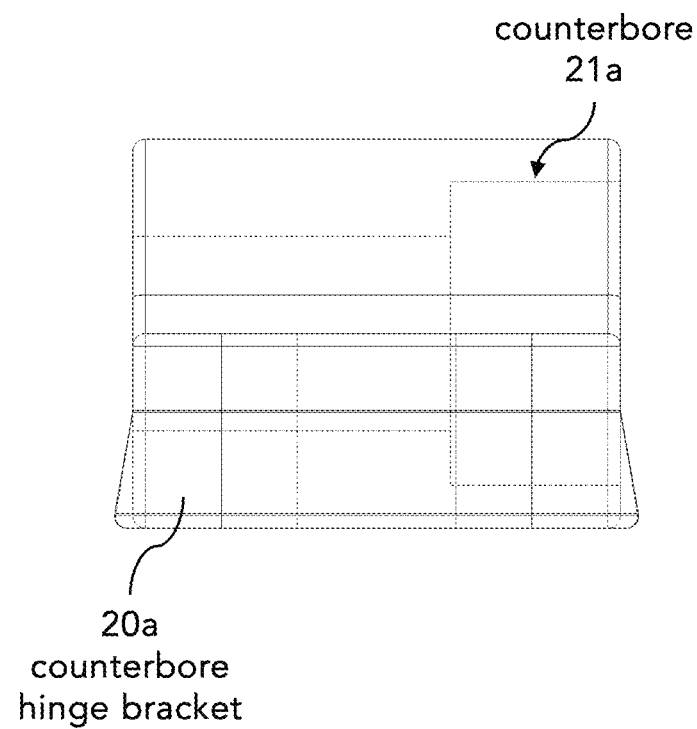
FIG. 17c illustrates a front view of the counterbore hinge bracket with hidden lines displayed, according to some embodiments.
Figure 17D:
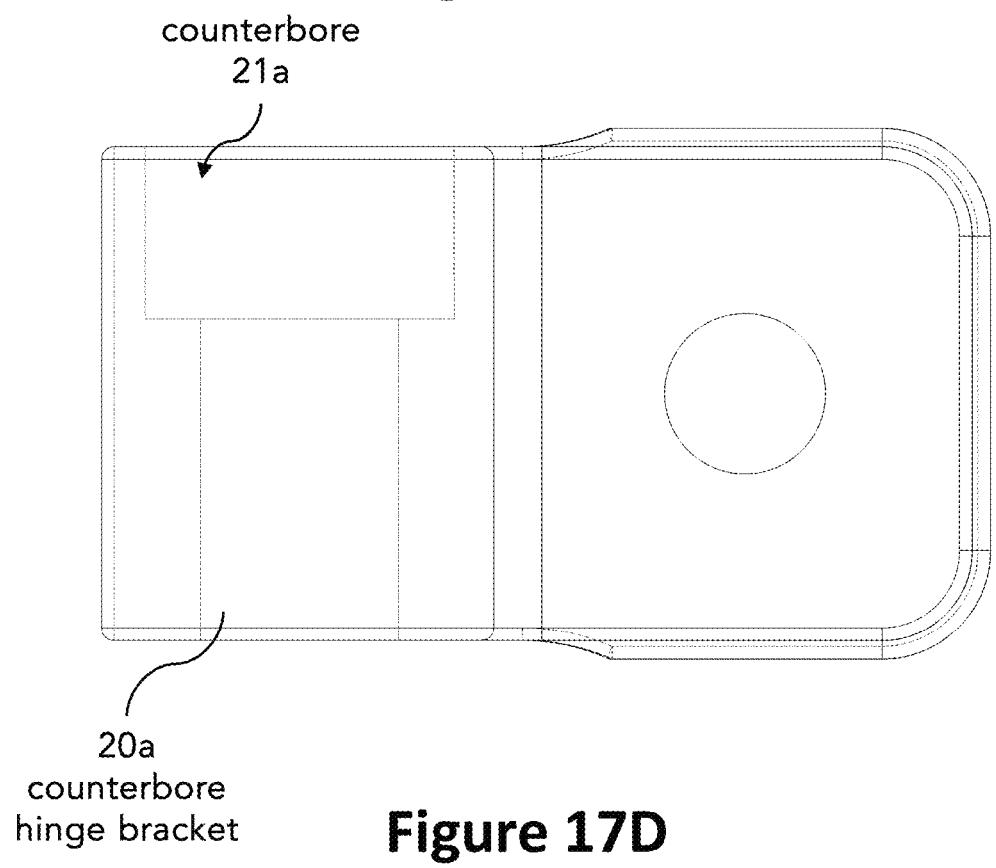
FIG. 17d illustrates a top view of the counterbore hinge bracket with hidden lines displayed, according to some embodiments.

FIGS. 17a-17d illustrate various views of an embodiment of a counterbore hinge bracket 20a. FIG. 17a illustrates a profile view, FIG. 17b illustrates a side view, FIG. 17c illustrates a front view, and FIG. 17d illustrates a top view of the counterbore hinge bracket 20a. The hole illustrated from a head on perspective in FIG. 17b is where the hinge pin 22 may be inserted to rotably couple the counterbore hinge bracket 20a to other hinge brackets 20. The hole illustrated from a head on perspective in FIG. 17d is where the hinge screw 38 may be inserted for coupling the counterbore hinge bracket 20a to the mold blank 12.

FIG. 17a illustrates a hole through the upper portion of the counterbore hinge bracket 20a that has a greater diameter on one side than the other. According to some embodiments, this wider portion is a counterbore 21a. This counterbore 21a may permit the hinge pin 22 to pass completely through, while the portion of the hole that does not comprise a counterbore 21a is narrow enough that only the narrow sections of the hinge pin 22 may pass through, but the wider head of the hinge pin 22 can not pass through. In some embodiments, this counterbore 21a is configured to contain the entirety of the head of the hinge pin 22, thus not allowing any of the hinge pin 22 to stick out from the side of the counterbore hinge bracket 20a.

According to some embodiments, the hole illustrated in FIG. 17b has a diameter of 0.25". The top portion of the counterbore hinge bracket 20a may have a radius of 0.25" for containing the hole. The top portion of the counterbore hinge bracket 20a may display curvature to meet the bottom portion of the counterbore hinge bracket 20a, and this curvature may have a radius of 0.62". The overall height of the bottom portion of the counterbore hinge bracket 20a may be 0.25". According to some embodiments, the bottom portion of the counterbore hinge bracket 20a has a tapered base. This tapered base is illustrated and discussed in further depth in FIGS. 21a-21d. The section of the bottom portion of the counterbore hinge bracket 20a that does not define a taper may be 0.0986".

The embodiment of the counterbore hinge bracket 20a as illustrated in FIG. 17c may have a total height of 0.5". According to some embodiments, the width of the counterbore hinge bracket 20a is 0.625". According to some embodiments, the bottom portion of the counterbore hinge bracket 20a has a tapered base. This tapered base is illustrated and discussed in further depth in FIGS. 21a-21d.

According to some embodiments, the hole illustrated in FIG. 17d comprises a ¼-20 thread for receiving the hinge screw 38. Additionally, the length of the counterbore hinge bracket 20a as illustrated in FIG. 17d may be 1.0986".

As can be seen in all illustrations of FIGS. 17a-17d, the hole for receiving the hinge pin may have a counterbore 21a. According to some embodiments, this counterbore 21a has a diameter of 0.39". This counterbore 21a may allow the head of the hinge pin 22 to enter the hinge bracket 20, but not pass through the hinge bracket 20 completely, thus hiding the head of the hinge pin 22.

Figure 18A:
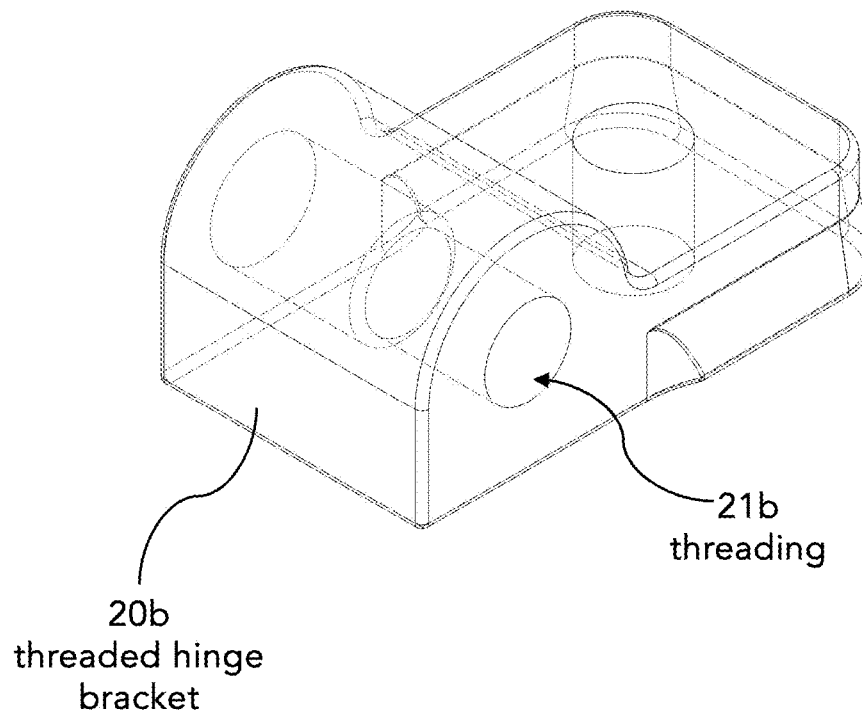
FIG. 18a illustrates a profile view of a threaded hinge bracket with hidden lines displayed, according to some embodiments.
Figure 18B:
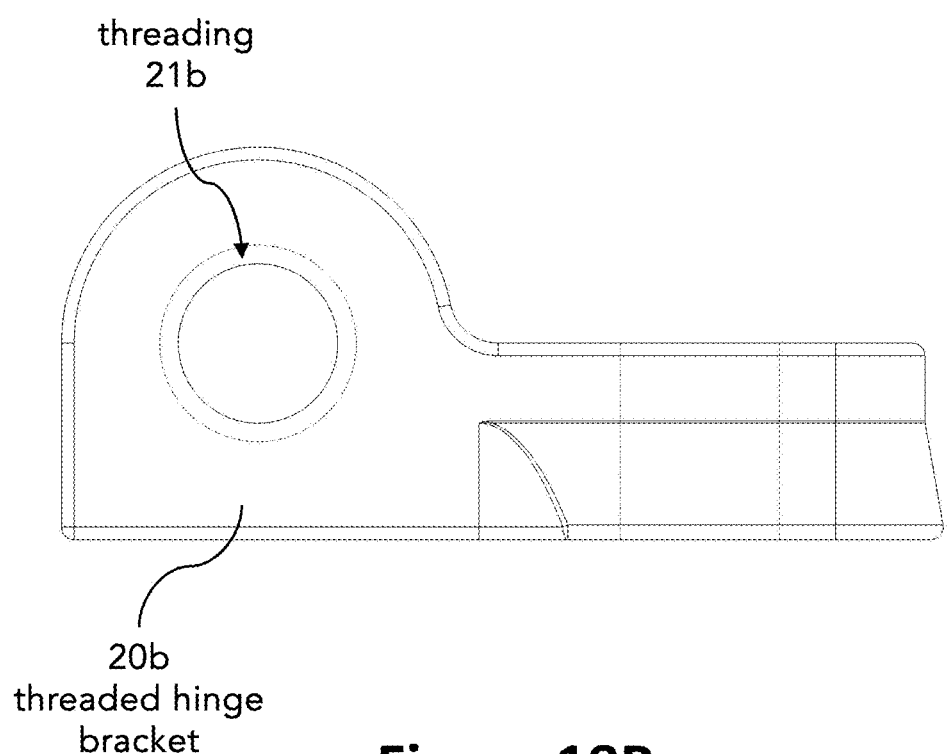
FIG. 18b illustrates a side view of the threaded hinge bracket with hidden lines displayed, according to some embodiments.
Figure 18C:
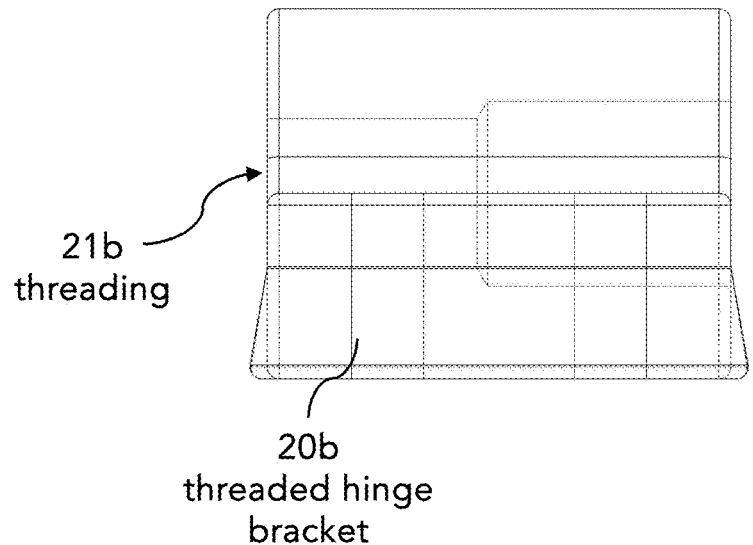
FIG. 18c illustrates a front view of the threaded hinge bracket with hidden lines displayed, according to some embodiments.
Figure 18D:
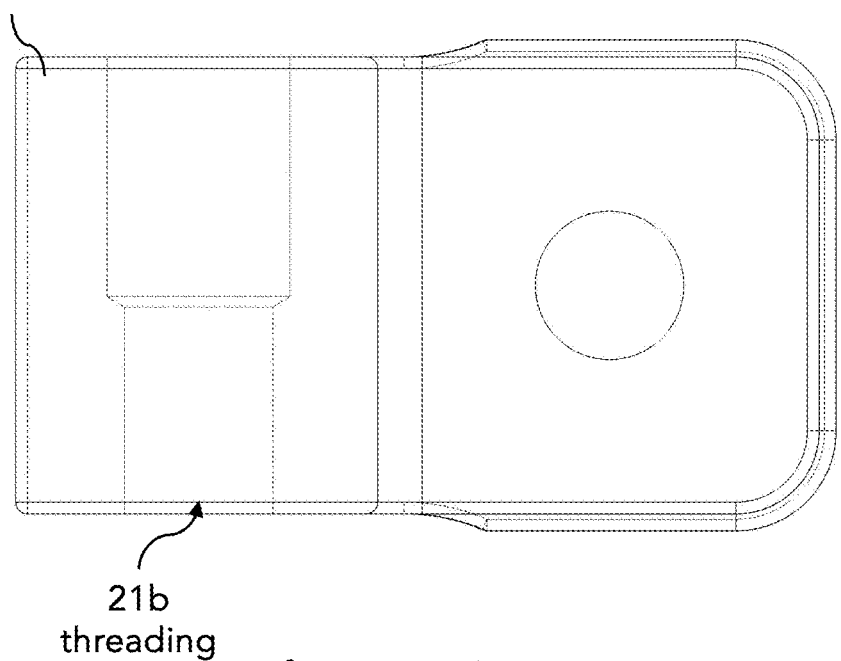
FIG. 18d illustrates a top view of the threaded hinge bracket with hidden lines displayed, according to some embodiments.

FIGS. 18a-18d illustrate various views of an additional embodiment of the threaded hinge bracket 20b. FIG. 18a illustrates a profile view, FIG. 18b illustrates a side view, FIG. 18c illustrates a front view, and FIG. 18d illustrates a top view of the threaded hinge bracket 20b. The hole illustrated head on in FIG. 18b is where the hinge pin 22 may be inserted to rotably couple the threaded hinge bracket 20b to other hinge brackets 20. The hole illustrated head on in FIG. 18*d* is where the hinge screw 38 may be inserted for coupling the threaded hinge bracket 20*b* to the mold blank 12.

FIG. 18*a* illustrates a hole through the upper portion of the threaded hinge bracket 20*b* that has a greater diameter on one side than the other. According to some embodiments, the narrower portion comprises threading 21*b*. The wider portion of the hole may permit the hinge pin 22 to pass completely through, while the threading 21*b* is narrow enough that only the narrow, threaded end of the hinge pin 22 may enter and threadably couple to the threaded hinge bracket 20*b*.

According to some embodiments, the hole illustrated in FIG. 18*b* has a diameter of 0.25". The top portion of the threaded hinge bracket 20*b* may have a radius of 0.25" for containing the hole. The top portion of the threaded hinge bracket 20*b* may display curvature to meet the bottom portion of the threaded hinge bracket 20*b*, and this curvature may have a radius of 0.62". The overall height of the bottom portion of the threaded hinge bracket 20*b* may be 0.25". According to some embodiments, the bottom portion of the threaded hinge bracket 20*b* has a tapered base. This tapered base is illustrated and discussed in further depth in FIGS. 21*a*-21*d*. The section of the bottom portion of the threaded hinge bracket 20*b* that does not define a taper may be 0.0986".

The embodiment of the threaded hinge bracket 20*b* as illustrated in FIG. 18*c* may have a total height of 0.5". According to some embodiments, the width of the threaded hinge bracket 20*b* is 0.625". According to some embodiments, the bottom portion of the threaded hinge bracket 20*b* has a tapered base. This tapered base is illustrated and discussed in further depth in FIGS. 21*a*-21*d*.

According to some embodiments, the hole illustrated in FIG. 18*d* comprises a ¼-20 thread for receiving the hinge screw 38. Additionally, the length of the threaded hinge bracket 20*b* as illustrated in FIG. 17*d* may be 1.0986".

As can be seen in all illustrations of FIGS. 18*a*-18*d*, the hole for receiving the hinge pin 22 may comprise threading 21*b*. According to some embodiments, this threading 21*b* has a diameter of 0.203" and comprises a ¼-20 thread. This threading 21*b* may only allow the narrower threaded end of the hinge pin 22 to enter the threaded hinge bracket 20*b*. In some embodiments, the narrower threaded end of the hinge pin 22 threadably couples to the threaded hinge bracket 20*b*, thus preventing unintentional decoupling of the hinge pin 22 from the threaded hinge bracket 20*b*.

Figure 19A:
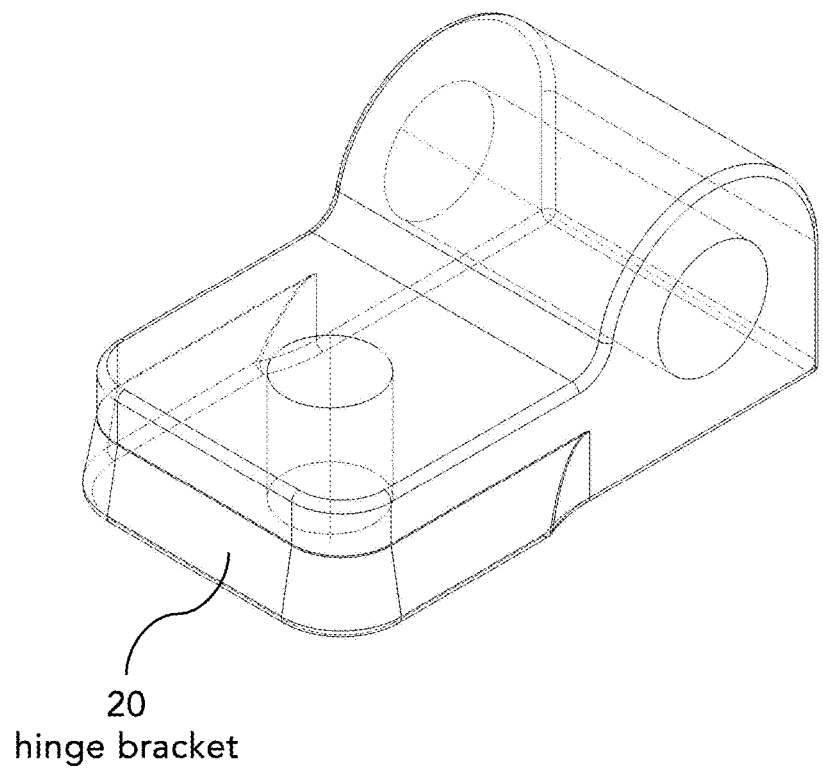
FIG. 19a illustrates a profile view of a hinge bracket with hidden lines displayed, according to some embodiments.
Figure 19B:
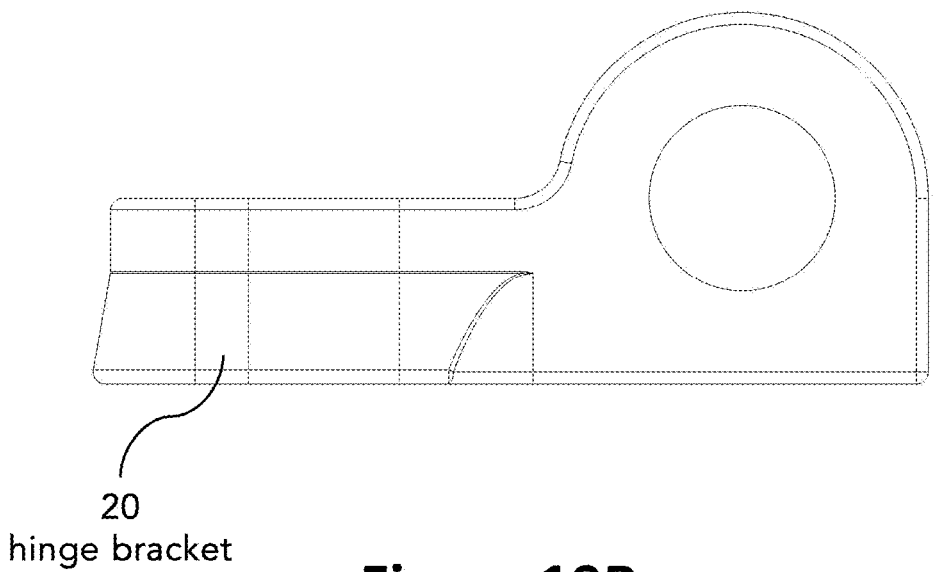
FIG. 19b illustrates a side view of the hinge bracket with hidden lines displayed, according to some embodiments.
Figure 19C:
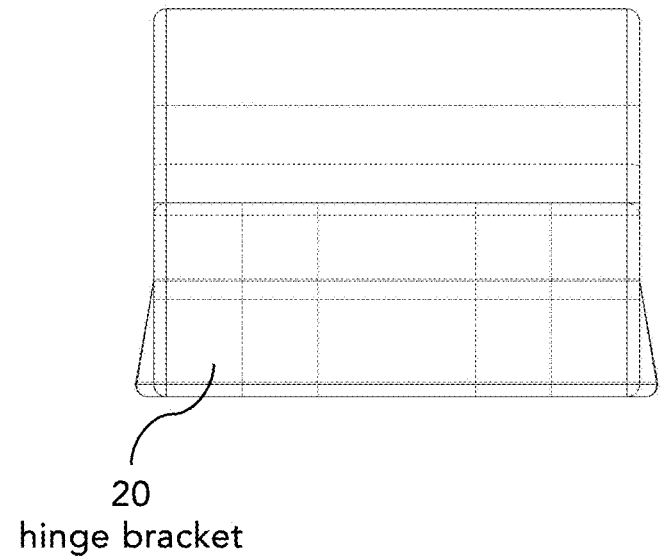
FIG. 19c illustrates a front view of the hinge bracket with hidden lines displayed, according to some embodiments.
Figure 19D:
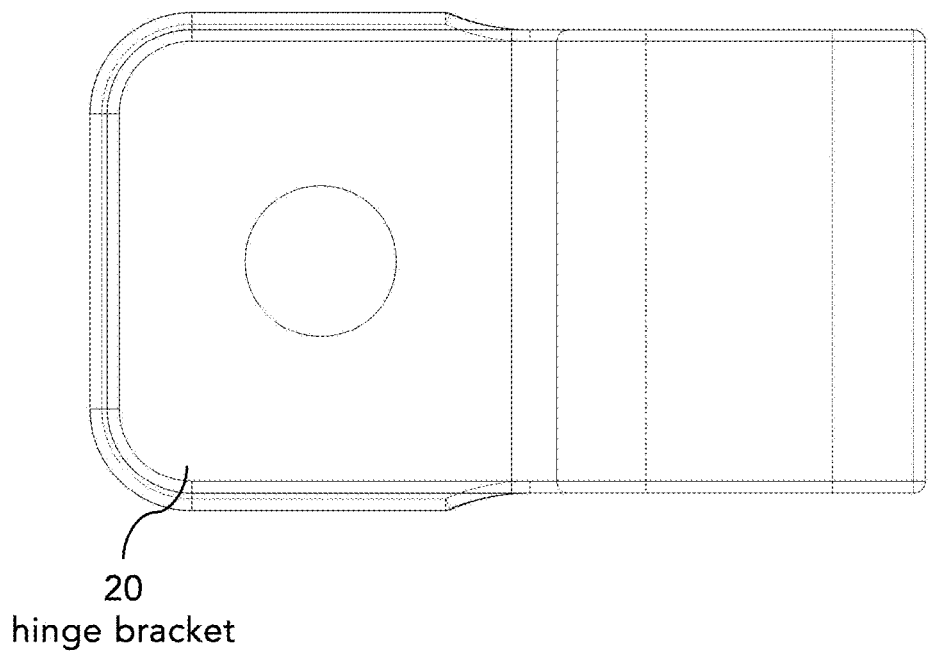
FIG. 19d illustrates a top view of the hinge bracket with hidden lines displayed, according to some embodiments.

FIGS. 19*a*-19*d* illustrate various views of a further additional embodiment of the hinge bracket 20. FIG. 19*a* illustrates a profile view, FIG. 19*b* illustrates a side view, FIG. 19*c* illustrates a front view, and FIG. 19*d* illustrates a top view of the hinge bracket 20. The hole illustrated head on in FIG. 19*b* is where the hinge pin 22 may be inserted to rotably couple the hinge bracket 20 to other hinge brackets 20. The hole illustrated head on in FIG. 19*d* is where the hinge screw 38 may be inserted for coupling the hinge bracket 20 to the mold blank 12.

According to some embodiments, the hole illustrated in FIG. 18*b* has a diameter of 0.25". The top portion of the hinge bracket 20 may have a radius of 0.25" for containing the hole. The top portion of the hinge bracket 20 may display curvature to meet the bottom portion of the hinge bracket 20, and this curvature may have a radius of 0.62". The overall height of the bottom portion of the hinge bracket 20 may be 0.25". According to some embodiments, the bottom portion of the hinge bracket 20 has a tapered base. This tapered base is illustrated and discussed in further depth in FIGS. 21*a*-21*d*. The section of the bottom portion of the hinge bracket 20 that does not define a taper may be 0.0986".

The embodiment of the hinge bracket 20 as illustrated in FIG. 18*c* may have a total height of 0.5". According to some embodiments, the width of the hinge bracket is 0.625". According to some embodiments, the bottom portion of the hinge bracket 20 has a tapered base. This tapered base is illustrated and discussed in further depth in FIGS. 21*a*-21*d*.

According to some embodiments, the hole illustrated in FIG. 18*d* comprises a ¼-20 thread for receiving the hinge screw 38. Additionally, the length of the hinge bracket 20 as illustrated in FIG. 17*d* may be 1.0986".

As can be seen in all illustrations of FIGS. 19*a*-19*b*, the hole for receiving the hinge pin may have a threaded portion. According to some embodiments, this threaded portion has a diameter of 0.203" and comprises a ¼-20 thread. This threaded portion may allow for the threaded portion of the hinge pin 22 to threadably couple to the hinge bracket 20, thus securing the hinge pin 22 in place.

Figure 20:
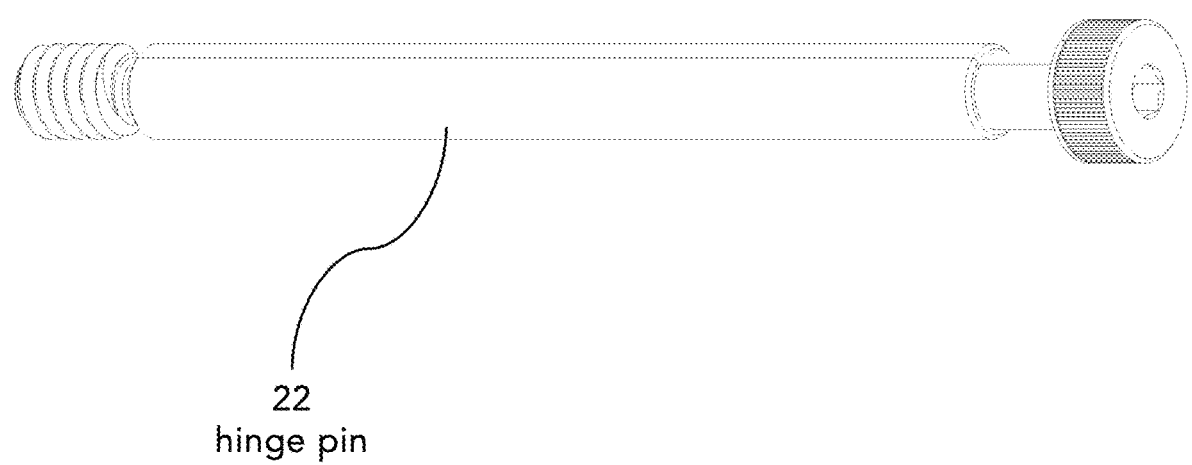
FIG. 20 illustrates a profile view of a hinge pin, according to some embodiments.

FIG. 20 illustrates a profile view of an embodiment of the hinge pin 22. According to some embodiments, the hinge pin 22 has an overall length of 3.5625", and a head length of 0.1875". The hinge pin's 22 body may have a diameter of 0.25", and the hinge pin's 22 head may have a diameter of 0.375". In some embodiments, the side of the hinge pin 22 opposite the head is threaded. According to some embodiments, this threaded portion of the hinge pin 22 comprises a ¼-20 thread for retaining the hinge pin 22 in place after insertion through the hinge brackets 20.

Figure 21A:
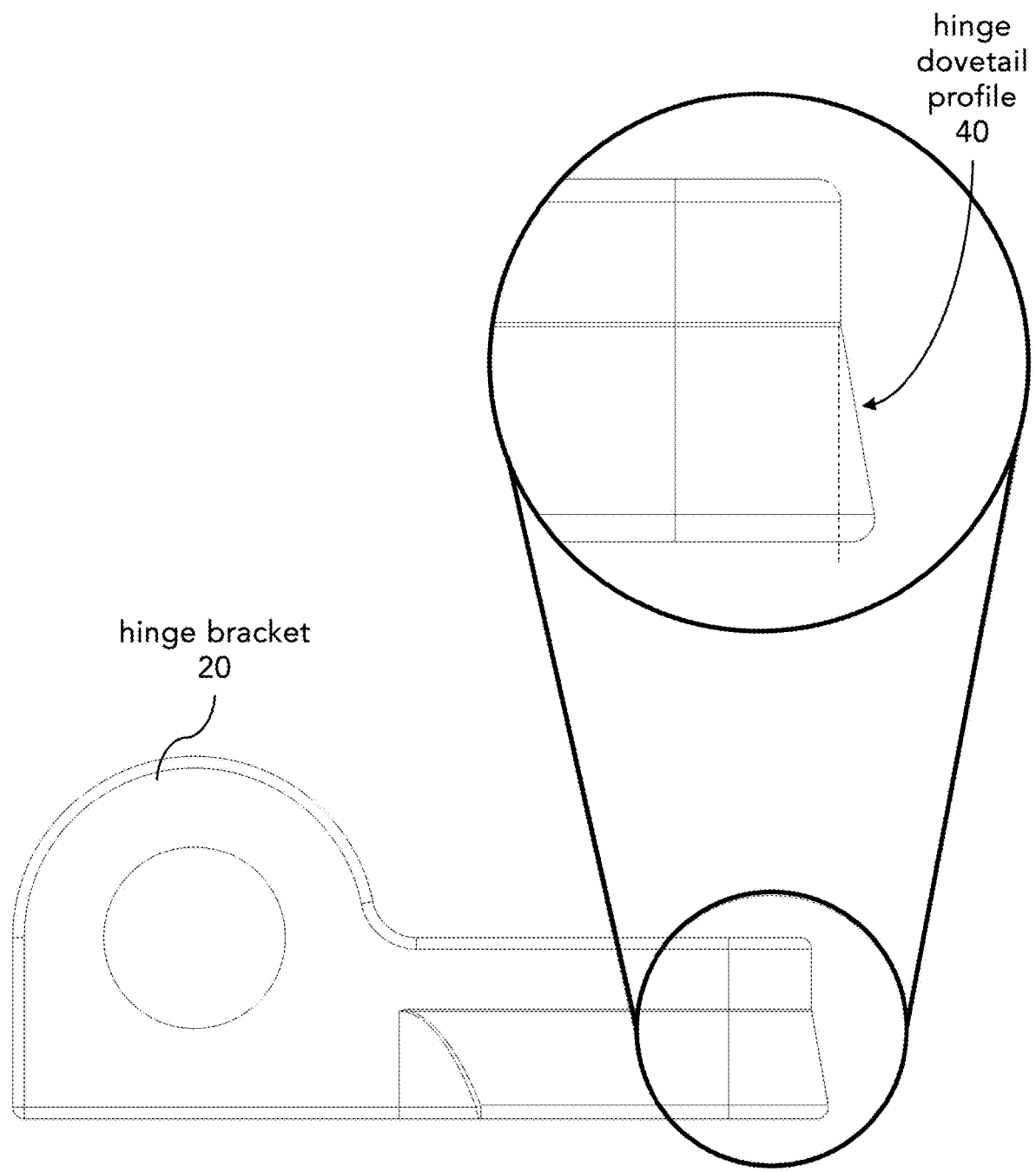
FIG. 21a illustrates a side view of a male side of a hinge dovetail profile, according to some embodiments.
Figure 21B:
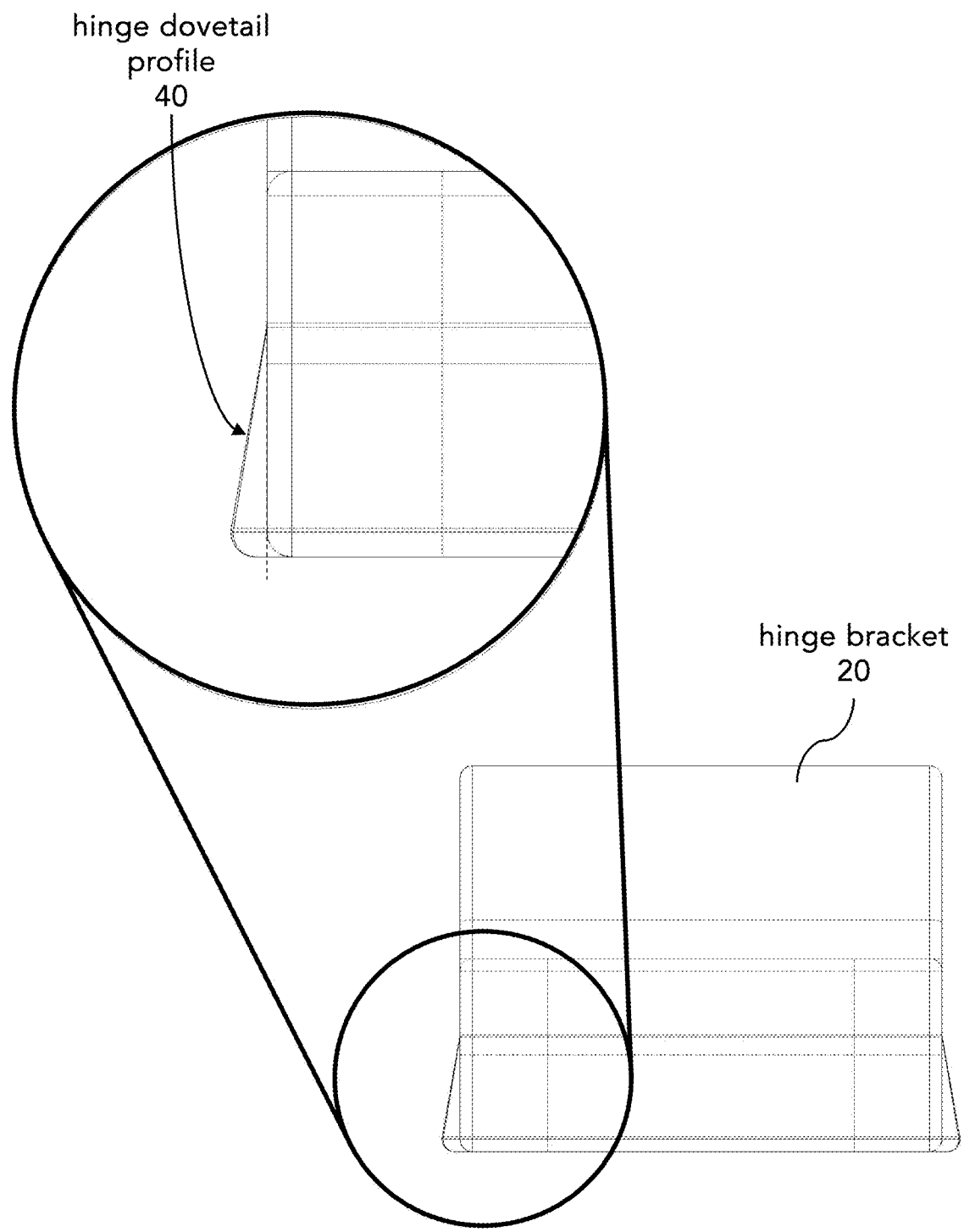
FIG. 21b illustrates a front view of the male side of the hinge dovetail profile, according to some embodiments.
Figure 21C:
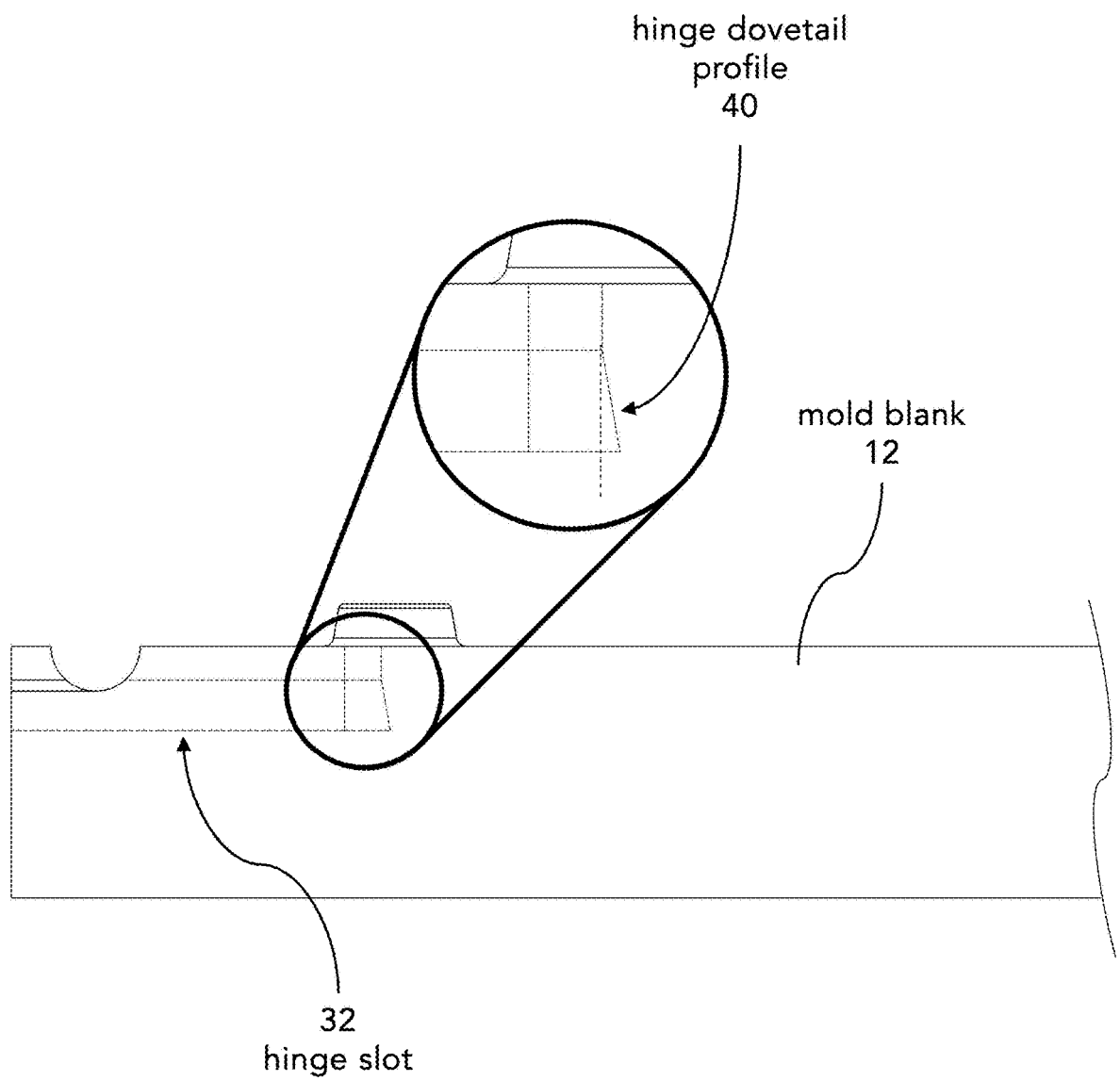
FIG. 21c illustrates a side view of a female side of the hinge dovetail profile, according to some embodiments.
Figure 21D:
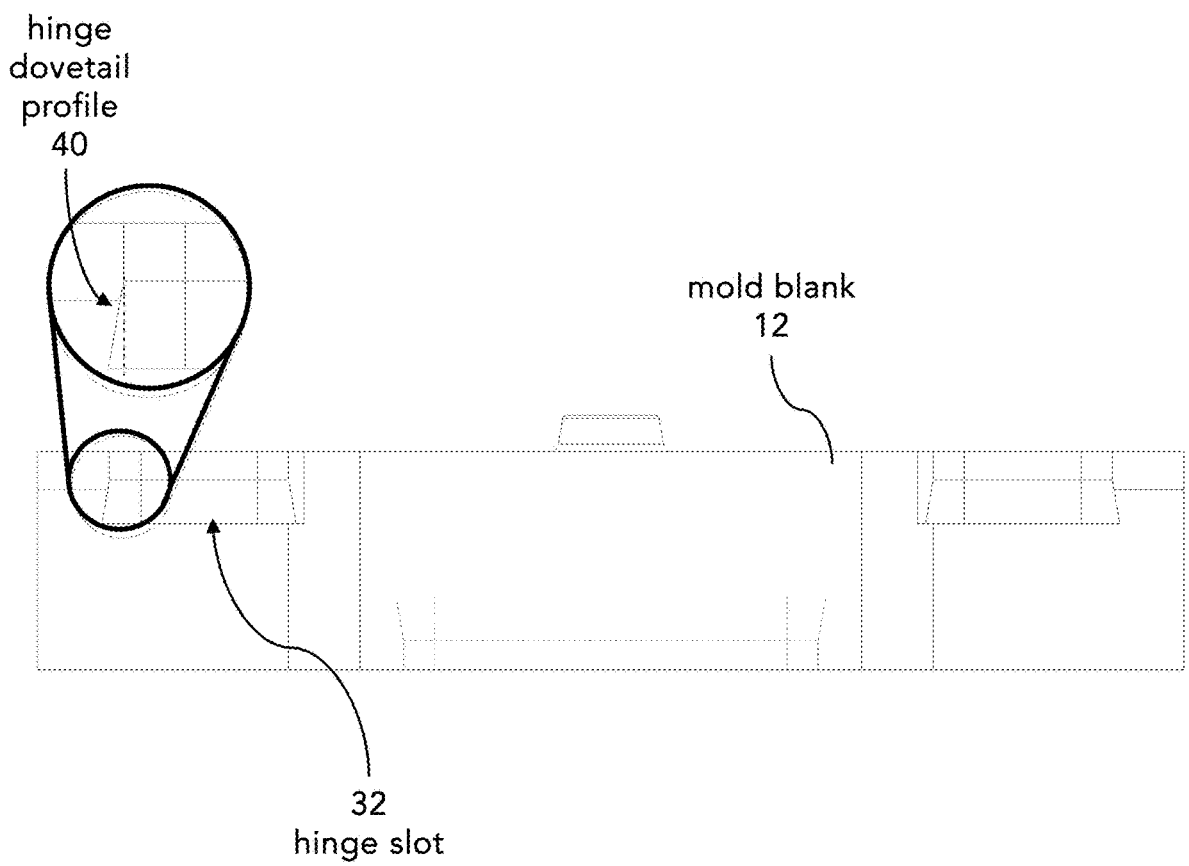
FIG. 21d illustrates a front view of the female side of the hinge dovetail profile, according to some embodiments.

FIGS. 21*a*-21*d* illustrate a hinge dovetail profile 40. Specifically, FIGS. 21*a* and 21*b* illustrate a male hinge dovetail profile 40, and FIGS. 21*c* and 21*d* illustrate a female hinge dovetail profile 40. FIG. 21*a* illustrates a side view of the male hinge dovetail profile 40. FIG. 21*b* illustrates a front view of the male hinge dovetail profile 40. FIG. 21*c* illustrates a side view of the female hinge dovetail profile 40. FIG. 21*d* illustrates a front view of the female hinge dovetail profile 40.

The hinge dovetail profile 40 adds additional support to the coupling between the hinge brackets 20 and the mold blank 12. Because the hinge dovetail profile 40 is tapered about the coupled perimeter between the hinge brackets 20 and the mold blank 12, the only movement that must be solely supported by the hinge screws 38 is the movement which would remove the hinge brackets 20 directly from the mold blank 12. The taper of the hinge dovetail profile 40 may be 10°.

Figure 22:
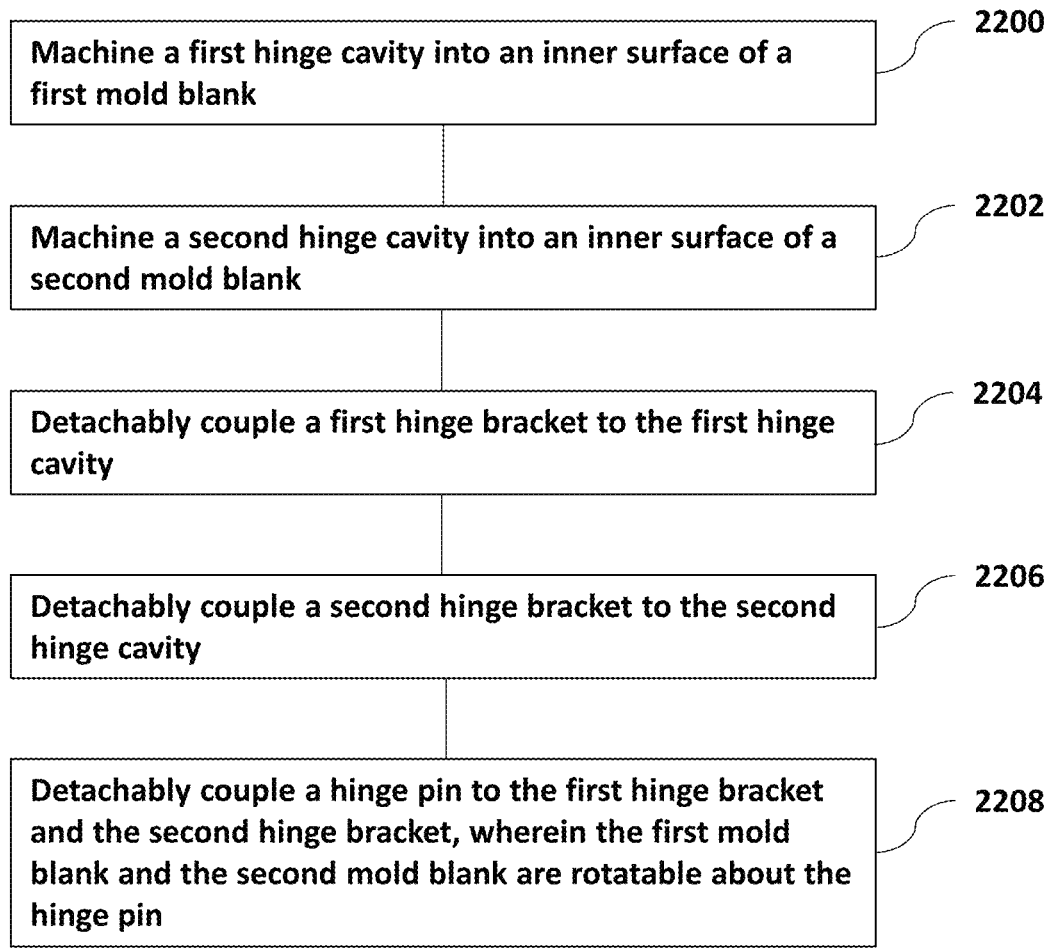
FIG. 22 illustrates a flowchart depicting a method of coupling hinge brackets to mold blanks, according to some embodiments.

FIG. 22 illustrates a method of coupling hinge brackets to mold blanks. The method may include machining a first hinge cavity into an inner surface of a first mold blank (at step 2200). According to some embodiments, the method includes machining a second hinge cavity into an inner surface of a second mold blank (at step 2202). In some embodiments, the method includes detachably coupling a first hinge bracket to the first hinge cavity (at step 2204). The method may include detachably coupling a second hinge bracket to the second hinge cavity (at step 2206). According to some embodiments, the method includes detachably coupling a hinge pin to the first hinge bracket and the second hinge bracket, wherein the first mold blank and the second mold blank are rotatable about the hinge pin (at step 2208).

Figure 23:
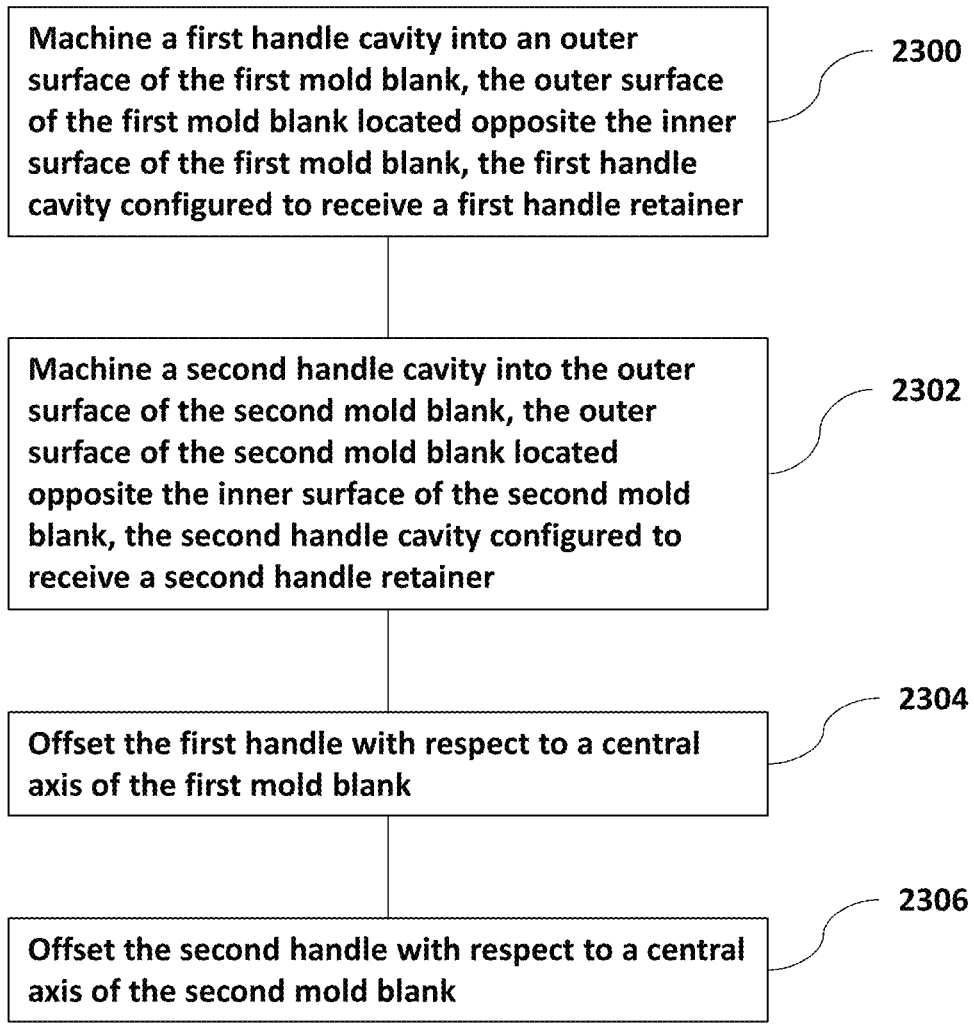
FIG. 23 illustrates a flowchart depicting a method of coupling handles to mold blanks, according to some embodiments.

FIG. 23 illustrates a method of coupling handles to mold blanks. The method may include machining a first handle cavity into an outer surface of the first mold blank, the outer surface of the first mold blank located opposite the inner surface of the first mold blank, the first handle cavity configured to receive a first handle retainer (at step 2300).

According to some embodiments, the method includes machining a second handle cavity into the outer surface of the second mold blank, the outer surface of the second mold blank located opposite the inner surface of the second mold blank, the second handle cavity configured to receive a second handle retainer (at step 2302). In some embodiments, the method includes offsetting the first handle with respect to a central axis of the first mold blank (at step 2304). The method may include offsetting the second handle with respect to a central axis of the second mold blank (at step 2306).

Figure 24:
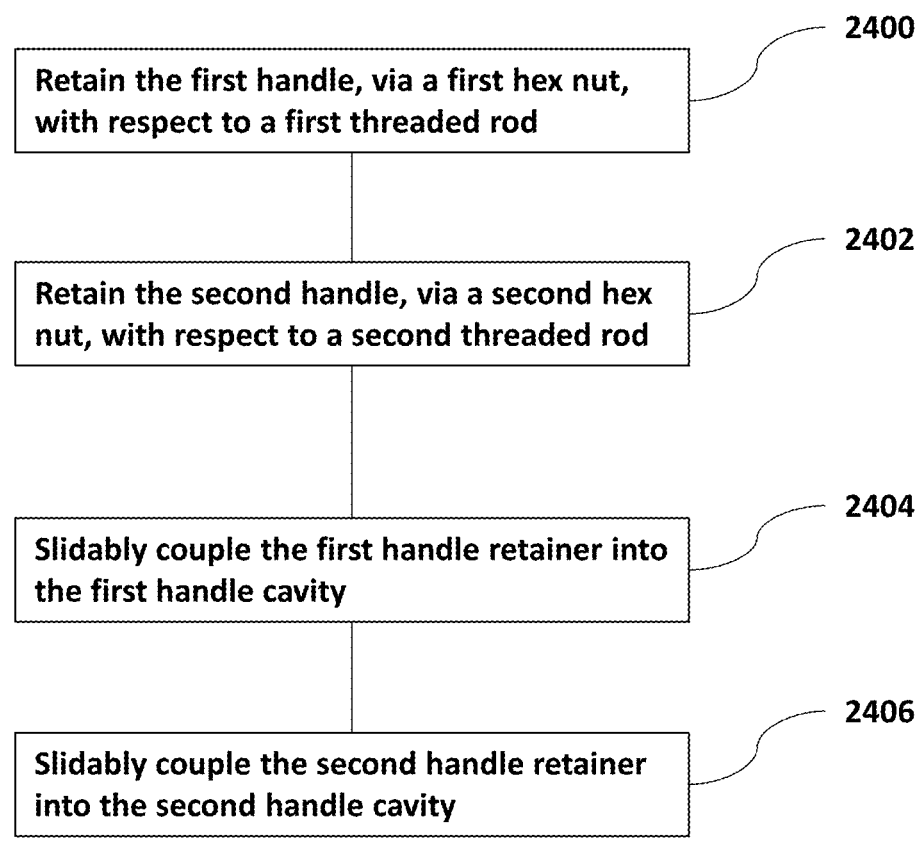
FIG. 24 illustrates a flowchart depicting a method of coupling handle retainers to mold blanks, according to some embodiments.

FIG. 24 illustrates a method of coupling handle retainers to mold blanks. The method may include retaining the first handle, via a first hex nut, with respect to a first threaded rod (at step 2400). According to some embodiments, the method includes retaining the second handle, via a second hex nut, with respect to a second threaded rod (at step 2402). In some embodiments, the method includes slidably coupling the first handle retainer into the first handle cavity (at step 2404). The method may include slidably coupling the second handle retainer into the second handle cavity (at step 2406).

Figure 25:
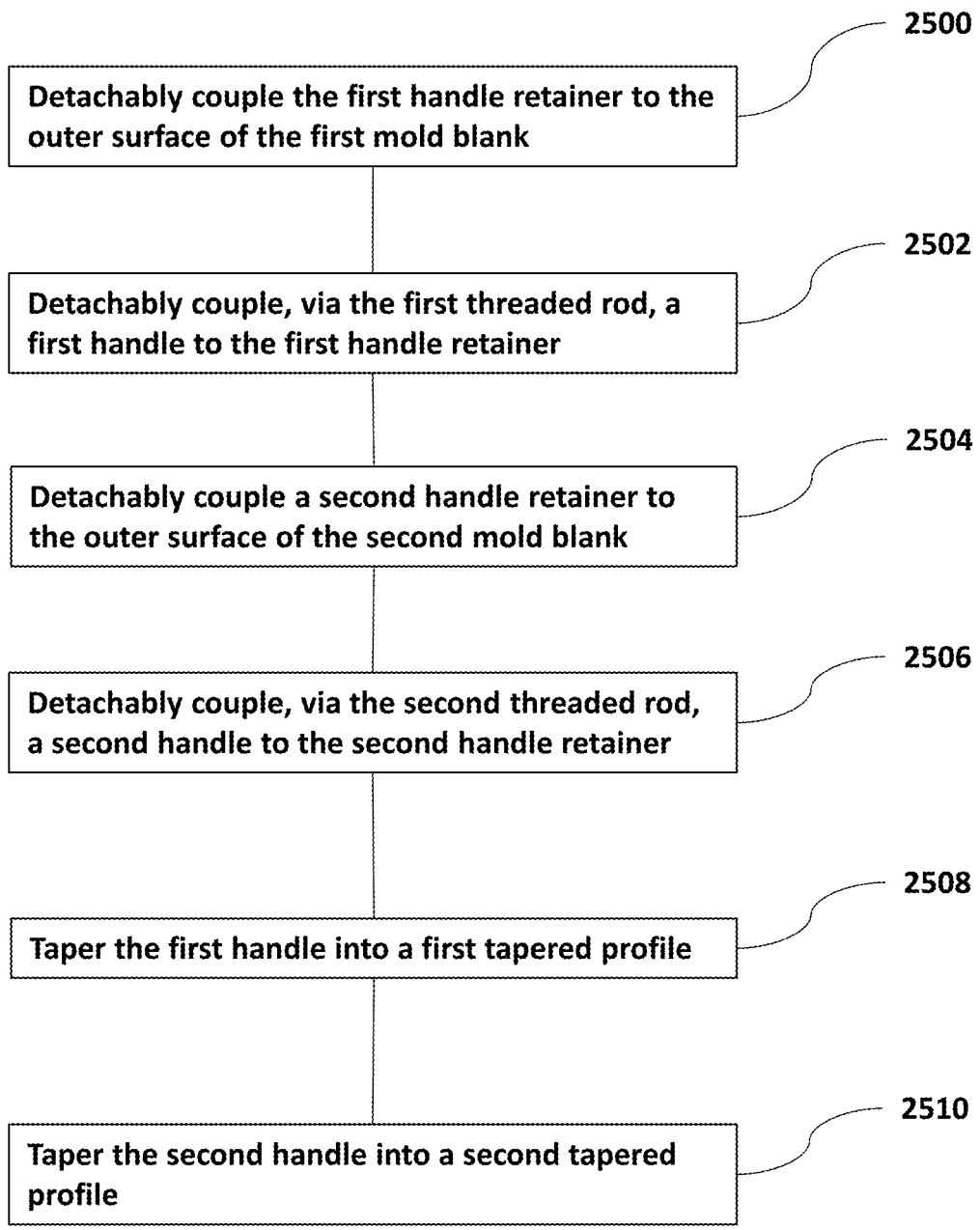
FIG. 25 illustrates a flowchart depicting a method of coupling handles to handle retainers, according to some embodiments.

FIG. 25 illustrates a method of coupling handles to handle retainers. The method may include detachably coupling the first handle retainer to the outer surface of the first mold blank (at step 2500). According to some embodiments, the method includes detachably coupling, via the first threaded rod, a first handle to the first handle retainer (at step 2502). In some embodiments, the method includes detachably coupling a second handle retainer to the outer surface of the second mold blank (at step 2504). The method may include detachably coupling, via the second threaded rod, a second handle to the second handle retainer (at step 2506). According to some embodiments, the method includes tapering the first handle into a first tapered profile (at step 2508). In some embodiments, the method includes tapering the second handle into a second tapered profile (at step 2510).

Figure 26:
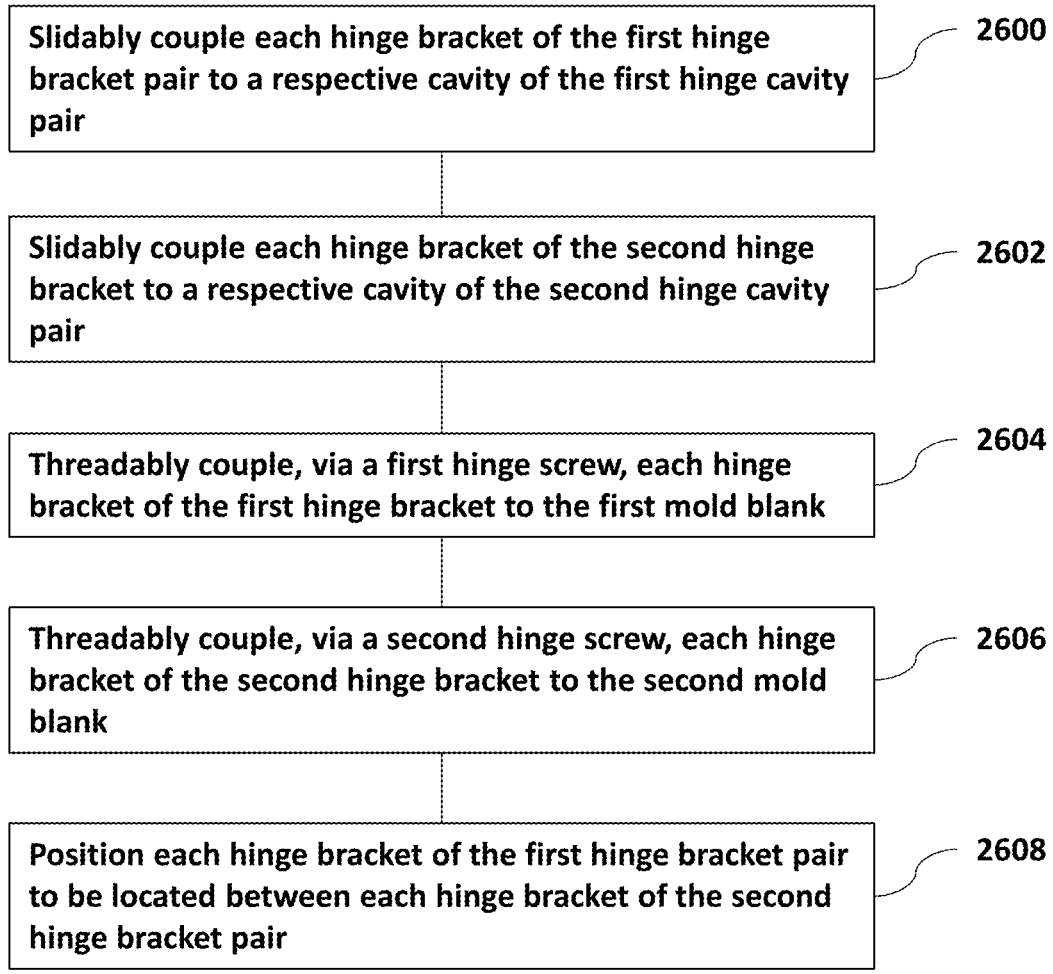
FIG. 26 illustrates a flowchart depicting a method of coupling inner and outer hinge bracket pairs to mold blanks, according to some embodiments.

FIG. 26 illustrates a method of coupling inner and outer hinge bracket pairs to mold blanks. The method may include slidably coupling each hinge bracket of the first hinge bracket pair to a respective cavity of the first hinge cavity pair (at step 2600). According to some embodiments, the method includes slidably coupling each hinge bracket of the second hinge bracket to a respective cavity of the second hinge cavity pair (at step 2602). In some embodiments, the method includes threadably coupling, via a first hinge screw, each hinge bracket of the first hinge bracket to the first mold blank (at step 2604). The method may include threadably coupling, via a second hinge screw, each hinge bracket of the second hinge bracket to the second mold blank (at step 2606). According to some embodiments, the method includes positioning each hinge bracket of the first hinge bracket pair to be located between each hinge bracket of the second hinge bracket pair (at step 2608).

Figure 27:
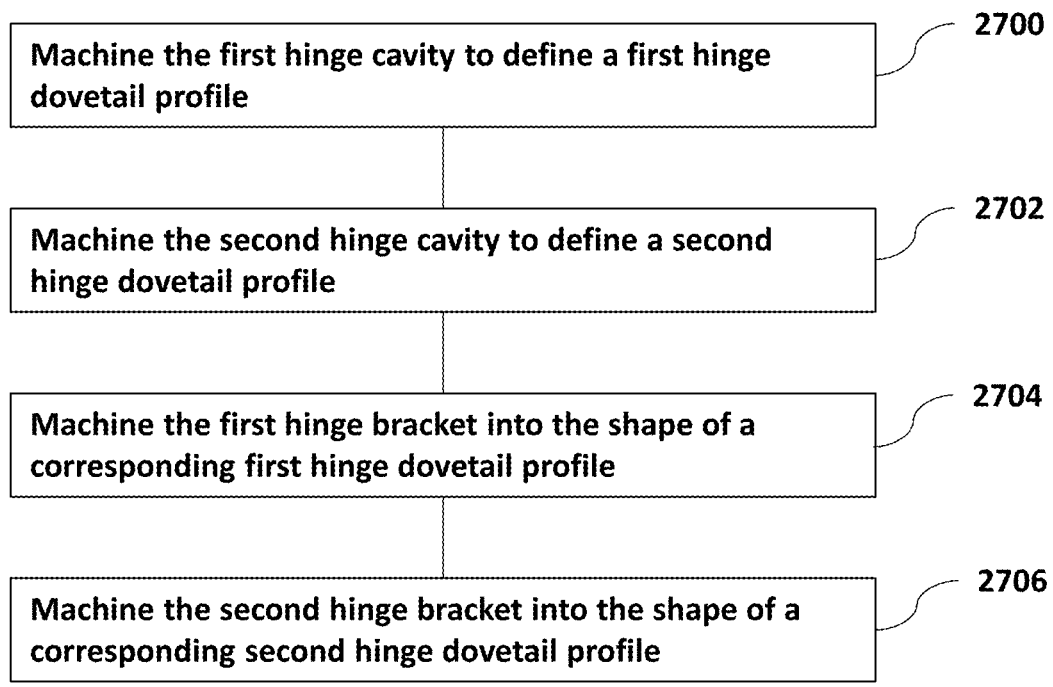
FIG. 27 illustrates a flowchart depicting machining hinge dovetail profiles into hinge brackets and mold blanks, according to some embodiments.

FIG. 27 illustrates a method of machining hinge dovetail profiles into hinge brackets and mold blanks. The method may include machining the first hinge cavity to define a first hinge dovetail profile (at step 2700). According to some embodiments, the method includes machining the second hinge cavity to define a second hinge dovetail profile (at step 2702). In some embodiments, the method includes machining the first hinge bracket into the shape of a corresponding first hinge dovetail profile (at step 2704). The method may include machining the second hinge bracket into the shape of a corresponding second hinge dovetail profile (at step 2706).

FIG. 28 illustrates a method of machining male and female interlocks into mold blanks. The method may include machining a first male interlock to protrude from the inner surface of the first mold blank, the first male interlock defining a tapered male profile, the first male interlock located adjacent the first handle end (at step 2800). According to some embodiments, the method includes machining a first female interlock to extend into the inner surface of the second mold blank, the first female interlock defining a tapered female profile, the first female interlock located adjacent the second handle end, wherein the first female interlock is positioned with respect to the first male interlock (at step 2802). In some embodiments, the method includes machining a second male interlock to protrude from the inner surface of the first mold blank, the second male interlock defining a tapered male profile, the second male interlock located adjacent the first hinge end (at step 2804). The method may include machining a second female interlock to extend into the inner surface of the second mold blank, the second female interlock defining a tapered female profile, the second female interlock located adjacent the second hinge end, wherein the second female interlock is positioned with respect to the second male interlock (at step 2806). According to some embodiments, the method includes machining a first molding recess into a first mold blank (at step 2808). In some embodiments, the method includes machining a second molding recess into a second mold blank, wherein the first molding recess and the second molding recess define a mold cavity when the inner surface of the first mold blank physically contacts the inner surface of the second mold blank (at step 2810).

FIG. 29 illustrates a method of assembling a first mold blank and an inner hinge bracket pair. The method may include slidably coupling, via a first hinge slot in the first mold blank, the inner hinge bracket pair to the first mold blank (at step 2900). According to some embodiments, the method includes detachably coupling, via at least one first hinge screw, the inner hinge bracket pair to the first mold blank (at step 2902). In some embodiments, the method includes slidably coupling a hinge pin through holes in each hinge bracket of the inner hinge bracket pair (at step 2904).

Figure 30:
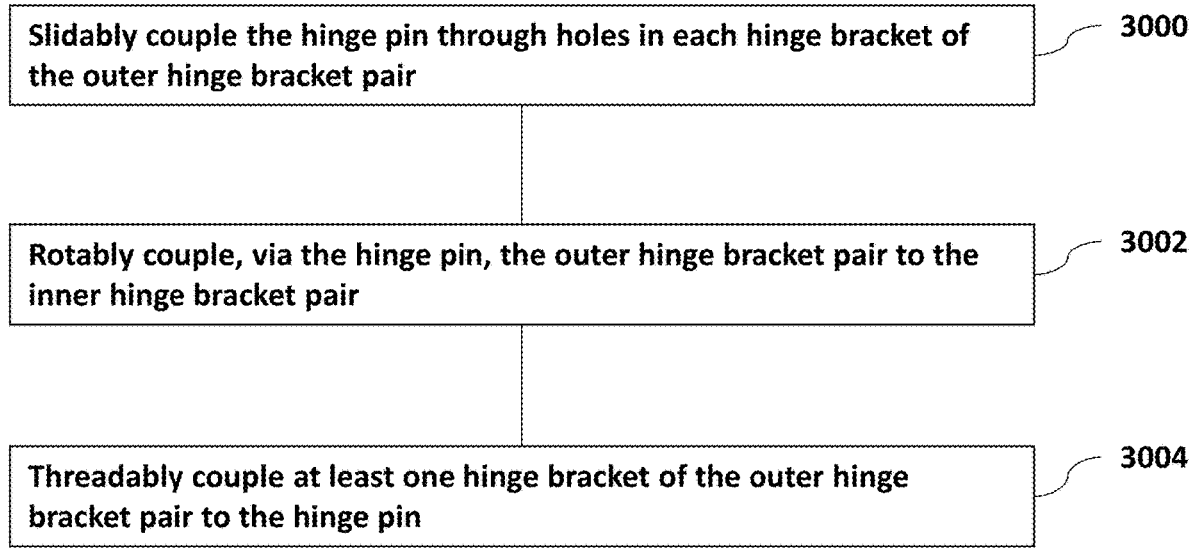
FIG. 30 illustrates a flowchart depicting a method of assembling an outer hinge bracket pair to the inner hinge bracket pair, according to some embodiments.

FIG. 30 illustrates a method of assembling an outer hinge bracket pair to the inner hinge bracket pair. The method may include slidably coupling the hinge pin through holes in each hinge bracket of the outer hinge bracket pair (at step 3000). According to some embodiments, the method includes rotably coupling, via the hinge pin, the outer hinge bracket pair to the inner hinge bracket pair (at step 3002). In some embodiments, the method includes threadably coupling at least one hinge bracket of the outer hinge bracket pair to the hinge pin (at step 3004).

Figure 31:
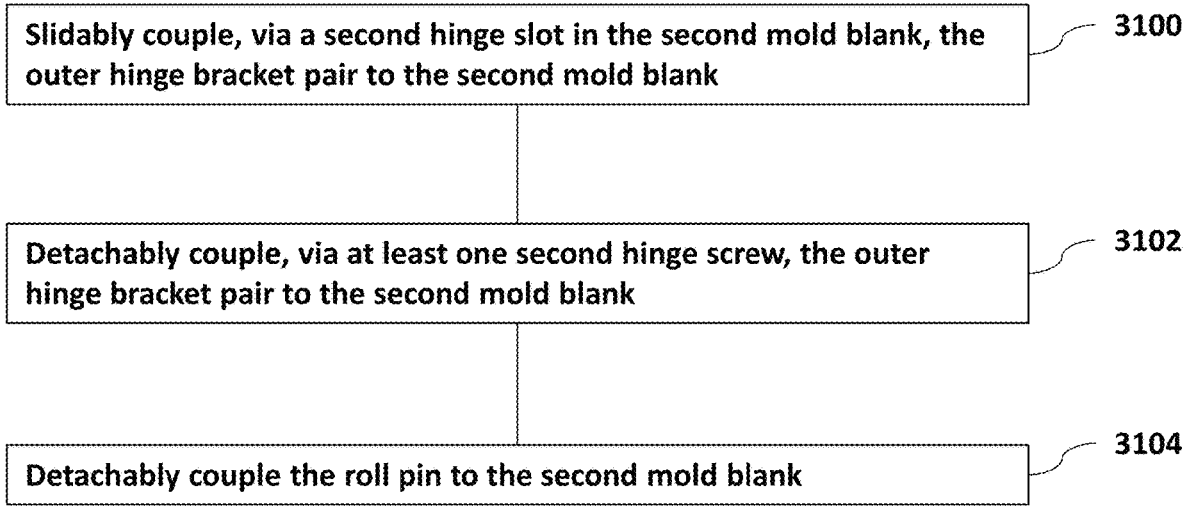
FIG. 31 illustrates a flowchart depicting a method of assembling a second mold blank to the outer hinge bracket pair, according to some embodiments.

FIG. 31 illustrates a method of assembling a second mold blank to the outer hinge bracket pair. The method may include slidably coupling, via a second hinge slot in the second mold blank, the outer hinge bracket pair to the second mold blank (at step 3100). According to some embodiments, the method includes detachably coupling, via at least one second hinge screw, the outer hinge bracket pair to the second mold blank (at step 3102). In some embodiments, the method includes detachably coupling the roll pin to the second mold blank (at step 3104).

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1, and embodiments described in other sections may apply to and be combined with embodiments described within the "Topic 1" section.

To increase the clarity of various features, other features are not labeled in each figure.

The various features and processes described above may be used independently of one another or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, parallel, or some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless expressly stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless expressly stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only and are not intended to limit the scope of the inventions disclosed herein. Thus, nothing in the foregoing description implies that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. An assembly, comprising:
   a first mold blank capable of being machined to create a first mold cavity, the first mold blank comprising a first hinge end and a first handle end located opposite the first hinge end, the first hinge end comprising a first hinge slot located on an inner surface of the first mold blank;
   a second mold blank capable of being machined to create a second mold cavity, the second mold blank comprising a second hinge end and a second handle end located opposite the second hinge end, the second hinge end comprising a second hinge slot located on an inner surface of the second mold blank;
   a first hinge bracket detachably coupled to the first hinge slot;
   a second hinge bracket detachably coupled to the second hinge slot; and
   a hinge pin detachably coupled to the first hinge bracket and the second hinge bracket, wherein the first mold blank and the second mold blank are configured to rotate about the hinge pin.

2. The assembly of claim 1, further comprising:
   a first handle retainer detachably coupled to an outer surface of the first mold blank, the first handle retainer located adjacent the first handle end, the outer surface of the first mold blank located opposite the inner surface of the first mold blank; and
   a first handle detachably coupled to the first handle retainer.

3. The assembly of claim 2, further comprising:
   a second handle retainer detachably coupled to an outer surface of the second mold blank, the second handle retainer located adjacent the second handle end, the outer surface of the second mold blank located opposite the inner surface of the second mold blank; and
   a second handle detachably coupled to the second handle retainer.

4. The assembly of claim 3, further comprising:
   a first handle slot located on the outer surface of the first mold blank, the first handle slot located adjacent to the first handle end, wherein the first handle slot is configured to receive the first handle retainer; and
   a second handle slot located on the outer surface of the second mold blank, the second handle slot located adjacent to the second handle end, wherein the second handle slot is configured to receive the second handle retainer.

5. The assembly of claim 4, wherein the first handle is offset with respect to a central axis of the first mold blank, and wherein the second handle is offset with respect to a central axis of the second mold blank.

6. The assembly of claim 5, further comprising:

a first pair of handle screws threadably coupled to the first mold blank, via the outer surface of the first mold blank, the first pair of handle screws configured to detachably couple the first handle retainer to the first mold blank; and a second pair of handle screws threadably coupled to the second mold blank, via the outer surface of the second mold blank, the second pair of handle screws configured to detachably couple the second handle retainer to the second mold blank.

7. The assembly of claim 6, further comprising:

a first threaded rod threadably coupled to the first handle retainer and the first handle whereby the first threaded rod detachably couples the first handle to the first mold blank;

a first hex nut threadably coupled to the first threaded rod and configured to retain the first handle in place with respect to the first threaded rod;

a second threaded rod threadably coupled to the second handle retainer and the second handle whereby the second threaded rod detachably couples the second handle to the second mold blank; and a second hex nut threadably coupled to the second threaded rod and configured to retain the second handle in place with respect to the second threaded rod.

8. The assembly of claim 7, wherein the first handle slot defines a first handle dovetail profile recessed into the outer surface of the first mold blank, and the first handle retainer defines a corresponding first handle dovetail profile configured to slidably engage the first handle dovetail profile to thereby detachably couple the first handle retainer to the first mold blank, and wherein the second handle slot defines a second handle dovetail profile recessed into the outer surface of the second mold blank, and the second handle retainer defines a corresponding second handle dovetail profile configured to slidably engage the second handle dovetail profile to thereby detachably couple the second handle retainer to the second mold blank.

9. The assembly of claim 8, wherein the first handle defines a first tapered profile.

10. The assembly of claim 1, further comprising a first hinge screw threadably coupled to the first mold blank, via the inner surface of the first mold blank, the first hinge screw configured to detachably couple the first hinge bracket to the first mold blank.

11. The assembly of claim 10, further comprising a second hinge screw threadably coupled to the second mold blank, via the inner surface of the second mold blank, the second hinge screw configured to detachably couple the second hinge bracket to the second mold blank.

12. The assembly of claim 11, wherein the first hinge slot defines a first hinge dovetail profile recessed into the inner surface of the first mold blank, and the first hinge bracket defines a corresponding first hinge dovetail profile configured to slidably engage the first hinge dovetail profile to thereby detachably couple the first hinge bracket to the first mold blank.

13. The assembly of claim 1, wherein the first hinge bracket comprises an inner hinge bracket pair.

14. The assembly of claim 1, further comprising:

a first male interlock protruding from the inner surface of the second mold blank, the first male interlock defining a tapered male profile; and a first female interlock extending into the inner surface of the first mold blank, the first female interlock defining a tapered female profile, wherein the first female interlock is sized and positioned to receive the first male interlock and thereby align the first mold blank with the second mold blank.

15. The assembly of claim 14, further comprising:

a second male interlock protruding from the inner surface of the second mold blank, the second male interlock defining the tapered male profile; and a second female interlock extending into the inner surface of the first mold blank, the second female interlock defining the tapered female profile, wherein the second female interlock is sized and positioned to receive the second male interlock and thereby align the first mold blank with the second mold blank.

16. The assembly of claim 15, wherein the first male interlock is located adjacent the first handle end, the second male interlock is located adjacent the first hinge end, and wherein the first female interlock is located adjacent the second handle end, the second female interlock is located adjacent the second hinge end.

17. The assembly of claim 13, wherein the second hinge bracket comprises an outer hinge bracket pair.

18. The assembly of claim 17, wherein each hinge bracket of the inner hinge bracket pair is located between each hinge bracket of the outer hinge bracket pair.

19. The assembly of claim 9, wherein the second handle defines a second tapered profile substantially similar to the first tapered profile.

20. The assembly of claim 12, wherein the second hinge slot defines a second hinge dovetail profile recessed into the inner surface of the second mold blank, and the second hinge bracket defines a corresponding second hinge dovetail profile configured to slidably engage the second hinge dovetail profile to thereby detachably couple the second hinge bracket to the second mold blank.

* * * * *